United States Patent [19]
Shimonohara

[11] Patent Number: 6,151,856
[45] Date of Patent: Nov. 28, 2000

[54] PANELS FOR CONSTRUCTION AND A METHOD OF JOINTING THE SAME

[76] Inventor: Takeshige Shimonohara, 8-10, Nishikicho 5-chome, Warabi-shi, Saitama-ken 335, Japan

[21] Appl. No.: 08/947,242

[22] Filed: Oct. 8, 1997

[30]  Foreign Application Priority Data

Apr. 4, 1996 [JP] Japan .................................. 8-118144
Apr. 11, 1996 [JP] Japan .................................. 8-125213

[51] Int. Cl.⁷ .................................................. E04B 2/00
[52] U.S. Cl. ........................................ 52/426; 52/309.12
[58] Field of Search .................... 52/424, 426, 582.1, 52/592.6

[56]  References Cited

U.S. PATENT DOCUMENTS 4,765,109 8/1988 Boeshart .................................. 52/426
4,894,969 1/1990 Horobin ............................... 52/309.12
5,715,635 2/1998 Sherwood ................................. 52/286

*Primary Examiner*—Beth A. Stephan
*Attorney, Agent, or Firm*—Flynn, Thiel, Boutell & Tanis, P.C.

[57]  ABSTRACT

Panels for construction each include a concave jointing element which is embedded in a panel body at the upper end surface and a cylindrical body provided in the concave jointing element and extending from the bottom surface of the concave jointing element to a lower end of the panel body, and a convex jointing element held inside the cylindrical body. After the panels are disposed vertically, the convex jointing element held by the cylindrical body of an upper stage panel is lowered so as to engage with the concave jointing element of a lower stage panel. As a result, the upper and lower panels are jointed with each other. The construction of the panels can be performed in a short time without requiring techniques of skilled workers and time, and can obtain structures having a high strength with a beautifully finished surface.

28 Claims, 57 Drawing Sheets

FIG. 6 (A)
FIG. 6 (B)
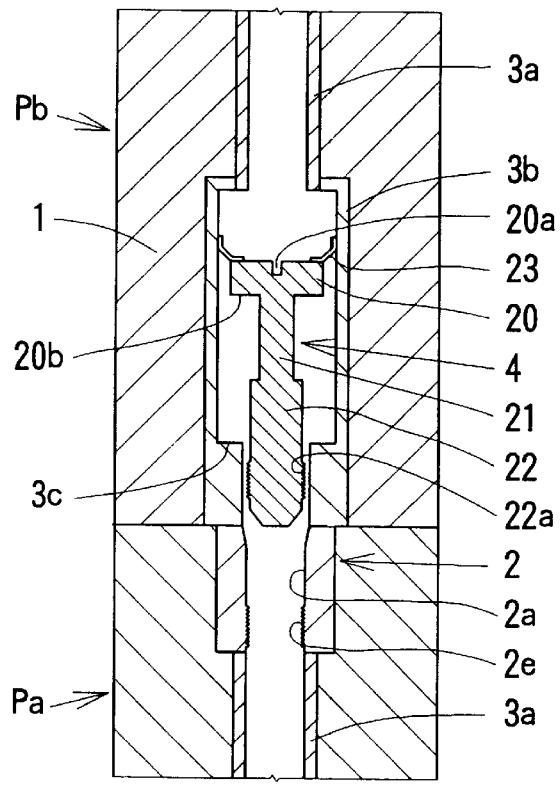
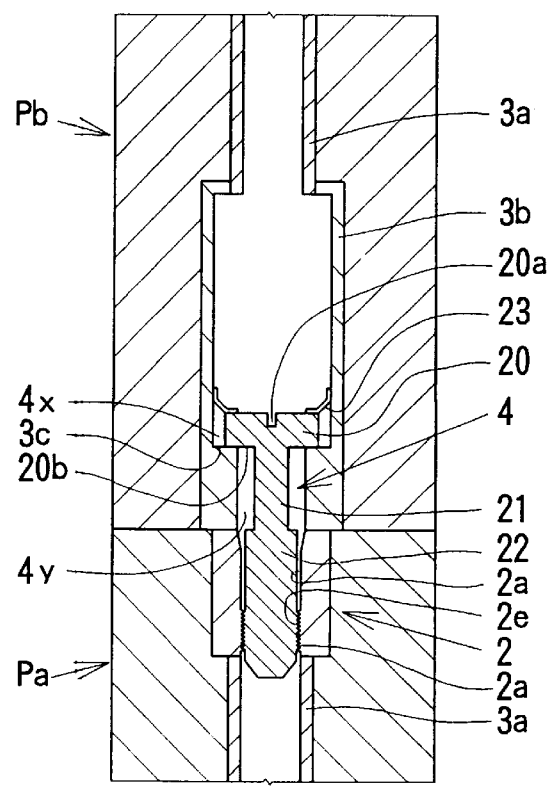

FIG. 7 (A)
FIG. 7 (B)
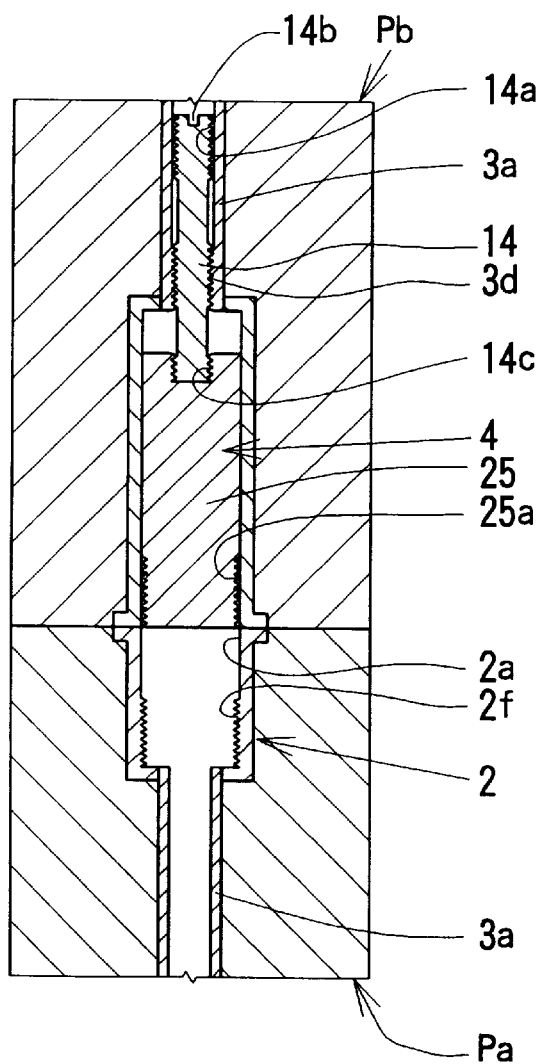
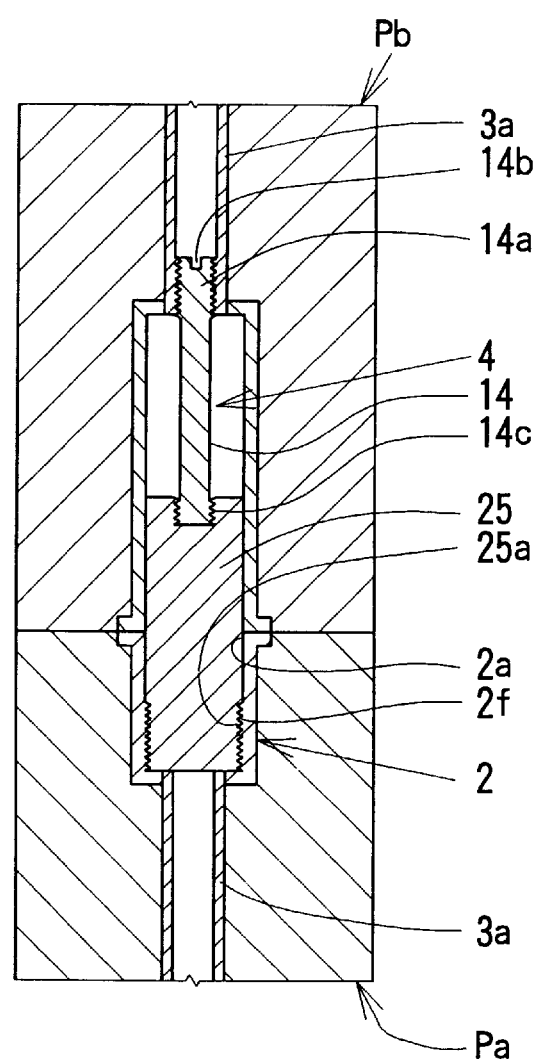

FIG. 8 (A)
FIG. 8 (B)
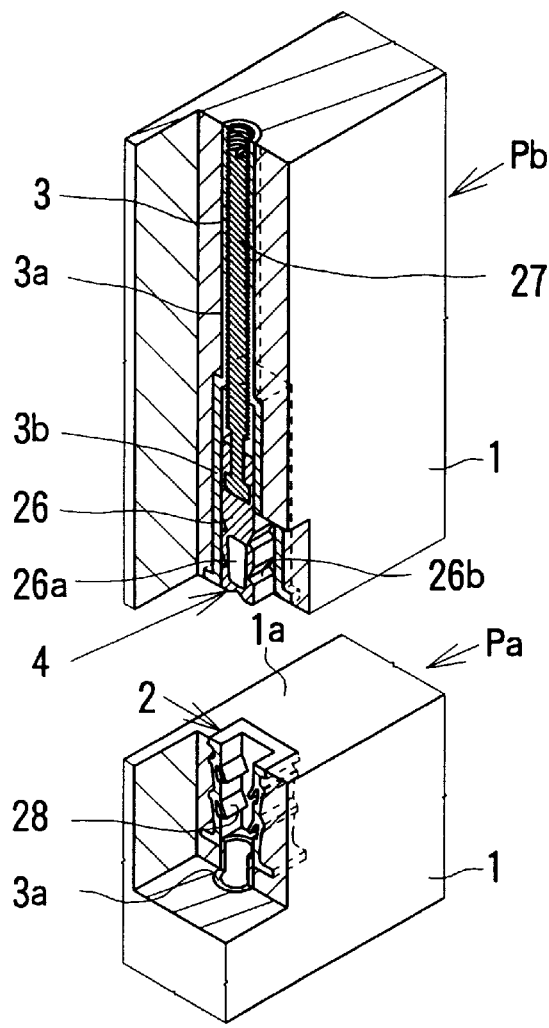
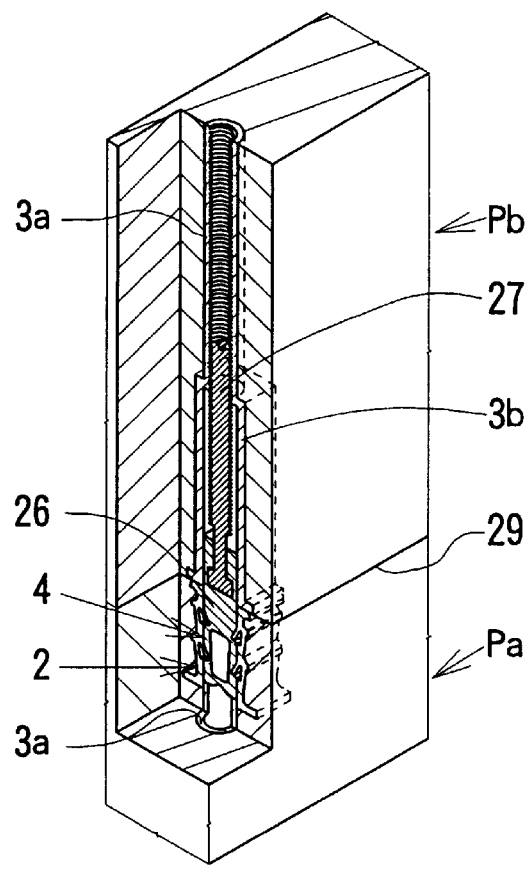

FIG. 9
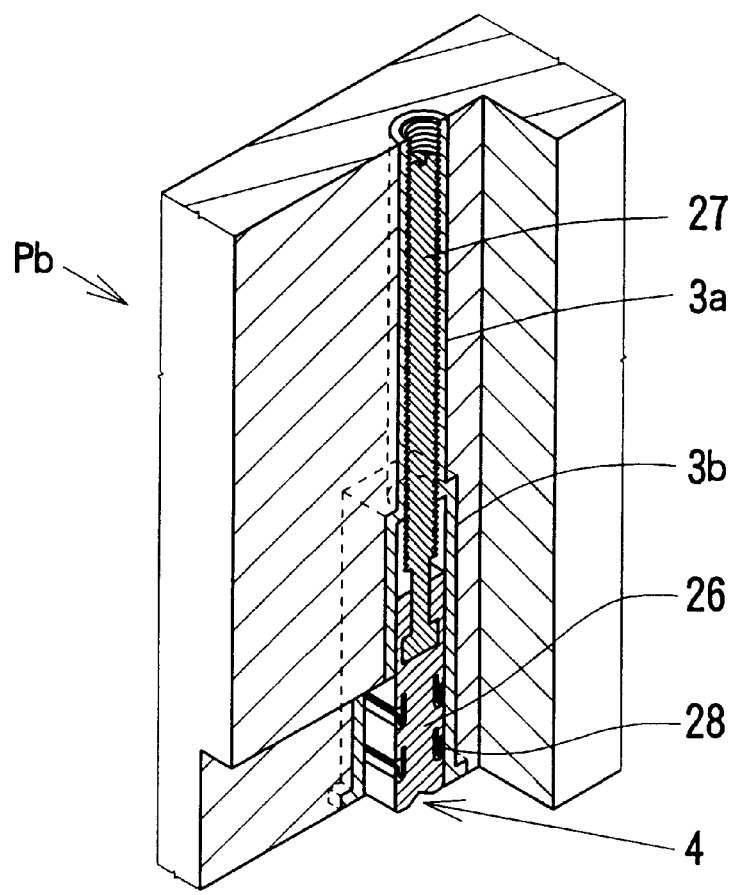
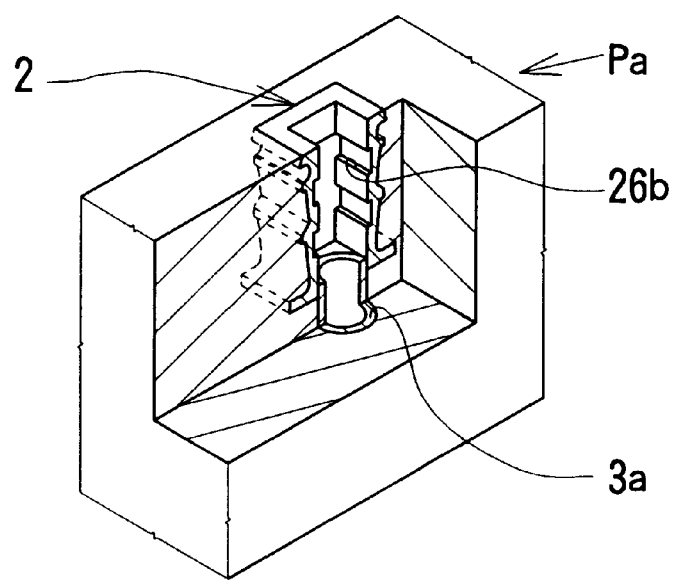

F I G. 3 3 (A)
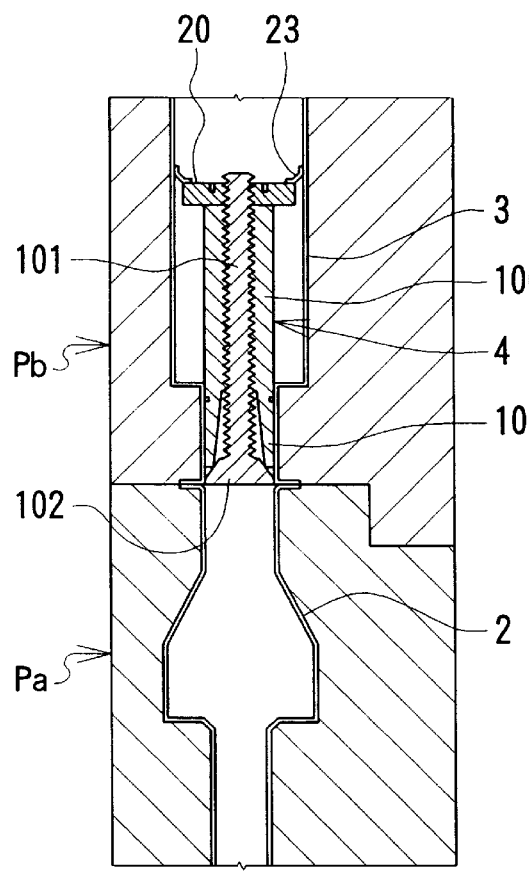
F I G. 3 3 (B)
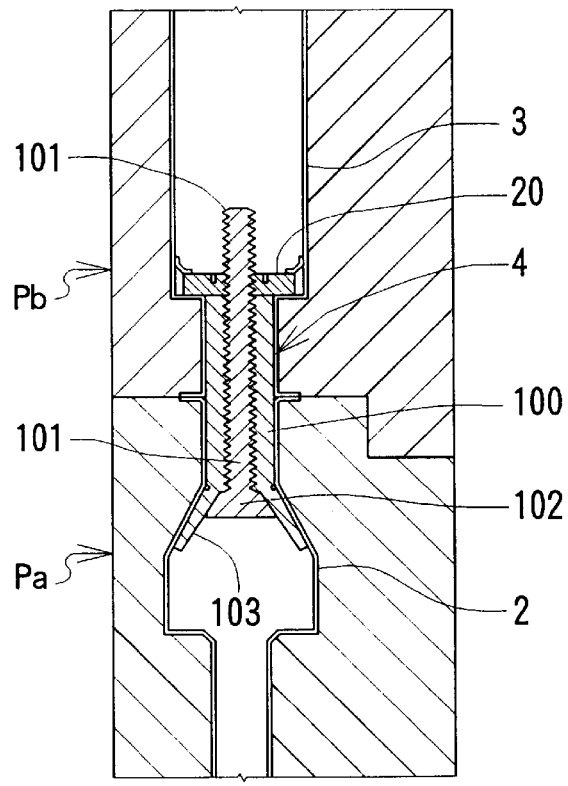

FIG. 34 (A)
FIG. 34 (B)
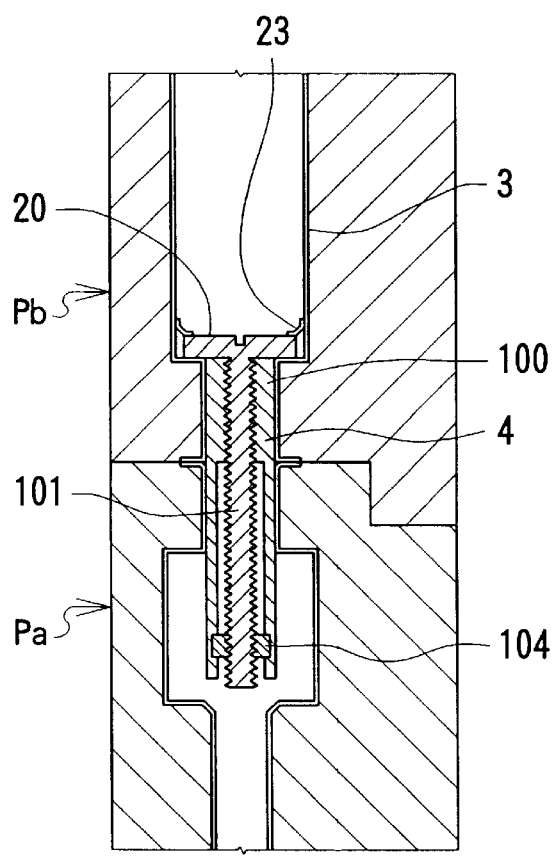
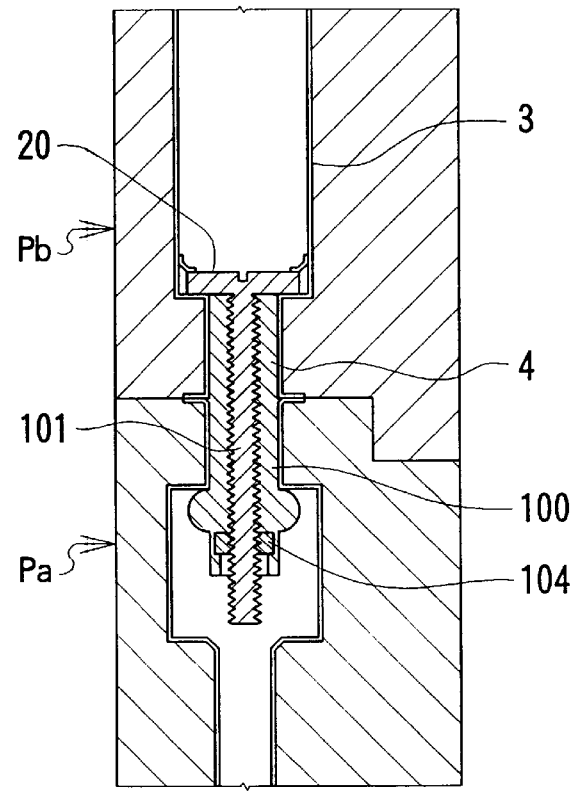

FIG. 35(A)
FIG. 35(B)
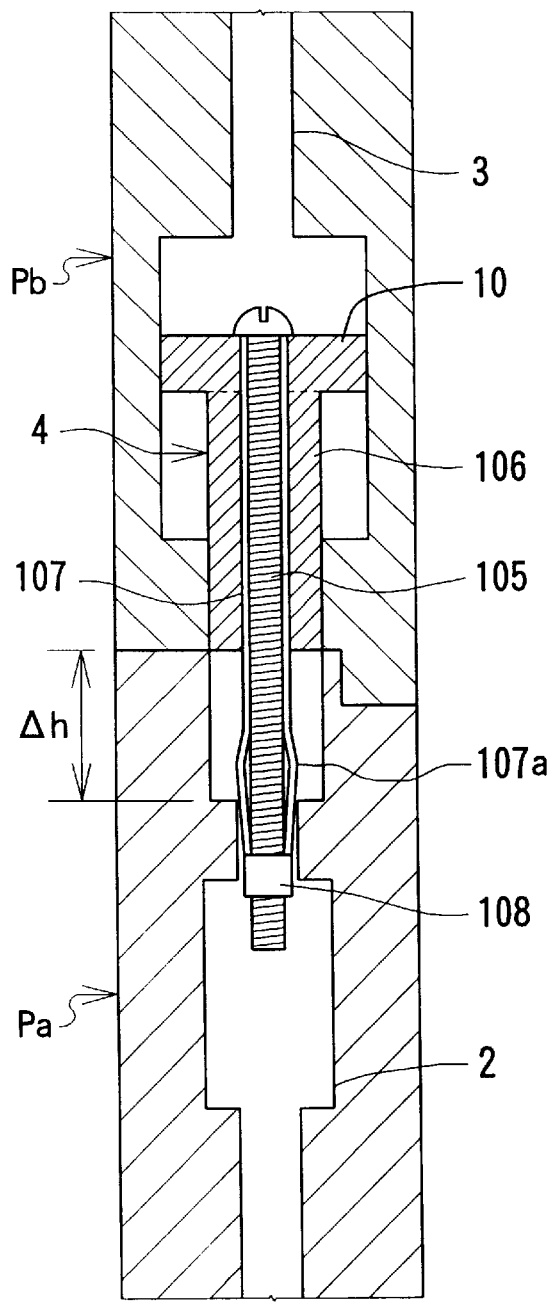
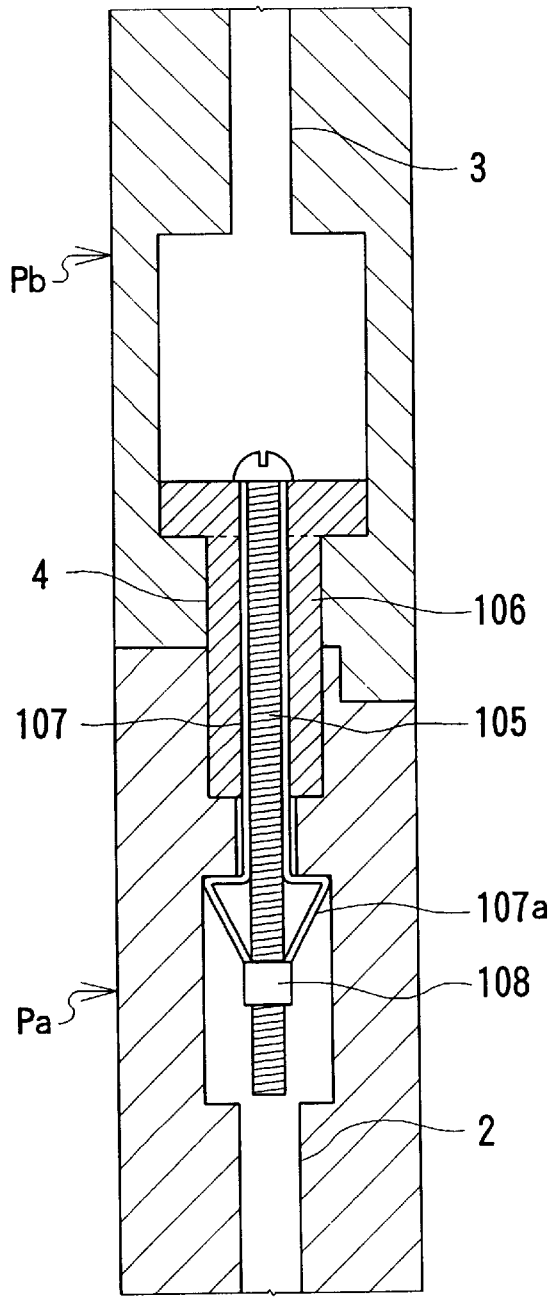

FIG. 36(A)
FIG. 36(B)
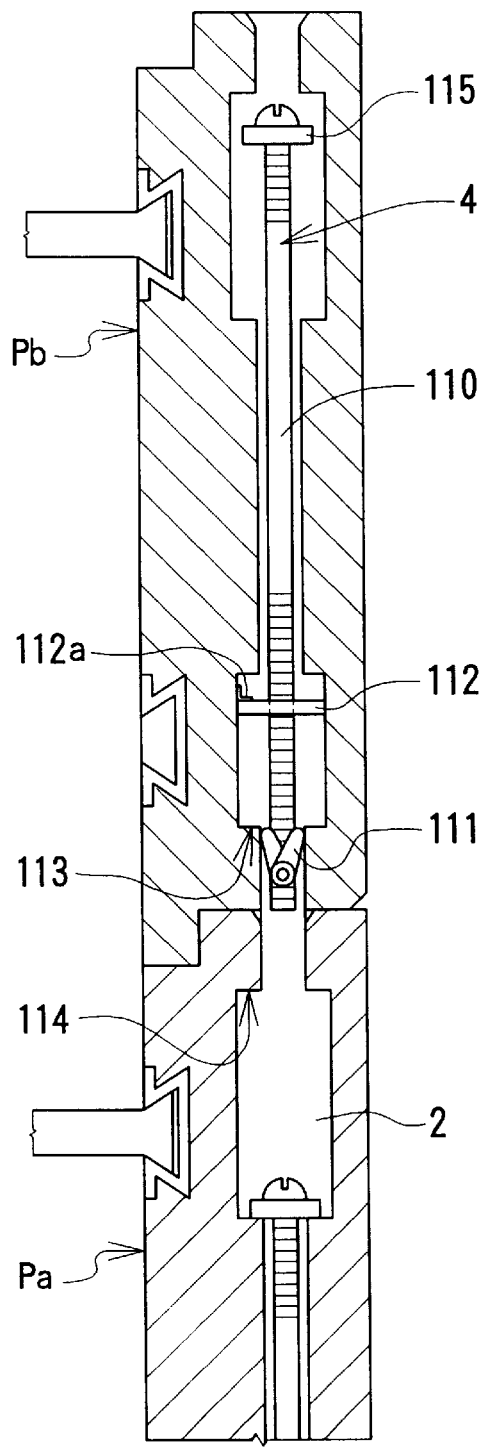
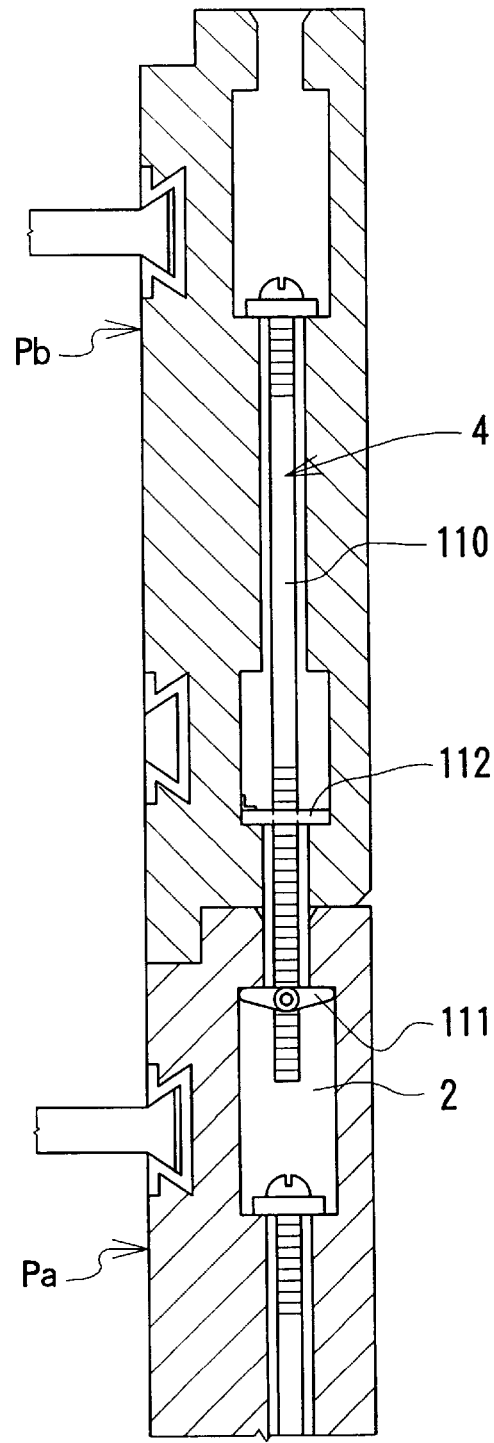

FIG. 38 (A)
FIG. 38 (B)
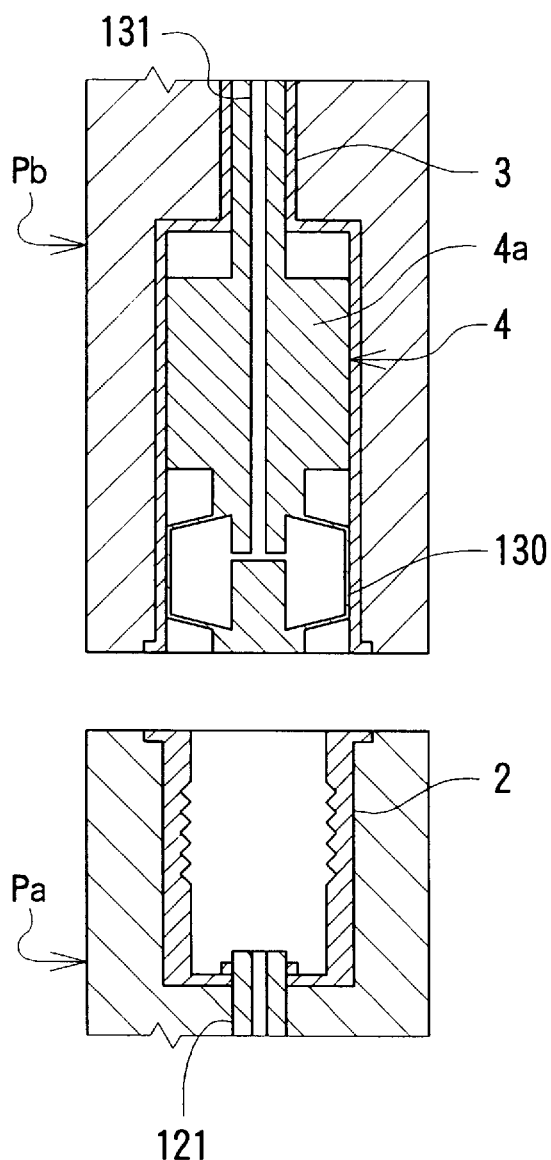
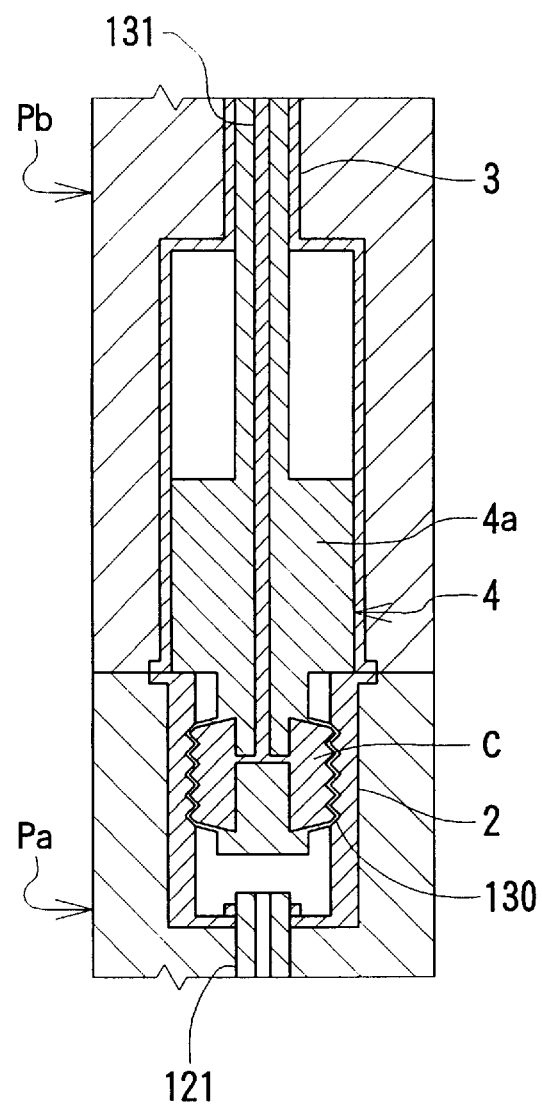

FIG. 39 (A)
FIG. 39 (B)
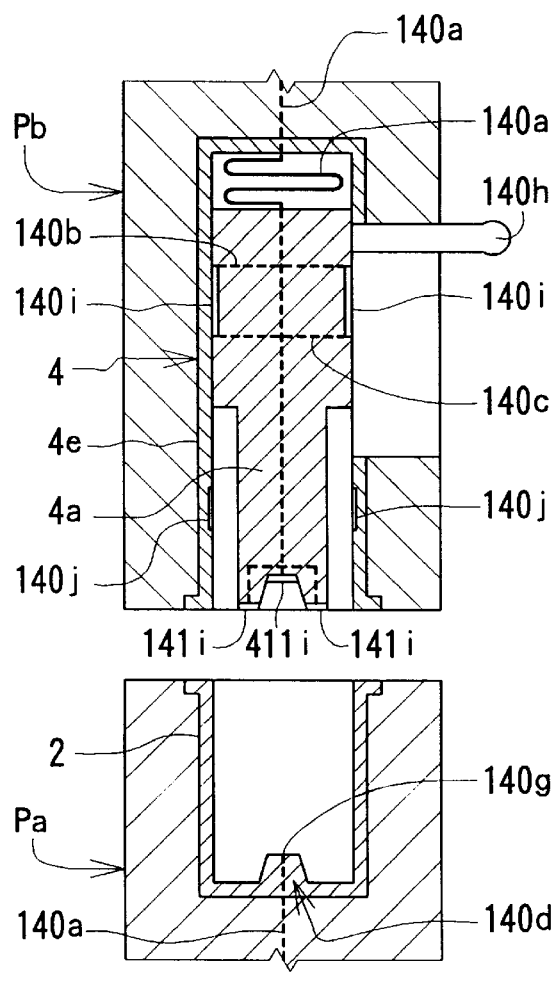
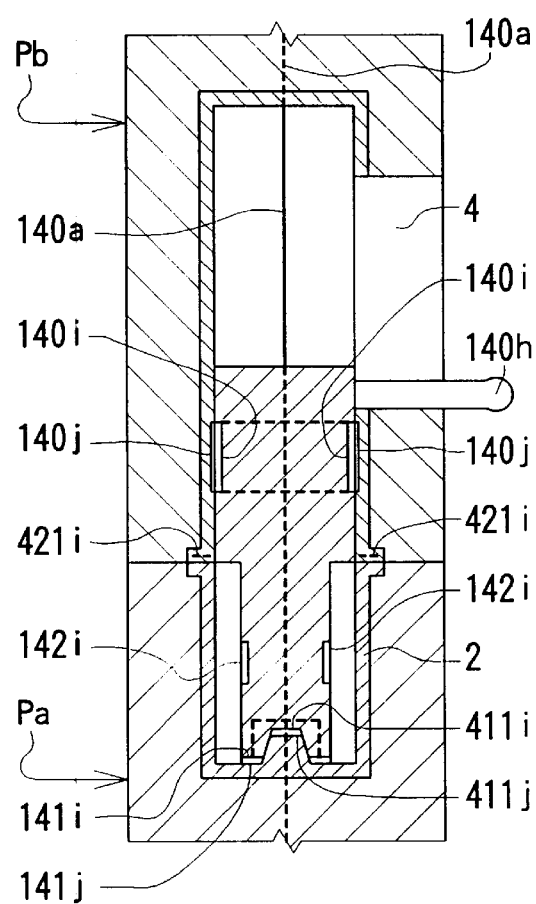

F I G. 4 4 (A)
F I G. 4 4 (B)
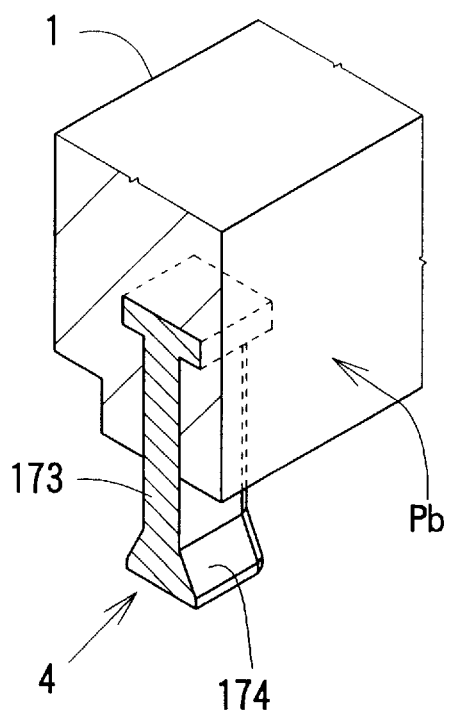
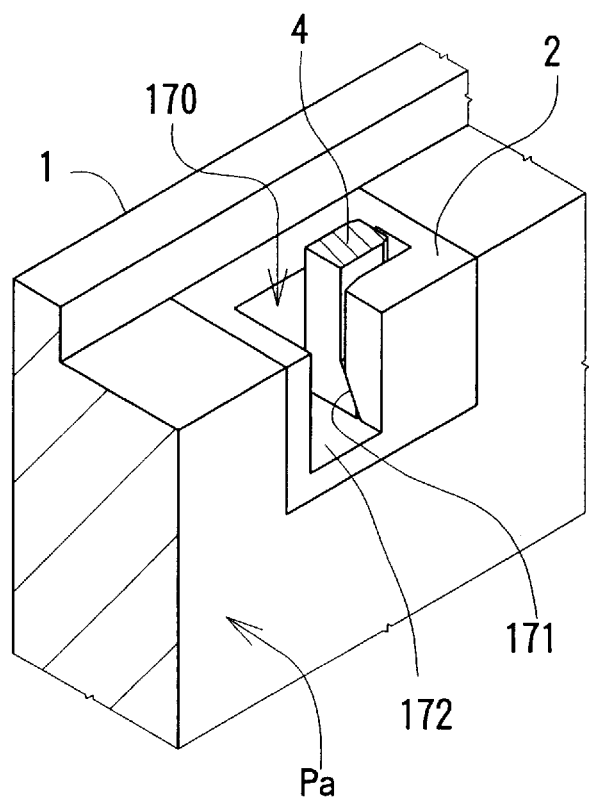

F I G. 4 6 (A)
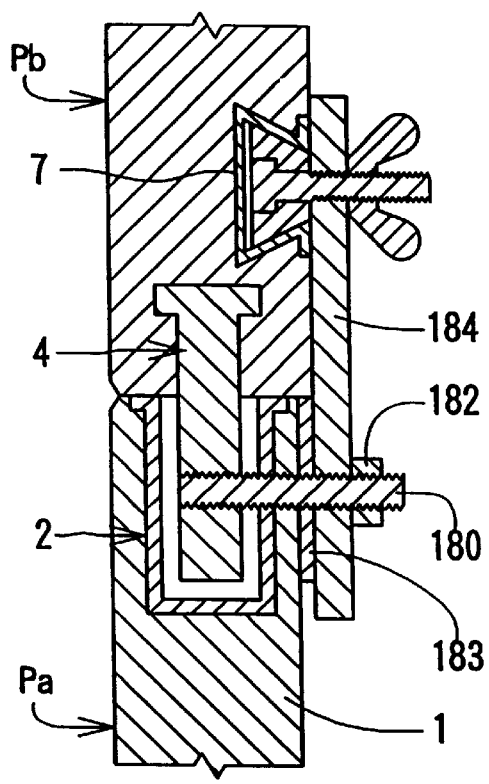
F I G. 4 6 (B)
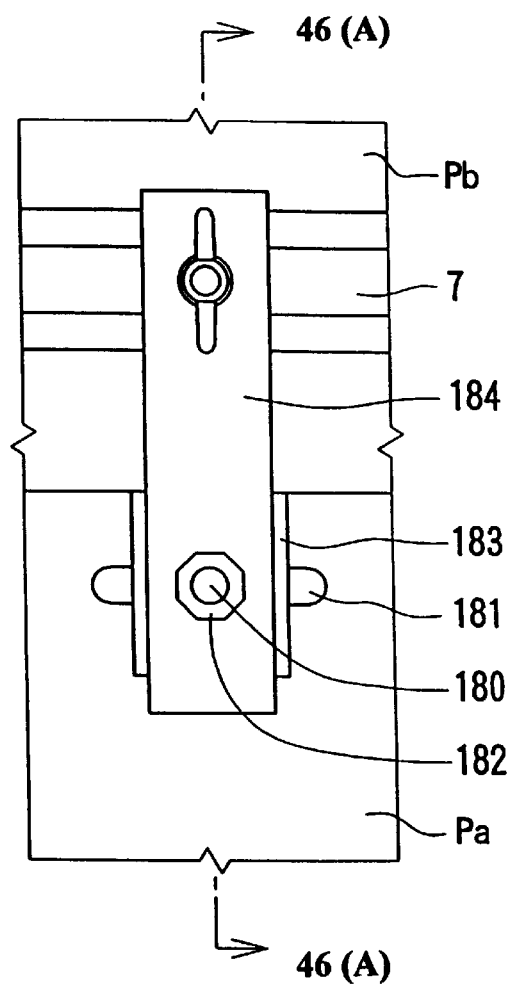

F I G. 5 2
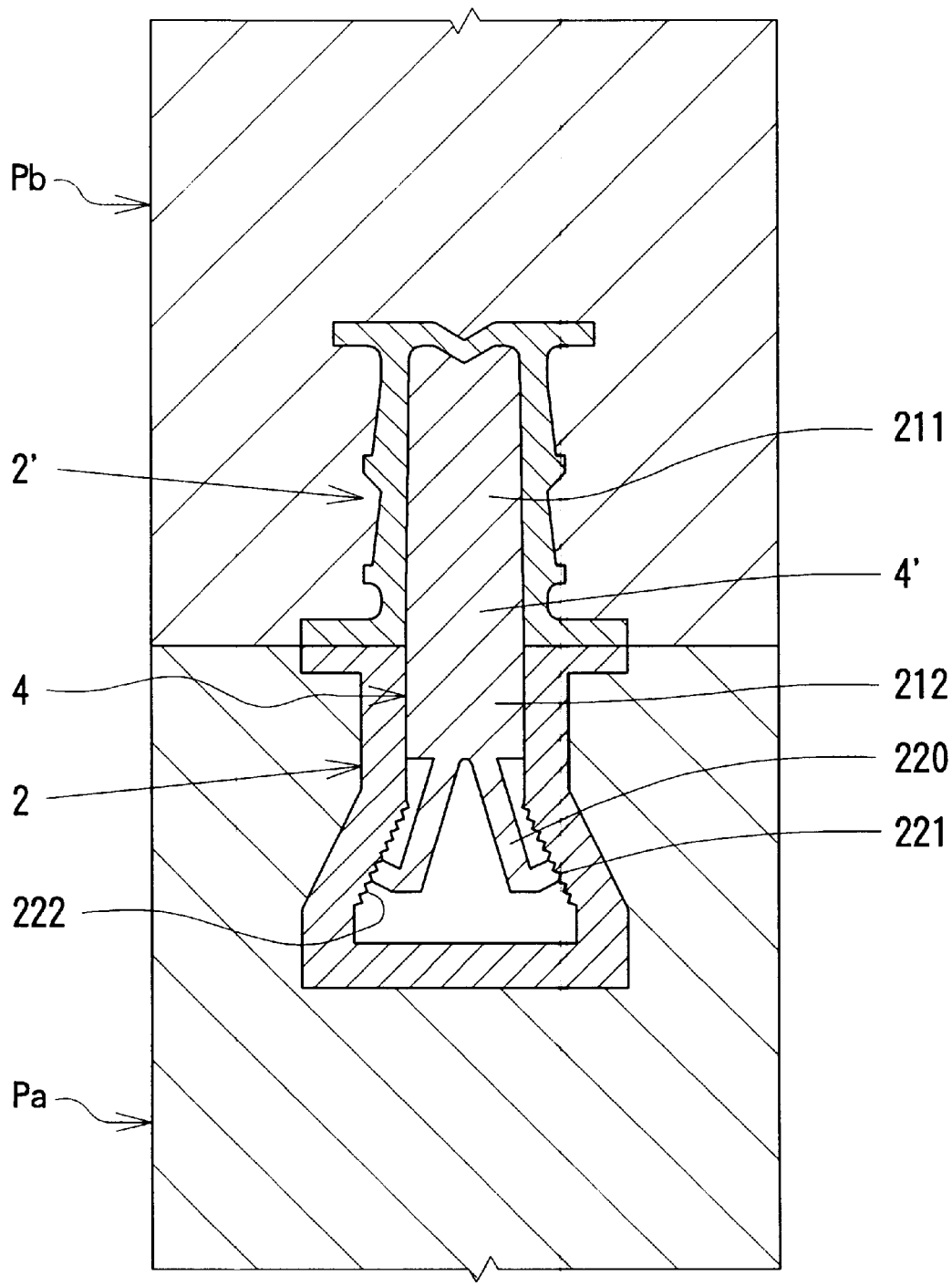

F I G. 5 7
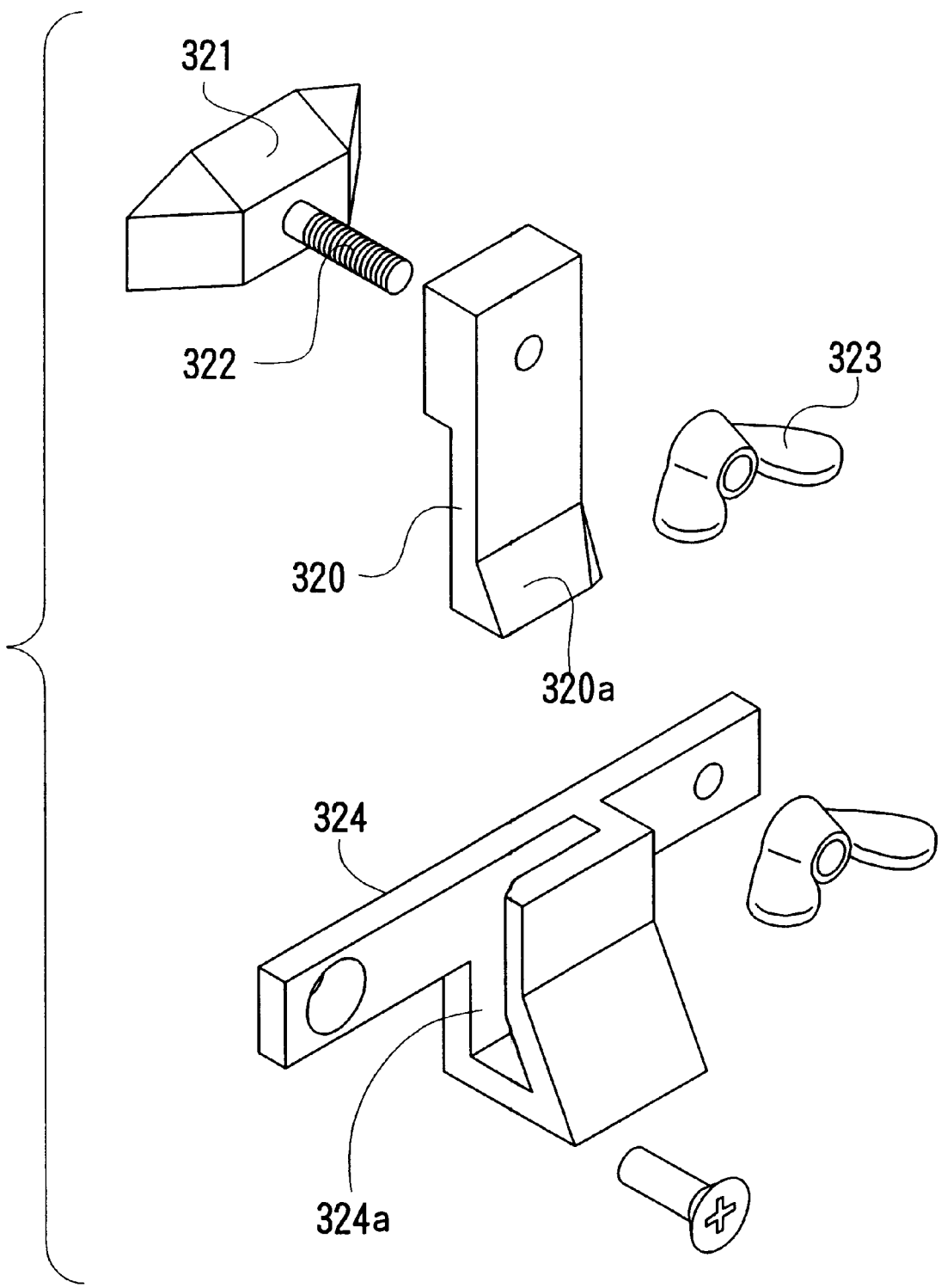

PANELS FOR CONSTRUCTION AND A METHOD OF JOINTING THE SAME

BACKGROUND OF THE INVENTION

1. Field of the Invention

The present invention relates to panels for construction (hereinafter referred to as construction panels) which are used for walls surrounding buildings, outer and inner walls or partition was of buildings, supporting walls, and also for concrete structures such as engineering buildings and a method of jointing the same.

2. Prior Art

For construction of the above-mentioned structures, there has been conventionally taken a method comprising assembling frameworks, filling up concrete in the frameworks, removing the frameworks, sticking decorative material such as tiles onto the surface of concrete or finishing the surface of concrete with mortar, as the need arises. There has been taken another method comprising preparing concrete blocks or pre-cast concrete, inserting reinforcement in hollow portions thereof, and assembling them.

However, the conventional method using such frameworks has problems that firstly it requires assembling land disassembling works;

secondly, a finishing work has to be performed by tiles, etc., by making the surface of concrete fine or beautiful, thereby requiring much time and labor; thirdly, the work per se requires skilled technique, thereby leading to high construction cost, and delay of the construction together with latest shortage of skilled workers.

Further, the conventional method using concrete block and pre-cast concrete requires time for positioning these members, which causes another problem that working efficiency is deteriorated and the construction invites danger because of handling heavy objects. Still further, finished moats and supporting walls frequently expose the ground to concrete, which causes still another problem that the surface of concrete becomes blackish by contamination caused by exhaust gas of automobiles or by the sticking of mold and moss caused by moisture, which spoils the beauty of the construction and is difficult to remove.

SUMMARY OF THE INVENTION

Accordingly, it is an object of the invent ion to provide construction panels capable of constructing structures in a short time, of achieving structures of high rigidity and of finishing surfaces of structures finely, and a method of jointing the same.

To achieve the above objects, the constriction panel of the present invention is characterized in comprising a pair of jointing elements disposed on a panel body at upper, lower and back surfaces thereof for jointing panels for construction which are piled vertically, wherein one jointing element is a concave jointing element and another concave member is a convex jointing element.

One jointing element is a box-shaped concave jointing element and another jointing element is a pillar-shaped con ex jointing element. In this case, each of the pair of jointing elements comprises a concave jointing element which is disposed at upper and lower ends surfaces of said panel body and wherein one jointing element is a concave jointing element while another jointing element is a convex jointing element which is formed by fixing a separately prepared convex jointing element to said concave jointing element so as to protrude therefrom.

As another example, cylindrical bodies are provided to extend from the bottom surface of said concave jointing element to a lower end of said panel body, and convex jointing elements disposed inside said cylindrical bodies can engage with the concave jointing element of a lower stage panel.

Further, the construction panel of the present invention further comprises a jointing plate provided at a surface where the concave and convex jointing elements contact or at one or both surfaces where one panel body contacts another panel body. Still further, connecting members may be provided for connecting opposing construction panels or for connecting the consecution panel with a temporary member. Further, a jointing element and/or jointing plate may be provided for jointing construction panels which adjoin with each other in a lateral direction.

The construction panel of the present invention is not limited to the flat-plate shape but it my be L-shaped or curve , and the panel body may be formed of a framework. Further, a shielding plate may be mounted on said panel body at one of or both of front and back surfaces of said panel body, and a decorative plate may be mounted on a front surface of said panel body.

The method of jointing construction panels according to the present invention is characterized in comprising preparing a pair of jointing elements disposed on a panel body at upper, lower and back surfaces thereof for jointing panels for construction which are piled vertically, wherein one jointing element is a concave jointing element and another jointing element is a convex jointing element, placing an upper stage panel on a lower stage panel so that end surfaces thereof flush with each other, and engaging the concave jointing element with said convex jointing element so as to joint the upper stage panel and lower stage panel.

Concretely, the method comprises preparing panels for construction comprising a pair of jointing elements each composed of a box-shaped concave jointing element and a pillar-shaped convex jointing element, and engaging said convex jointing element with said concave jointing element so as to joint said upper stage panel with said lower stage panel.

Alternatively, a concave jointing element is embedded in an upper end surface of said panel body, and a cylindrical body is provided in said concave jointing element which extends from a bottom surface of said concave jointing element to said lower end of said panel body, and a convex jointing element is provided in said cylindrical body, placing said upper stage panel and lower stage panel vertically, and lowering the convex pointing element provided in the cylindrical body of the upper stage panel to engage in the concave jointing element of the lower stage panel so as to joint the upper stage panel with lower stage panel.

Still alternatively, a pair of jointing elements each composed of a box-shaped concave jointing element and a pillar-shaded convex jointing element, and a jointing plate provided on the concave and convex jointing elements at either portion where said concave and convex jointing elements contact each other, or at either or both of portions where adjoining panel bodies contact each other so as to joint the upper stage panel with lower stage panel.

In either of the methods set forth above the opposing construction panels or the construction panel and a temporary member are connected with each other by jointing members provided at the back surface of the panel body. Further, the panels which adjoin with one another in a lateral direction are jointed with one another by jointing members or jointing plates which are provided at both lateral ends or at neighboring portions thereof. More still further, the panels are assembled with one another with assistance of temporary member of the panel body. Further, a filling material is filled between the opposing panels P for construction,

BRIEF DESCRIPTION OF THE DRAWINGS

FIGS. 6(A)–6(B), 7(A)–7(B), 8(A)–8(B), 9, 10(A)–10(B), 11(A)–11(B), 12–14, 15(A)–15(B), 16(A)–16(B), and 17 are respectively sectional views showing concave and convex jointing members according to other embodiments of the invention;

FIGS. 33(A)–33(B), 34(A)–34(B), 35(A)–35(B), 36(A)–36(B), 37(A)–37(C), 38(A)–38(B), and 39(A)–39(B) are views for explaining respectively a first type jointing member;

FIGS. 40(A)–40(B), 41, 42(A)–42(B), 43, and 44(A)–44(B) are views for explaining respectively a second type jointing member;

FIGS. 46(A) and (B) are respectively sectional and rear views for explaining a method of jointing construction panels to which the jointing method of FIG. 17 is applied;

FIGS. 47(A)–47(B), 48, 49, 50(A)–50(B), 51 and 52 are views for explaining respectively a third type jointing member;

FIG. 57 is a perspective view showing members for jointing upper and lower panels utilizing concave jointing members provided at the back surface of a panel body;

BEST MODE FOR CARRYING OUT THE INVENTION

Figure 1:
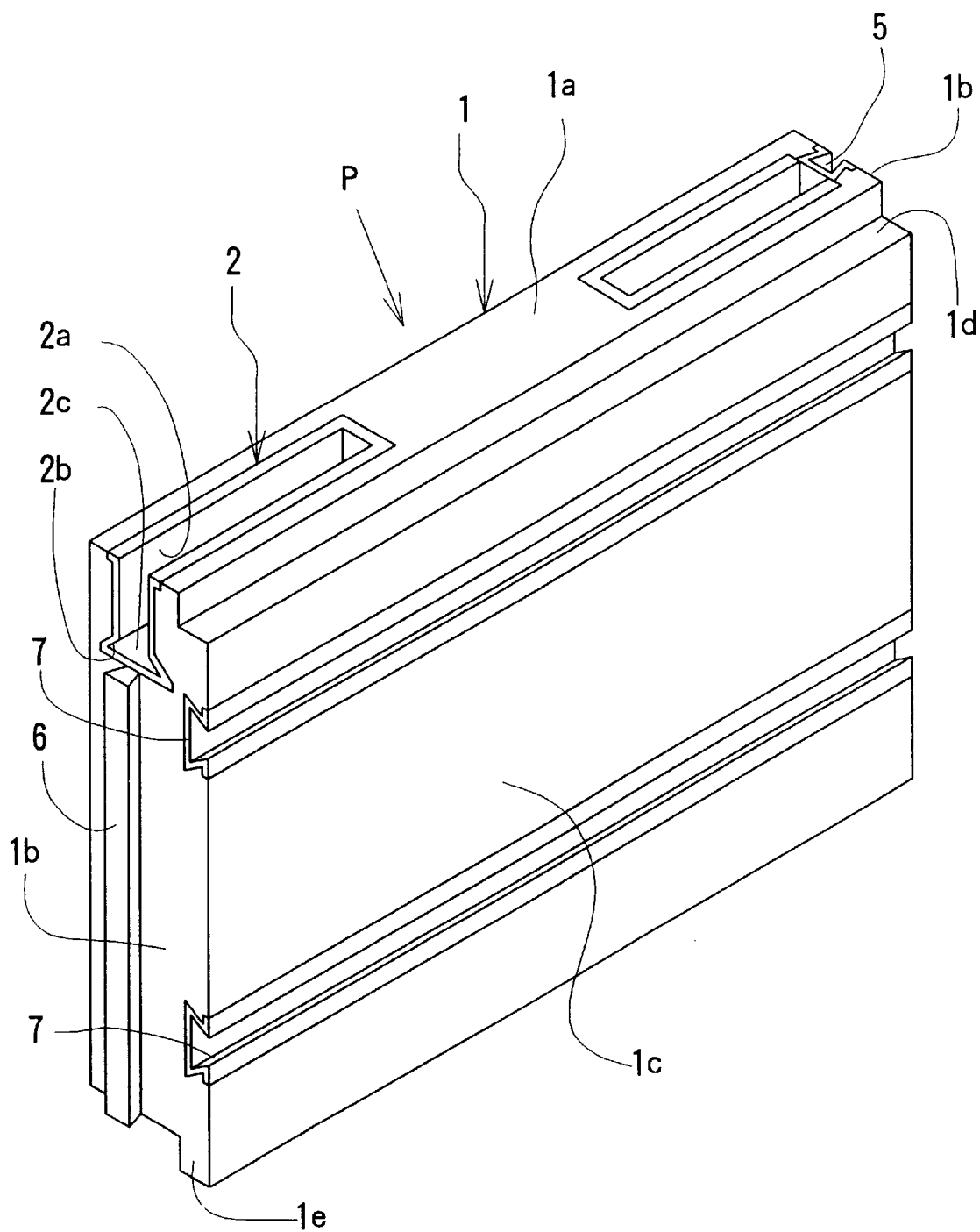
FIG. 1 is a perspective view showing an example of a construction panel according to a first embodiment of the present invention.
Figure 2:
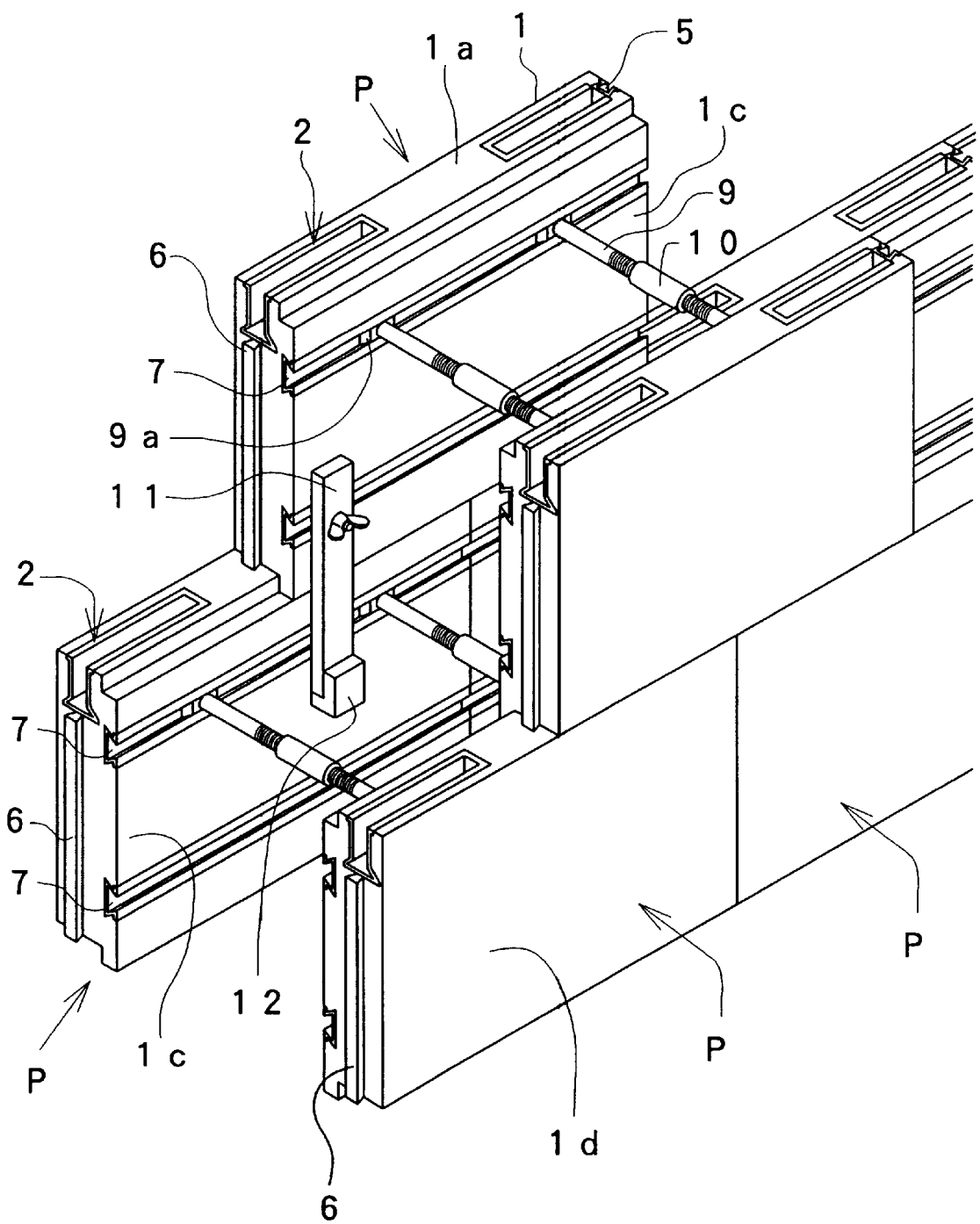
FIG. 2 is a perspective view showing a state where construction panels in FIG. 1 are assembled.
Figure 3:
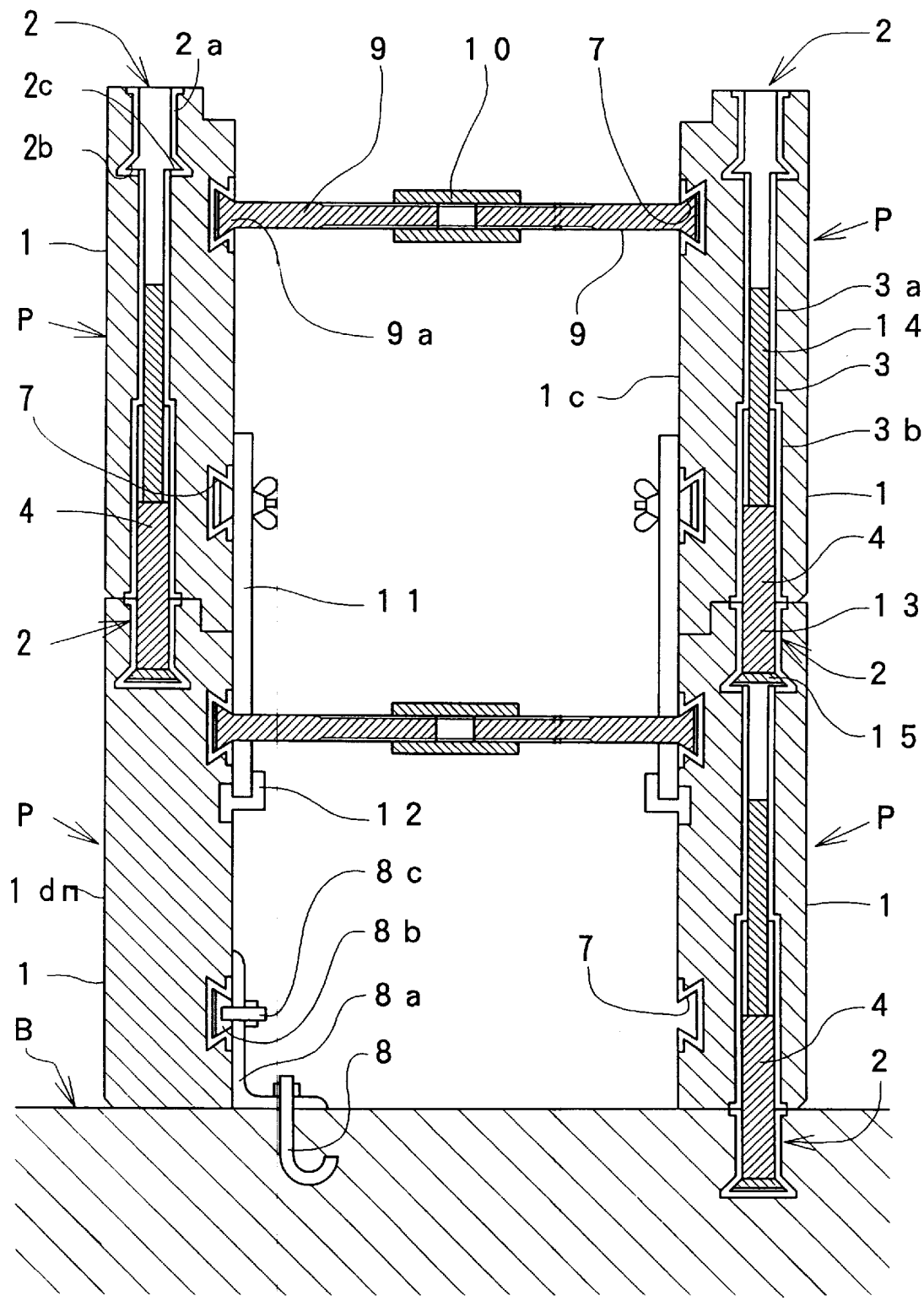
FIG. 3 is a vertical sectional view of the construction panels which are assembled.

A construction panel P shown in FIGS. 1 to 3 comprises a panel body 1 having a rectangular flat plate shape. The panel body 1 has an upper end surface 1a having concave jointing elements 2 which are disposed at two sections of the upper end surface 1a and extend to the right and left for jointing with an upper stage construction panel, and cylindrical bodies 3 which are embedded in the panel body 1 and extend from the bottom surfaces of the concave jointing elements 2 to the lower end surface of the panel body 1, and convex jointing elements 4 for jointing with a lower stage construction panel. A concave jointing element 5 and a convex jointing member 6 are respectively provided at the right and left end surfaces 1b of the panel body 1 for engaging with an opposing convex jointing member 6 and a concave jointing element 5 of the right and left construction panels P so as to connect with the right and left construction panels P. The concave jointing elements 2 may be provided along the entire surface thereof.

Concave jointing elements 7 are provided at the back surface 1c of the panel body 1 at the upper and lower portions thereof and extend to the right and left, and a concave stage portion 1d is formed on the back surface 1c of the panel body 1 at the upper edge thereof and a convex stage portion 1e is formed likewise on the lower edge thereof. The concave stage portion 1d and convex stage portion 1e are respectively formed for preventing concrete from leaking outside and for enhancing excellent transmission of stress between the upper and lower construction panels P when concrete is filled between the opposing construction panels, and they can be formed depending on a thickness of the panel body 1, as the need arises. The concave jointing element 5 and convex jointing member 6 for jointing the construction panels P, and the concave jointing elements 7 provided at the back surface 1c of the panel body 1 are respectively separately formed and they are embedded in the panel body 1 for enhancing accuracy of dimensions thereof. However, the concave jointing element 5, convex jointing member 6 and concave jointing elements 7 may be directly provided on the panel body 1, namely, the concave and convex surfaces corresponding thereto may be directly provided on the panel body 1.

As shown in FIG. 3, when the construction panels P are assembled, concrete is cast filled in a base B, and the concave jointing elements 2 are embedded in the base B or a base anchor 8 is embedded into the base B before or after concrete is filled in the base B. In this case, the convex stage portion 1e formed at the lower edge of the panel body 1 may be cut to be flat in advance as shown in FIG. 3 or a groove corresponding to the shape of the convex stage portion 1e may be defined in the base B. If the concave jointing elements 2 are embedded in the base B, the convex jointing elements 4 are mounted previously in the panel body 1. When the base anchor 8 is employed, an L-shaped fixing plate 8a is fixed to this top of the base anchor 8, and a tenon 8b in which a dovetail is engaged may be fixed to the L-shaped fixing plate 8a by an attaching bolt 8c using the concave jointing elements 7 provided at the back surface 1c of the panel body 1.

The right and left construction panels P are respectively jointed with each other by sliding the convex jointing member 4 of one construction panel P along the concave jointing element 5 of another construction panel P so as to engage the convex jointing member 6 in the concave jointing element 5. In the embodiment shown in these figures, the concave jointing element 5 and convex jointing member 6 are respectively provided at the right and left end surfaces of the panel body 1, but they may be provided at the back surface adjacent to the end edge of the panel body 1.

The jointing between the opposing construction panels P is performed using connecting rods 9 having tenons 9a at both ends which engage with each other in the concave jointing elements 7 provided at the back surface 1c of the panel body 1. Turn buckles 10 may be disposed at the middle portion of the connecting rods 9 for finely adjusting the interval between the opposing construction panels P.

After the first stage construction panel P is disposed, second and third stage panels are assembled like the first stage panel P. The upper and lower construction panels P are respectively jointed with each other by inserting the convex jointing elements 4 in the concave jointing elements 2 to hold the convex jointing elements 4 by the concave jointing elements 2.

Although the construction panels P are assembled in zigzag, namely, the joints at the right and left end edge of the construction panels P do not continue linearly, but the construction panels P may be assembled vertically in parallel with one another so that the joints thereof continue linearly, namely arranged in a straight direction or plane relative to each other. Further, the construction panels P may be assembled at random when the concave jointing elements 2 embedded in the upper end surface 1a of the panel body 1 extend to the right and left of the panel body 1 as shown in FIG. 1, or the convex jointing elements 4 are increased by the number corresponding to the concave jointing elements 2 which are embedded plurally in the narrow upper end surface 1a of the panel body 1.

Further, as shown in FIGS. 1 and 2, it is possible to prevent the concave jointing elements 2 and the convex jointing elements 4 from being broken by a bending moment or shearing force which is generated at the jointing boundaries of construction panels P providing attaching members 11 which bridge over the vertically jointed construction panels P. Still further, if the lower end of the attaching member 11 is supported by a supporting member 12, the supporting member 12 serves to restrain the deviation of the attaching member 11 when the stress is applied to each attaching member 11. Accordingly, the supporting member 12 is used as the need arises, and it is used when a large stress applies to the attaching member 11. The supporting member 12 is fixed to the wall surface of the panel body 1 by a bolt, an anchor, etc.

Upon completion of the assembling of the construction panels P, a filling material, e.g. concrete is filled between the opposing construction panels P so as to complete the construction of the construction panels P for use in a moat, an outer wall, an inner wall, a partition wall, a supporting wall, etc. The surface of the construction panel P may be omitted to decorate if a decorative layer is directly formed on the surface of the construction panel P in advance by the material of the panel body 1 or if the decorative layer is formed on the surface 1d of the construction pane P by sticking a decorative plate made of a different material onto the surface 1d of the construction panel P.

Although a method of assembling the construction panels P is explained roughly, the concave jointing members 6 and the convex jointing elements 4 for connecting the upper and lower construction panels P will be now described in detail.

Referring to FIG. 3, the concave jointing elements 2 are embedded into the upper end surface 1a of the lower construction panel P. The concave jointing element 2 comprises a dovetail 2b which is formed by digging each panel body 1 from the upper end surface 1a, and side walls 2a provided between the dovetails 2b and open ends. On the other hand, the convex jointing elements 4 are held inside the cylindrical bodies 3 which extend from the bottom surfaces 2c of the concave jointing elements 2 to the lower end surfaces of the panel body 1.

The cylindrical body 3 is divided into an upper portion 3a and a cylindrical lower portion 3b which is larger than the upper portion 3a, a body 13 of the convex jointing element 4 is accommodated into the cylindrical lower portion 3b. The inner width of the cylindrical lower portion 3b of the cylindrical body 3 is substantially the same as the interval of the side walls 2a of the concave jointing element 2. A shaft 14 penetrates the body 13 and a rotary holding member 15 is attached to the lower end of the shaft 14, and a recess such as a cross hole for turning a driver is defined in the shaft 14 at the upper end thereof.

As shown in FIG. 4(A), the rotary holding member 15 has a shape of a tenon, and has conical tables 15a about the shaft 14 at two sections. As shown in FIG. 4(B), the rotary holding member 15 is fixed to the body 13 at a screw portion 15c to be turned freely, and side surfaces 15b of the rotary holding member 15 which are narrow in width are flush with the side surface of the body 13.

A method of jointing the upper and lower construction panels P by the concave jointing element 2 and convex jointing element 4 are described with reference to FIG. 5.

In this example, a nut 16 to be screwed into a head of the shaft 14 is employed, and a pin or screw portion 15d is inserted into shaft 14 as a fixing member 17. A nut or a plate may be fixed to shaft 14 instead of the pin. First of all, an upper stage panel Pb is placed on a lower stage panel Pa. Then, the nut 16 positioned in the concave jointing element 2 of the upper stage panel Pb is pressed downward toward bottom surface 20c of the concave jointing element 2 so that the body 13 is inserted into the concave jointing element 2 of the lower stage panel Pa. In this state, the shaft 14 is turned 90 degrees to turn the rotary holding member 15, then the shaft 14 is raised by turning the nut 16, thereafter the concave jointing element 2 of the lower stage panel Pa and the convex jointing element 4 of the upper stage panel Pb are fastened. Meanwhile, when the fixing member 17 is fixed, a ring spring is provided in a space between the shaft 14 and body 13 instead of providing the screw portion 15c to the rotary holding member 15, so that the rotary holding member 15 can be turned smoothly.

Further, if the side walls 2a are jointed by bolts at some sections to prevent the panel body 1 from being deformed at the open end thereof before the concave jointing element 2 are embedded into the panel body 1, the body 13 can withstand a large stress when the latter applies to the former.

Figure 4:
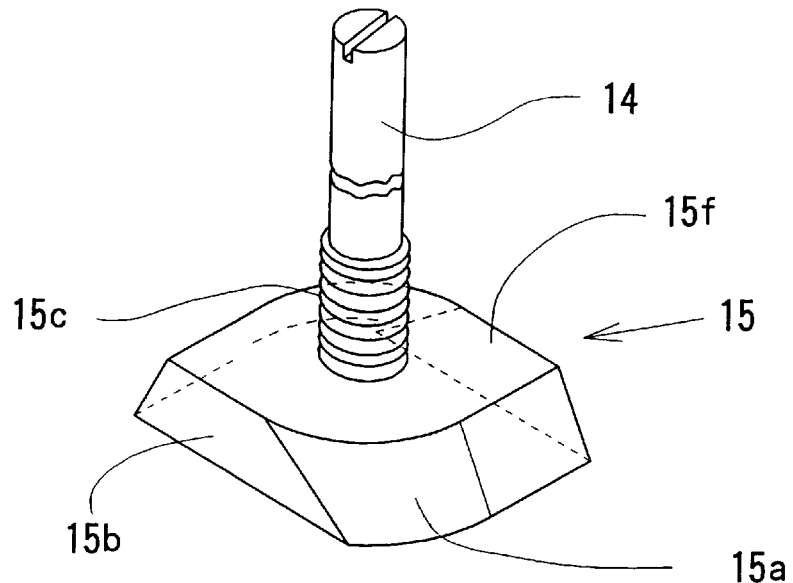
FIG. 4(A) and FIG. 4(B) are respectively perspective views of one example of convex jointing members.
Figure 4:
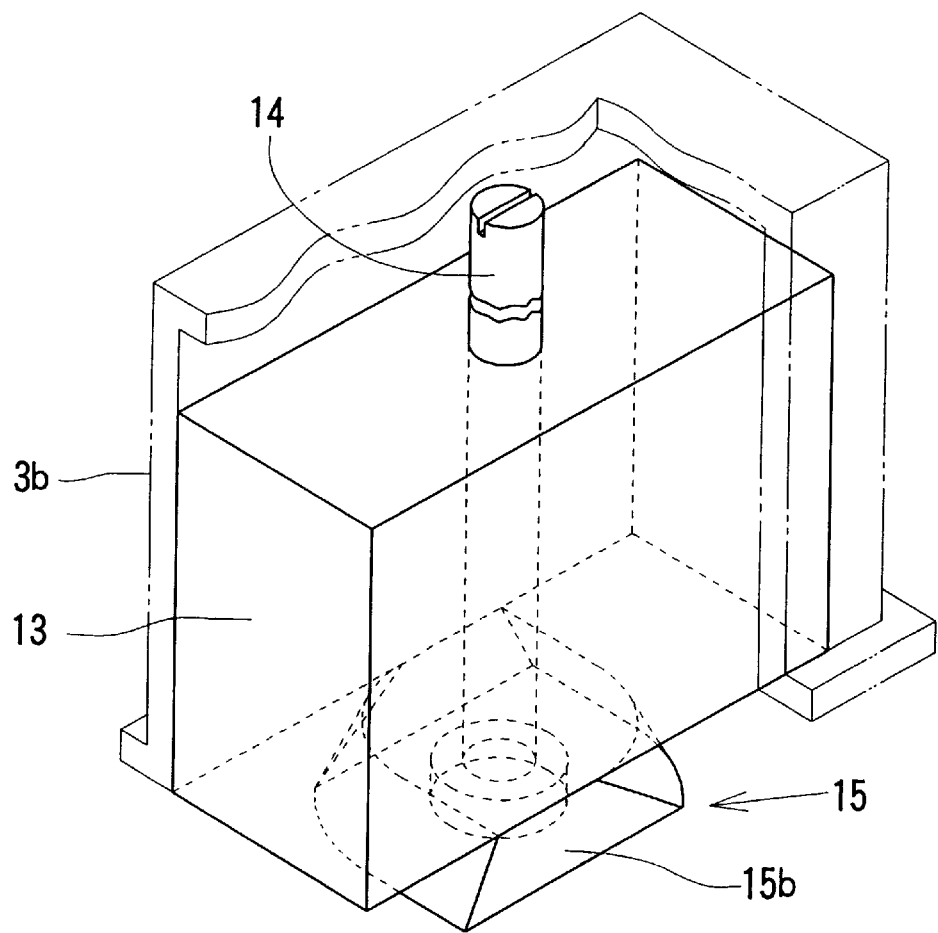
Figure 10:
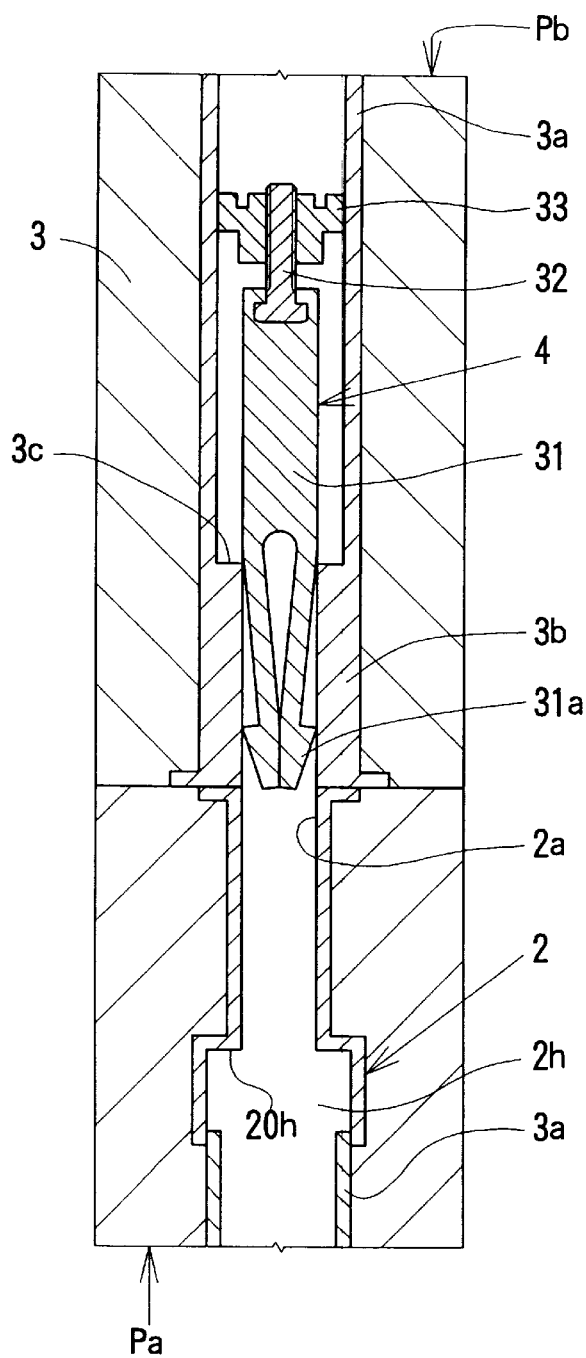
Figure 10:
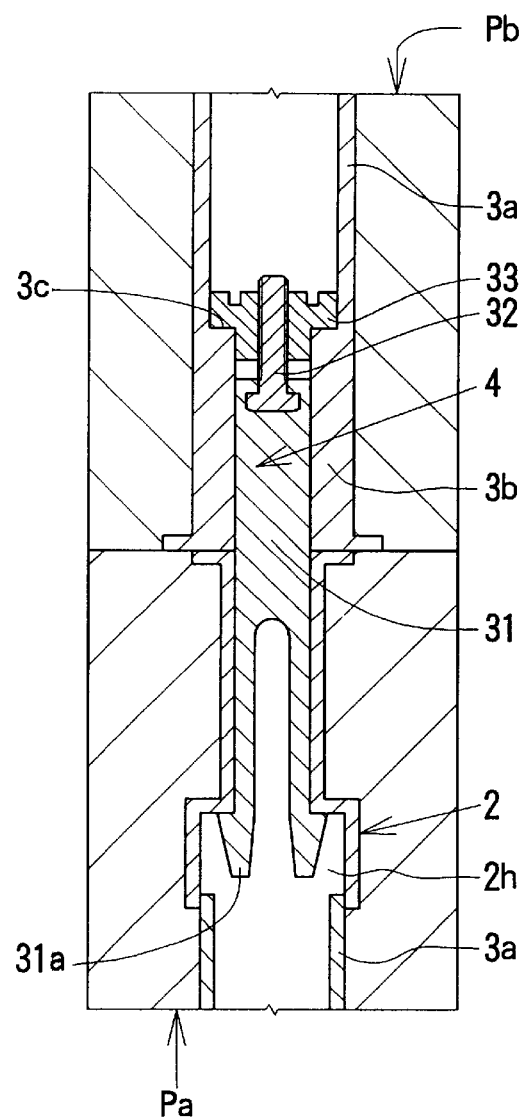

In the previous embodiment, a gap may be defined between the body 13 of the convex jointing element 4 and the cylindrical lower portion 3b of the cylindrical body 3, thereby absorbing the positional deviation which occurs when the concave jointing element 2 and cylindrical lower portion 3b are embedded into the panel body 1. Further, the shape of the body 13 may be columnar or cylindroid as well as parallel piped. If the body 13 is columnar or cylindroid, the cylindrical lower portion 3b may have a shape corresponding to the body 13. Further, the shape of the rotary holding member 15 may be of any shape as well as the shape as shown in FIG. 4 (A). In this case, the concave jointing element 2 needs to have a shape corresponding to the shape of the rotary holding member 15. For example, a conical table 15a may be provided, as the need arises while the concave jointing element 2 is formed of a box shape as shown in FIG. 10, and a top 20h of the concave jointing element 2 and the top surface 15f of the rotary holding member 15 shown in FIG. 4(A) contact each other. Still further, the cylindrical lower portion 3b and body 13 are respectively formed of parallel bodies which extend to the right and left, and the rotary holding me 15 and shaft 14 and cylindrical lower portion 3b corresponding to the rotary holding member 15 may be provided at plural sections. The rotary holding member 15 may be formed directly on the panel body 1 depending on the shape of the cylindrical lower portion 3b without using separately manufactured product.

In the embodiment shown in FIGS. 6(A) and (B), the convex jointing element 4 comprises of a head 20, an shaft portion 21, a body portion 22, and a spring 23 which is attached to the head 20 which are all columnar. The outer peripheral surface of the body portion 22 and the side wall 2a of the concave jointing element 2 have male screw 22a and screw 2e respectively screwed therein. Meanwhile, the screw 2e of the tide wall 2a is different from a female screw provided on the inner surface of a normally circular hole, and it extends vertically on the paper surface of the drawing. Accordingly, crests of male screws 22a provided in the body portion 22 merely partially contact the screws 2e of the side walls 2a. Accordingly, it is preferable that the heights of the crests of and the depths of grooves of the screws 2e and the male screws 22a be large.

The convex jointing element 4 is held inside the cylindrical lower portion 3b of the spring 23 before construction panels P jointed as shown in FIG. 6 (A). A driver having a long shaft is inserted through the open end of the cylindrical body 3 so as to insert in the recess 20a of the head 20 of the convex jointing element 4, thereafter the driver pushes the convex jointing elements 4 until the male screw 22a of the head 20 contacts the screw 2e of the concave jointing element 2. Further, the convex jointing element 4 is turned so as to screw the male screw 22a and screw 2e until the lower surface 20b of the head 20 contacts a shoulder 3c of the cylindrical lower portion 3b so that the concave jointing element 2 is engaged with the convex jointing element 4. As a result, the lower stage panel Pa and upper stage panel Pb are jointed with each other as shown in FIG. 6(B).

In this embodiment, upon completion of the engagement between the concave jointing element 2 and the convex jointing element 4, there is a case that gaps 4x and 4y are defined between the shaft portion 21 of the convex jointing element 4 and the cylindrical lower portion 3b. In this case, concave jointing element 2 and convex jointing element 4 respectively embedded into lower stage panel Pa and upper stage panel Pb can be adjusted even if they are slightly deviated in position at the front and back of the lower stage panel Pa and upper stage panel Pb so that concave jointing element 2 and convex jointing element 4 engage with each other without any obstruction.

Further, as mentioned above, the screw threads 2e of the side wall 2a of the concave jointing element 2 extend vertically on the surface of the drawing, namely they extend to the right and left of the construction panel P so that the deviation involved in the embedding of the convex jointing element 4 in the construction panel P to the right and left is not at all obstructed. Further, it is possible to engage the convex jointing element 4 into one concave jointing element 2.

Still further, according to this embodiment, the concave jointing element 2 may be cylindrical and the screw threads 2e provided in the side walls 2a may be formed of ordinary female screws. In this case, although the cost of material of the female screws may be reduced, the gaps 4x and 4y of the construction panel P at the right and left may be slightly defined if the construction panels P are jointed with each other as shown in FIG. 6(B) so that the positioning of the concave jointing members and the convex jointing members need to be correctly performed when they are manufactured in the mill.

FIG. 7 shows another embodiment. FIG. 7(A) is a sectional view showing a state where the upper stage panel Pb is placed on the lower stage panel Pa wherein the concave jointing element 2 and convex jointing element 4 are not engaged with each other. From this state, the driver, etc. inserted in the recess 14b is turned after the shaft 14 is pressed by an operation member such as a driver to push down convex jointing element 4 so as to permit nail screw threads 14a provided at the upper portion of shaft 14 to contact the screw threads 3d provided at the cylindrical upper portion 3a. As a result, a concave/convex portion 25a provided at the lower portion of a body 25 of the convex jointing element 4 engages with a concave convex portion 2f provided on the side wall 2a of concave jointing element 2 so that the concave jointing element 2 and convex jointing element 4 engage with each other. FIG. 7(B) shows a state where the lower stage panel Pa and upper stage panel Pb are jointed with each other. At this time, it is preferable that at least one of concave/convex portions 25a and 2f may be formed of an elastic body.

FIG. 8 shows another embodiment. As shown in FIG. 8(A), the convex jointing element 4 comprises a body 26 accommodated in the cylindrical lower portion 3b of cylindrical body 3 and a shaft 27 which is attached to the body 26 so as to be turned freely. A screw provided on the outer periphery of the shaft 27 is screwed into a screw provided on the inner periphery of the cylindrical upper portion 3a of cylindrical body 3 so hat they are held inside the cylindrical body 3. Although the body 26 has a hollow portion 26a at the lower half portion thereof since it is columnar and light weighted, it may be formed of a solid body having no hollow portion. Recesses 26b are defined on the body 26 at the opposing outer surfaces thereof.

Meanwhile, the concave jointing element 2 has a hollow portion for receiving a lower half portion of the body 26 of the convex jointing element 4 and has a box shaped body having the open end of cylindrical body 3 at the bottom surface thereof and which is embedded into upper end surface 1a of the panel body 1. The concave jointing element 2 has an elastically deformable protrusion 28 which protrudes from the inner surface of the box-shaped body at a position corresponding of the recesses 26b of the body 26 when the convex jointing element 4 is inserted into the concave jointing element 2 in a predetermined position.

Accordingly, the driver is inserted from the open end of the cylindrical body 3 of the upper stage panel Pb after the upper stage panel Pb is placed on the lower stage panel Pa, then shaft 27 is turned to lower the convex jointing element 4 so as to engage the lower half portion of the body 26 into the hollow portion of the concave jointing element 2 of the lower stage panel Pa, thereby permitting the protrusion 28 to engage in the recess 26b. Subsequently, the shaft 27 is reversely turned by the driver to slightly raise the body 26 so that the concave jointing element 2 and convex jointing element 4 respectively firmly engage with each other, thereby jointing the lower stage panel Pa and upper stage panel Pb as shown in FIG. 8(B).

In this example, since the body 26 of the convex jointing element 4 contacts the side surface of the concave jointing element 2 and the inner surface of cylindrical lower portion 3b at a jointing boundary 29, and the protrusion 28 of the concave jointing element 2 and the recesses 26b of the body 26 inserted into the concave jointing element 2 are disposed to extend in the longitudinal direction of the panel body 1, the lower stage panel Pa and upper stage panel Pb which are jointed with each other by the concave jointing element 2 and the convex jointing element 4 operate effectively when they receive positive and negative moments at the jointing boundary 29.

In the embodiment as shown in FIG. 9, the recess 26b of the concave jointing element 2 and the protrusion 28 of the body 26 of the convex jointing element 4 engage with each other and the lower stage panel Pa and upper stage panel Pb are disposed to extend in the width direction thereof in the manner opposite to the embodiment shown in FIG. 8. However, also in this embodiment, since the concave jointing element 2 and the convex jointing element 4 engage with each other at the front and back of the panel body 1, they can effectively operate upon reception of the positive and negative moments at the jointing boundary. Further, the protrusion 28 of the concave jointing element 2 may be formed of a separately prepared steel spring. The recesses 26b corresponding to the protrusion 28 provided in either of the concave jointing members and convex jointing members may be the concave/convex portions 25a and 2f as shown in FIG. 7.

The concave jointing element 2 and the convex jointing element 4 may be formed of a synthetic resin, iron, nonferrous metal, ceramics, rubber, etc. Carbon fiber or glass fiber may be added for reinforcing the concave jointing element 2 and convex jointing element 4 or the fiber per se is hardened by a resin or a compound material will be used. Further, after the requisite portions are manufactured by a separate material, they are integrated with the concave jointing element 2 and convex jointing element 4 by an embedding means. Further, concave and convex portions such as a collar, a protrusion, a recess or a groove may be provided on the concave jointing element 2 and the outer periphery of the cylindrical body 3 so as to firmly joint with the material of the panel body 1 when they are embedded in the panel body 1.

FIG. 10 shows a different embodiment. The convex jointing element 4 in this embodiment is divided into two parallel legs at the lower portion of the body 31, and each protrusion 31a protrudes outward from the lower end of each leg. A bolt-shaped junction shaft 32 is fixed to the upper portion of the body 31, and a head 33 is screwed into the junction shaft 32. Since two legs are pressed into the cylindrical lower portion 3b of the cylindrical body 3 inner dimensions of which are small against the resiliency thereof so that the convex jointing element 4 is held inside the cylindrical body 3 as shown in FIG. 10(A).

The operation member is inserted through the open end of the cylindrical body 3 of the upper stage panel Pb to lower the convex jointing element 4 after the upper stage panel Pb is placed on the lower stage panel Pa, thereby permitting the head 33 to contact the shoulder 3c of the cylindrical lower portion 3b. At this time, each protrusion 31a of the leg of the body 31 is released in the recess 2h of the concave jointing element 2. However, in this state, a gap is defined between each protrusion 31a and recess 2h. Then, when the head 33 of the convex jointing element 4 is turned by the operation member, the body 31 is raised so that each protrusion 31a is brought into contact with the upper wall 20h of the recess 2h as shown in FIG. 10(B). In such a manner, the concave jointing element 2 and convex jointing element 4 engage with each other, so that the lower stage panel Pa and upper stage panel Pb are jointed with each other.

In the embodiment of FIGS. 10(A) and (B), the rising of the body of the convex jointing element 4 is performed by turning the shaft of the head 33, but it can be performed by the following embodiment.

Figure 11A:
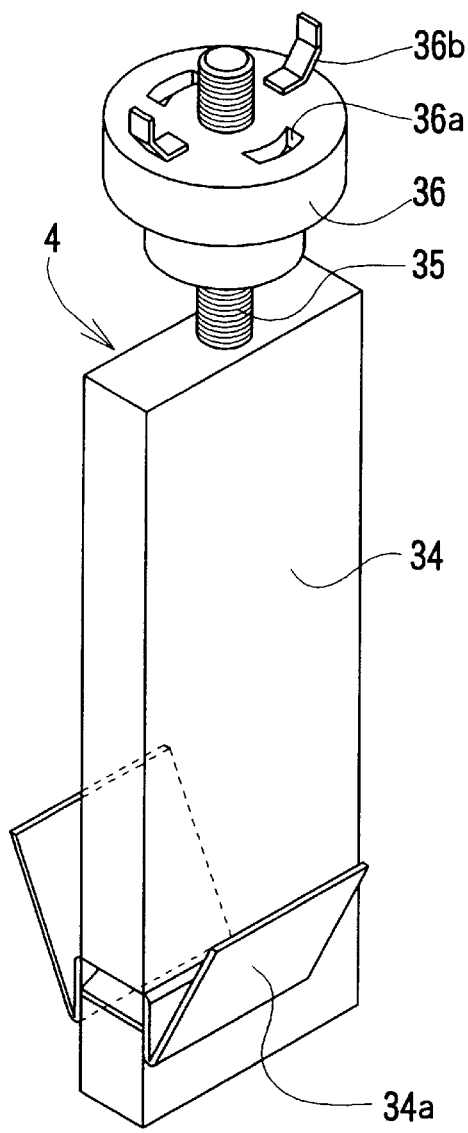
Figure 11B:
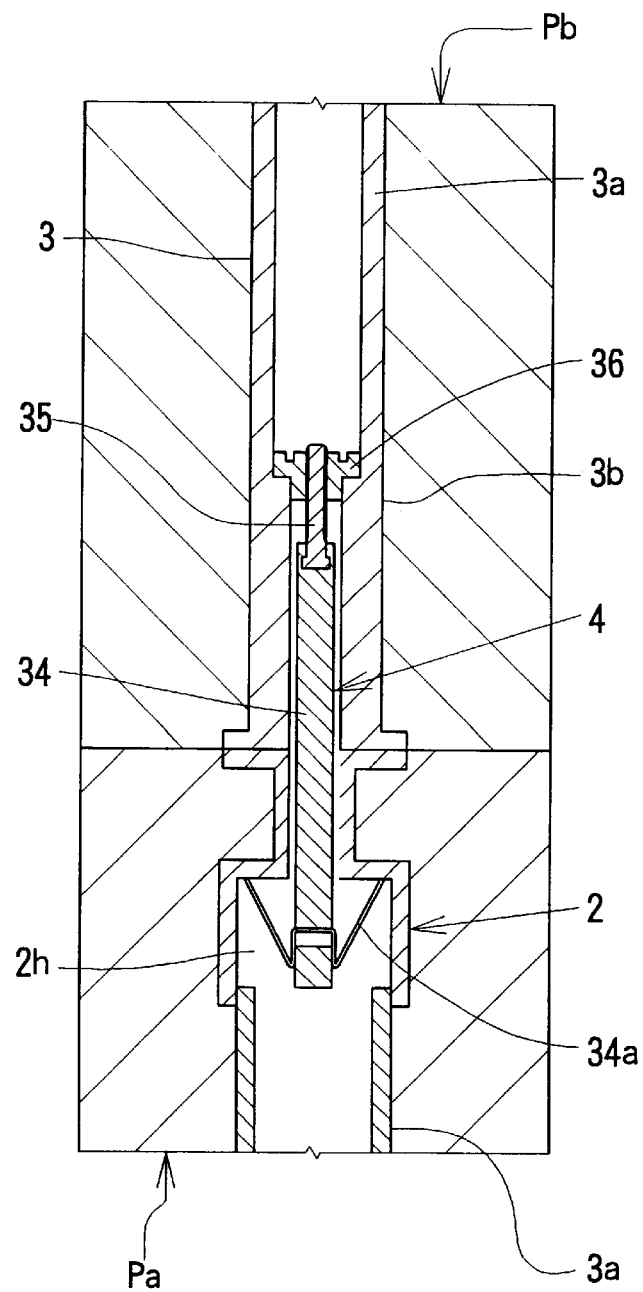

In the embodiment of FIGS. 11(A) and (B), a bolt-shaped junction shaft 35 is fixed to the upper portion of the body 34 and a head 36 is screwed into the junction shaft 35. A wing-shaped holding spring 34a is attached to the lower portion of the body 34. The holding spring 34a holds the convex jointing element 4 inside the cylindrical body 3 while the wing thereof is folded inside the cylindrical body 3. In the case of jointing between the lower stage panel Pa and upper stage panel Pb, when the convex jointing element 4 is pushed downward to permit the holding spring 34a to be inserted into the recess 2h of the concave jointing element 2 so that the holding spring 34a is released to spread its wing as shown in FIG. 11(B). Successively, when the operation member is turned while it is inserted in an operating hole 36a of the head 36 of the convex jointing element 4, the body 34 is raised so that the tip end of the holding spring 34a contacts the upper wall of recess 2h of the concave jointing element 2. When the body 34 is raised further by a predetermined amount, the concave jointing element 2 and convex jointing element 4 engage with each other so that the lower stage panel Pa and upper stage panel Pb are jointed with each other.

As mentioned above, before the panels are jointed with each other, the convex jointing element 4 is held inside the cylindrical body 3 by the resiliency of the holding spring 34a of the body 34. However, it is preferable that a spring 36b be attached to the head 36 to press the inner surface of the cylindrical body 3 to prevent the lower portion of body 34 from protruding through the panel body 1 as shown in FIG. 11(A). This may be provided in other embodiments, as the need arises. Shapes of the jointing member and convex jointing member employed by the present invention are not limited to those in the previous embodiments but may be of various ones.

Figure 12:
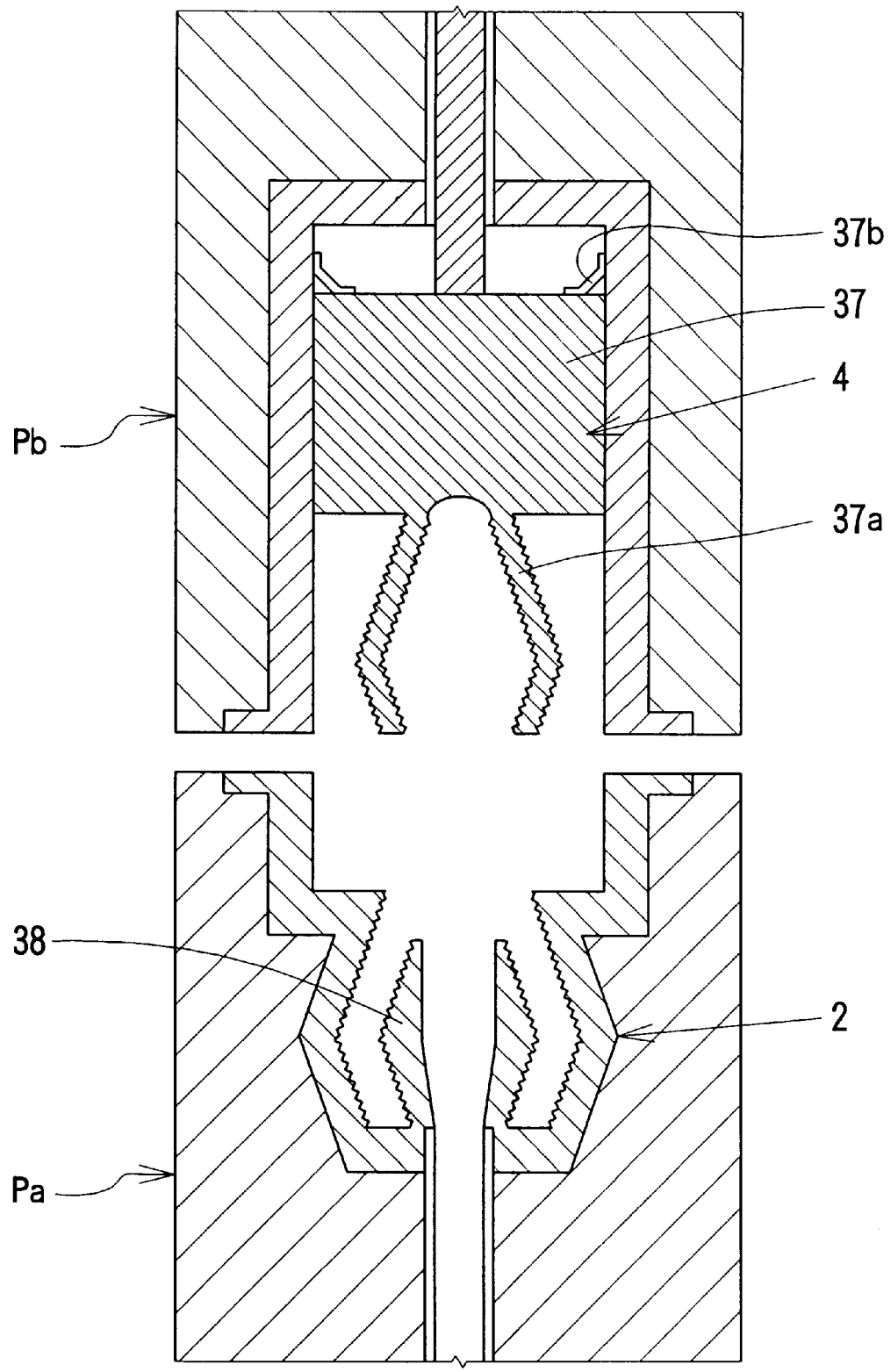

In the embodiment in FIG. 12, forked leg 37a provided at the lower portion of a body 37 of the convex jointing element 4 is respectively bent inward at the tip end thereof, and a protrusion 38 of the concave jointing element 2 has a recessed shape toward the bottom corresponding to the shape of the forked leg 37a. Holding hooks are respectively formed at the inner and outer surfaces of the forked leg 37a, outer surface of the protrusion 38 and inner surface of the concave jointing element 2 so as to enlarge the engaging area between the concave jointing element 2 and the convex jointing element 4, thereby enforcing the engaging force thereof. Further, in this embodiment, a spring 37b for preventing deviation is attached to the upper portion of the body 37 of the convex jointing element 4.

Figure 13:
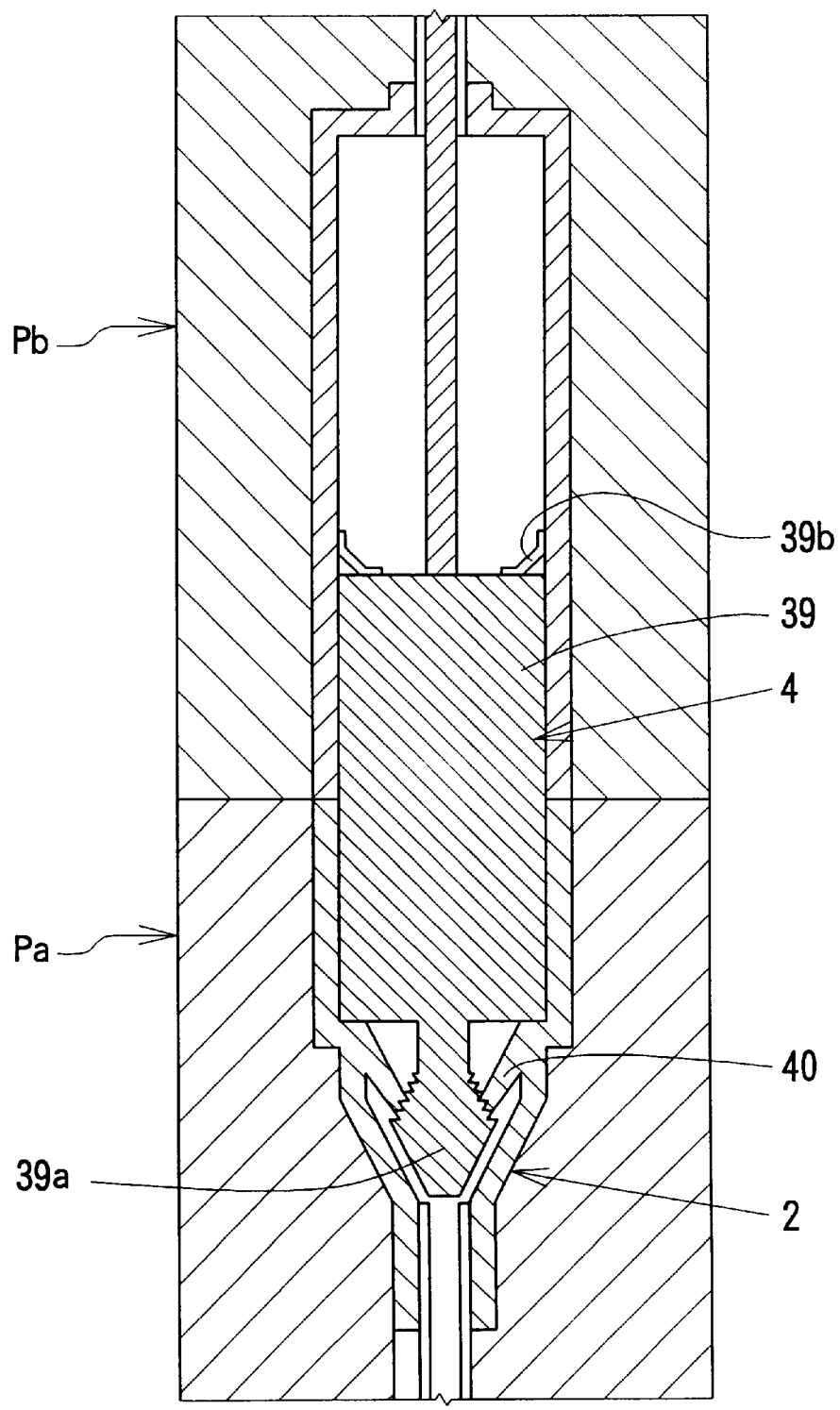

In the embodiment shown in FIG. 13, an expansion portion 39a is provided under a body 39 of the convex jointing element 4 and a protrusion 40 is provided in the hollow portion of the concave jointing element 2 so that the concave jointing element 2 and convex jointing element 4 engage with each other when holding hooks formed on the inclined surface of the expansion portion 39a and the tip end of the protrusion 40 mesh with each other. Further, also in this embodiment, a spring 39b for preventing deviation is attached to the upper portion of the body 39 of the convex jointing element 4.

Figure 14:
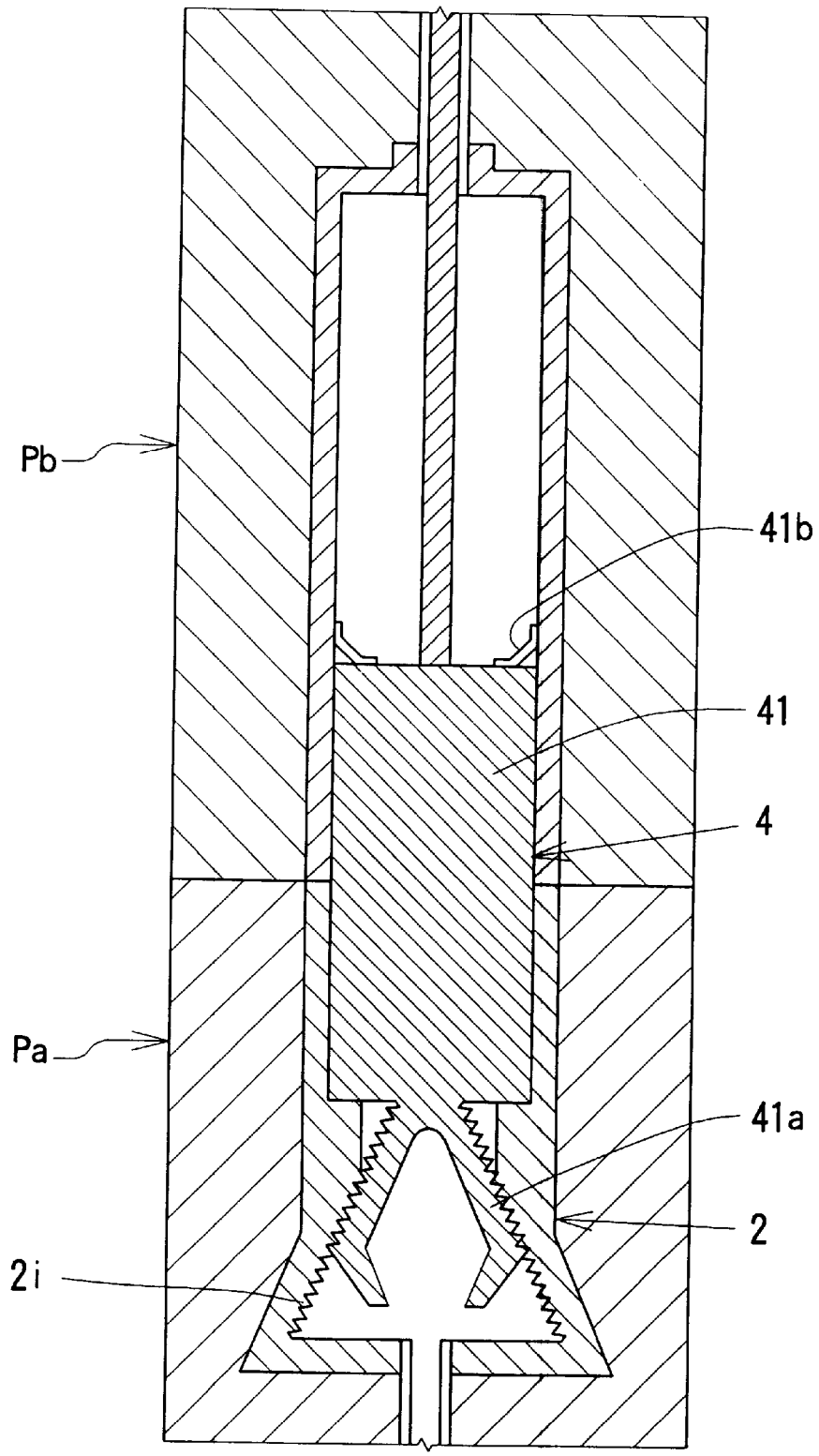

In the embodiment shown in FIG. 14, the hollow portion of the concave jointing element 2 has a dovetail shape, and a holding hook 2i provided at the inclined surface thereof which is enlarged toward the bottom surface thereof and another holding hook provided at the outer surface of a forked leg 41a provided at the lower portion of a body 41 of the convex jointing element 4 mesh with each other, so that the convex jointing element 4 engages with the concave jointing element 2. Also in this embodiment, a spring 41b for preventing deviation is attached at the upper portion of the body 41 of the convex jointing element 4.

Figure 15A:
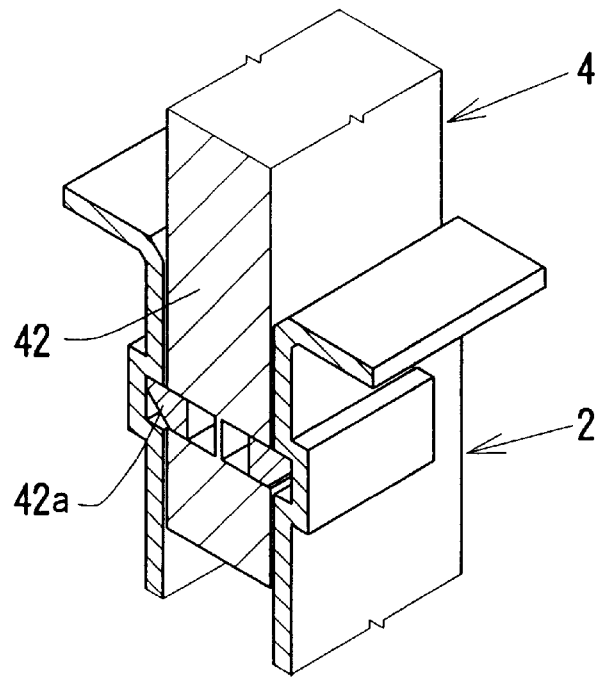
Figure 15B:
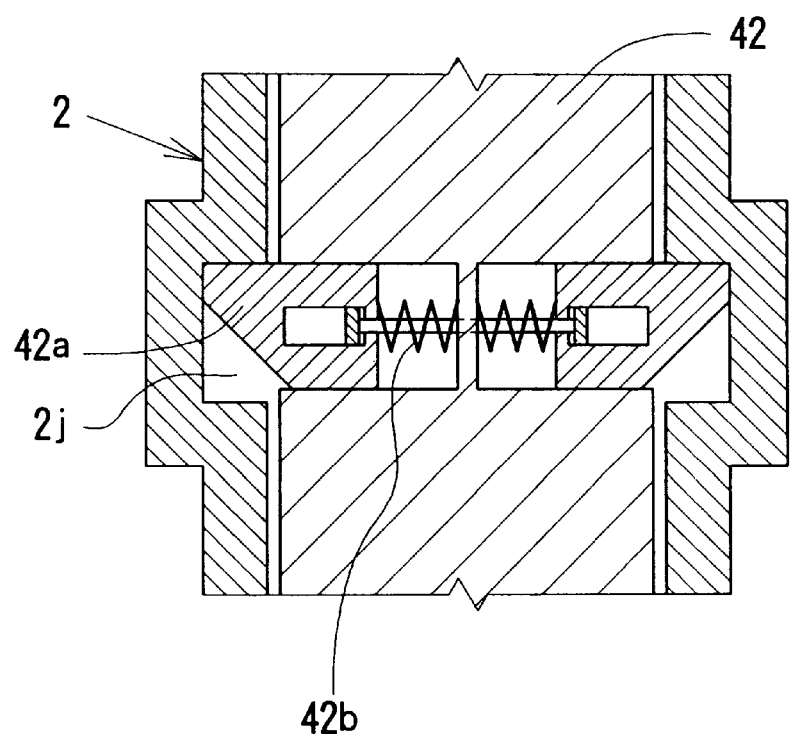

In the embodiment shown in FIGS. 15(A) and (B), a protrusion 42a incorporated into a lower portion of a body 42 of the convex jointing element 4 is put into a recess 2j of the concave jointing element 2 by the resiliency of a spring 42b so that the concave jointing element 2 and convex jointing element 4 engage with each other.

In the embodiment of FIGS. 16(A) and (B), a wedge-shaped holding hole 43a penetrating a body 43 is defined at the upper portion of the body 43 of the convex jointing element 4. At least the lower portion of the body 43 is made of an elastic material and it is divided into two legs 43c by a cut 43b. Outwardly protruding protrusions are provided on each leg 43c, and each leg 43c is held in the lower portion 3b of the cylindrical body 3 in a state where each leg 43c is contracted. A hollow portion is defined in the concave jointing element 2 for receiving the lower portion of the body 43 of the convex jointing element 4 while it is released or spread at the lower portion thereof.

The upper stage panel Pb is placed on the lower stage panel Pa, and an operation member is inserted from an open end of the cylindrical body 3 of the upper stage panel Pb to lower a shaft 44 so that the legs 43c of the body 43 of the convex jointing element 4 are released or spread in the hollow portion of the concave jointing element 2, and the outwardly protruding protrusions engage in the recess of the concave jointing element 2, as shown in FIG. 16(B).

Although the concave jointing element 2 and convex jointing element 4 engage with each other in this state, the convex jointing element 4 and the upper stage panel Pb do not engage with each other. Accordingly, a wedge-shaped through hole 45 defined in the panel body and the holding hole 43a defined in the body 43 are permitted to communicate with each other, then a wedge 46 is inserted into the communicated holes so that the lower stage panel Pa and upper stage panel Pb are jointed with each other.

In this embodiment, the shape of each leg 43c of the body 43 of the convex jointing element 4 is determined by the elasticity of a material of the body 43, and also the shape of the hollow portion of the concave jointing element 2 is determined by the elasticity of the material of the body 43. The cut 43b may be omitted depending on the material of the body 43.

Figure 16:
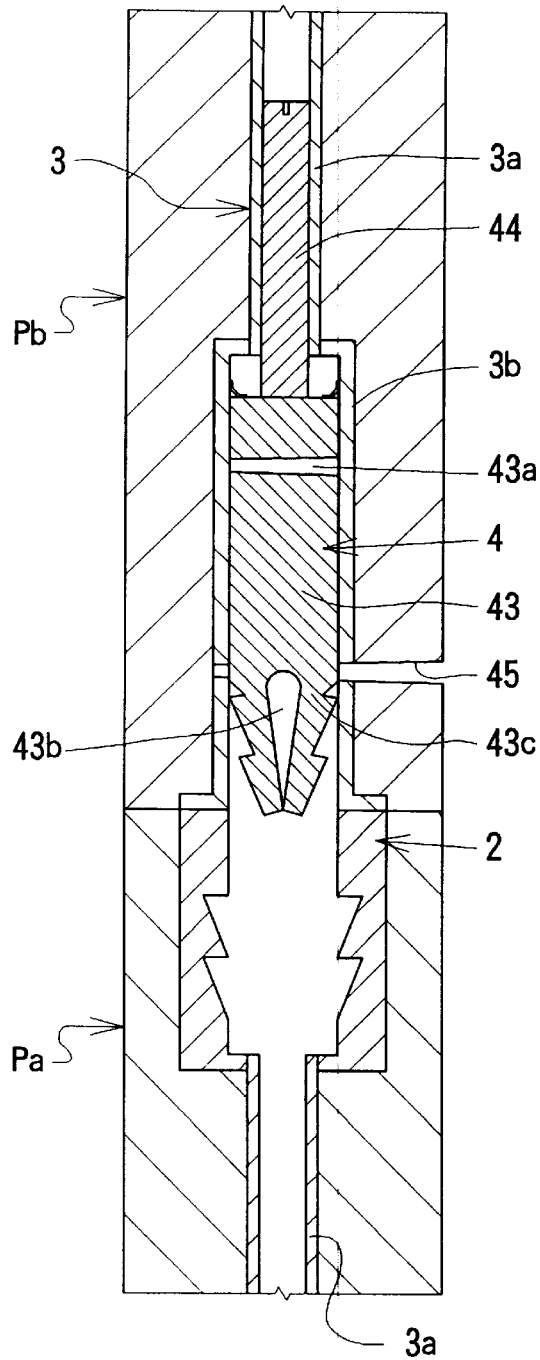
Figure 16:
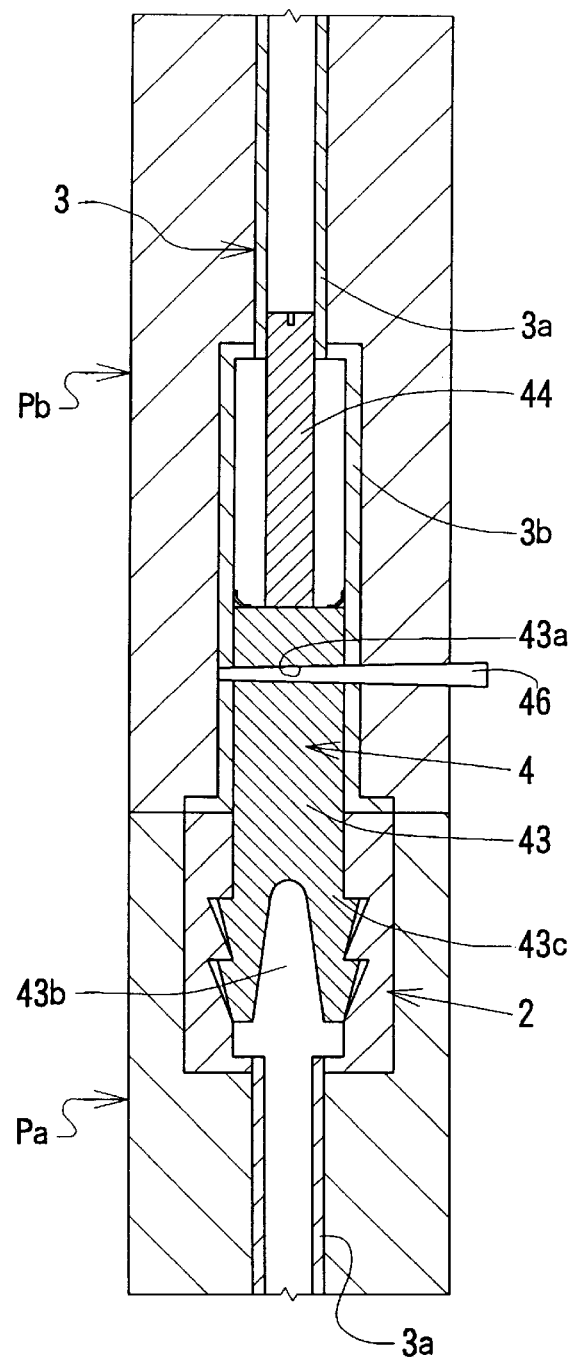
Figure 17:
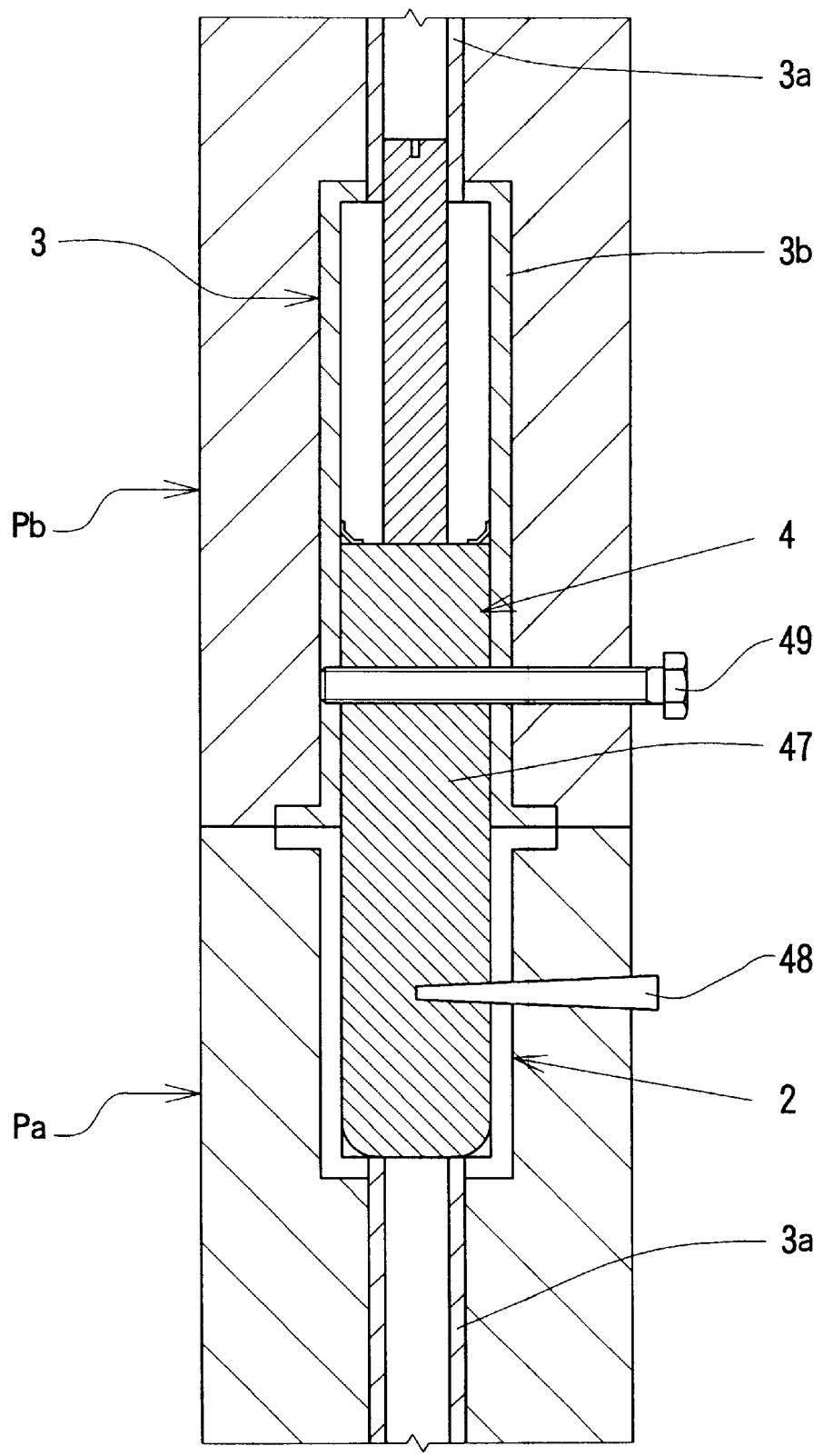

In the embodiment shown in FIG. 17 which is similar to the previous embodiment in FIGS. 16(A) and (B), a body 47 of the convex jointing element 4 engages in the concave jointing element 2, but the convex jointing element 4 and concave jointing element 2 have no engaging means. Accordingly, the lower portion of the body 47 and the lower stage panel Pa engage with each other by inserting a wedge 48 which penetrates the concave jointing element 2 like the previous embodiment. Meanwhile, the upper portion of the body 47 and the upper stage panel Pb engage with each other by a bolt 49 which penetrates the lower portion 3b of the cylindrical body 3. The lower stage panel Pa and upper stage panel Pb are jointed with each other by way of the body 47 as set forth above.

The jointing between the opposing construction panels will be next described. The jointing between the opposing panels aims to design the concave jointing element 2 and convex jointing element 4 economically, and to maintain the interval between the opposing panels. This is different from the conventional method using the frameworks in that the panels are embedded under the ground and hence the connecting rods cannot be provided by penetrating the panels according to the present invention.

Accordingly, a first process of the method of jointing the construction panels of the present invention comprises providing the concave jointing elements 7 at the back surface 1c of the panel body 1 and engaging the tenons 9a fixed to both ends of the connecting rods 9 in the dovetails of the concave jointing elements 7, as explained with reference to FIGS. 1 to 3. Alternatively, the rotary holding member 15 as explained in FIG. 4 is employed at both ends of the connecting rods 9 and the construction may be carried out by the method shown in FIGS. 1 to 3.

Figure 18:
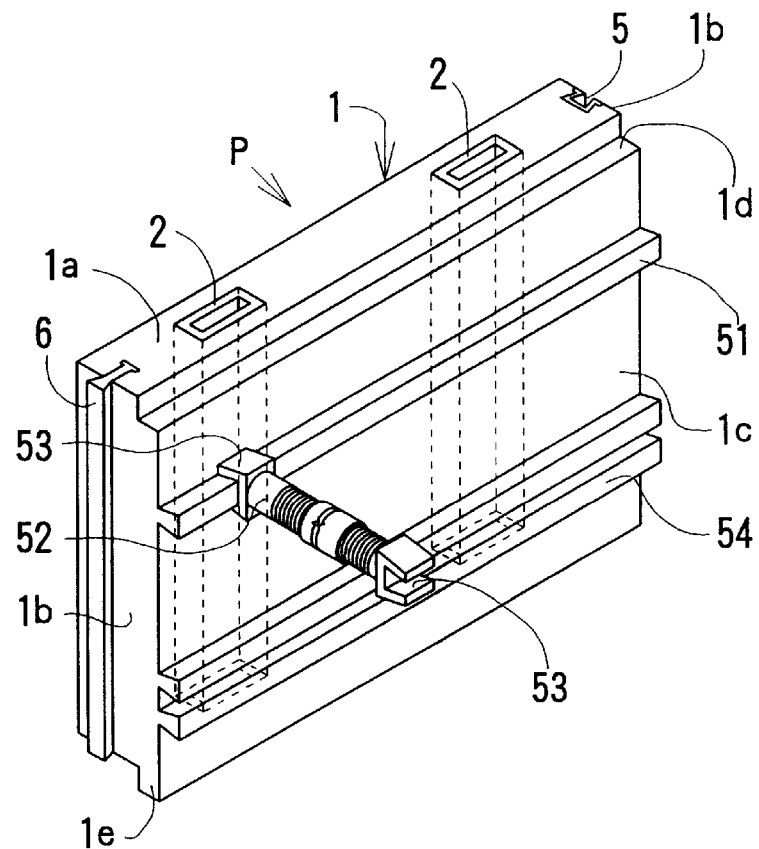
FIGS. 18 to 20 are perspective views for explaining a method of jointing opposing construction panels.

In the embodiment shown in FIG. 18, a convex jointing element 51 provided at the back surface 1c of the panel body 1 is utilized. Both ends of connecting rods 52 have concave jointing elements 53 respectively having dovetails. Also in this embodiment, it is also possible to use a concave jointing element 54 having a dovetail, as shown in the lower portion of FIG. 18.

Figure 19:
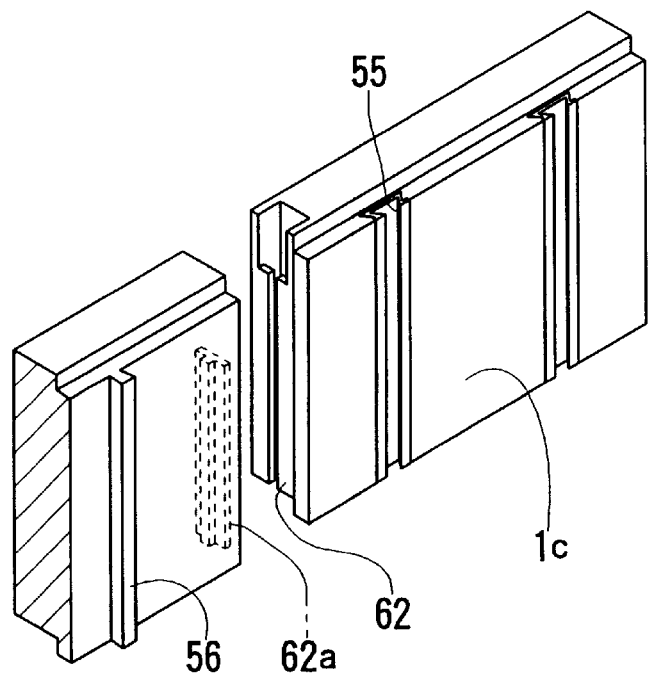

In the embodiment shown in FIG. 19, concave jointing members 55 which extend vertically are provided at the back surface 1c of the panel body 1. Also in this embodiment, it is possible to use convex jointing members 56 which protrude from the back surface 1c of the panel body 1 and extend vertically.

Figure 20:
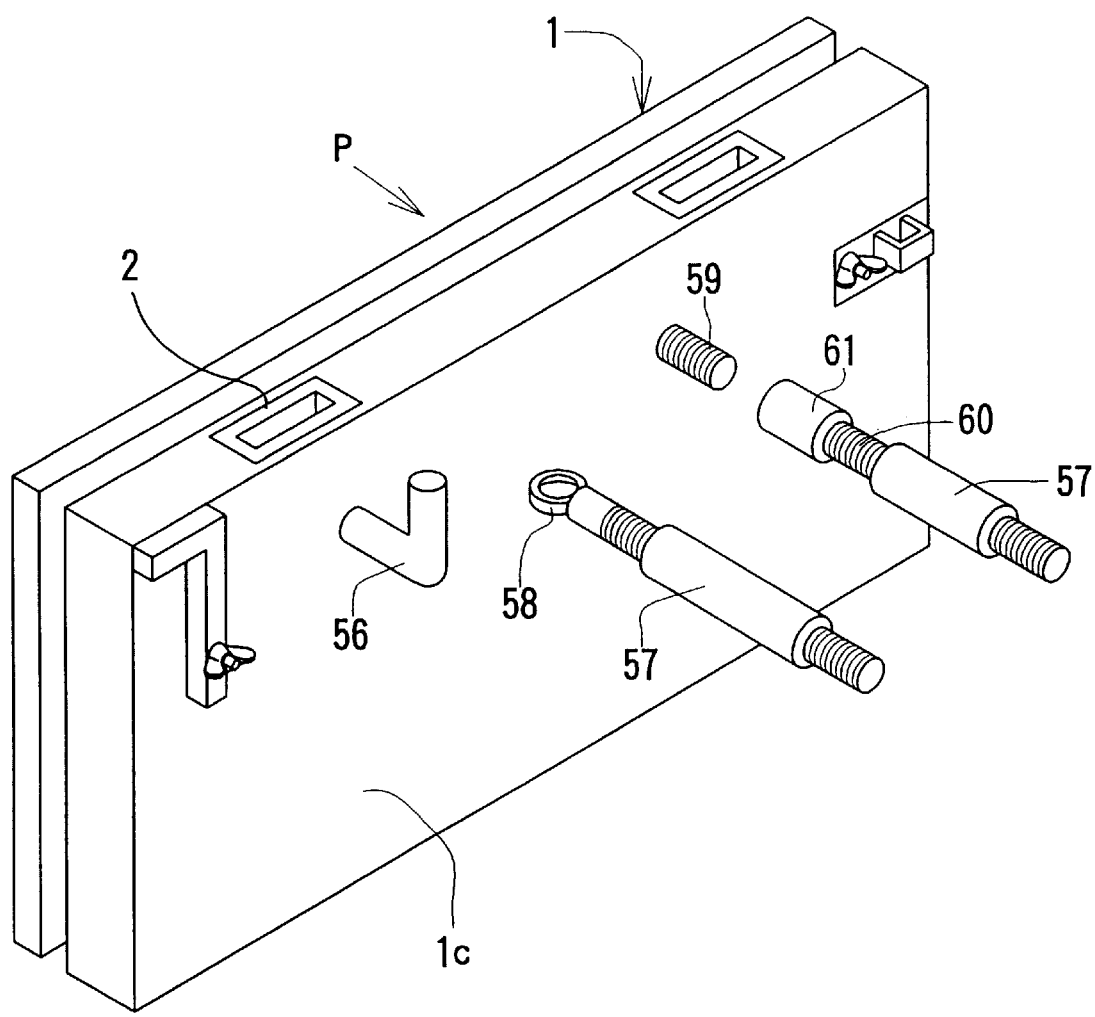

The jointing members may be respectively fixed type which is provided at proper positions of the back surface 1c of the panel body 1. An example of such jointing members is illustrated in FIG. 20. As shown in this figure, there are a method of engaging a ring-shaped connecting member 58 which is screwed into a turn buckle 57 serving as a jointing rod in an L-rod shaped jointing element 56 which is embedded into the back surface 1c of the panel body 1 and is exposed at the other end thereof, and another method of screwing a connecting member 61 which is screwed into both ends of a jointing rod 60 into a rod-shaped jointing element 59 which is screwed therearound and is embedded into the back surface 1c of the panel body 1.

A case where the jointing members for connecting the right and left construction panels P are provided on both lateral end surfaces of the panel body 1 has been already explained with reference to FIGS. 1 and 2. Although a groove-shaped concave jointing member 62 and a T-shaped convex jointing member 62a are respectively disclosed in FIG. 19 as the application of the above case, another example will be now described with reference to FIGS. 21(A) and (B). FIG. 21(A) shows a state where a tenon like that shown in FIG. 4 or a tenon 63 similar to that in FIG. 4 is inserted into a dovetail of the concave jointing member 7 embedded into the back surface 1c of the panel body 1, and a flat-plate shaped jointing element 65a having a hook portion at the tip end thereof is inserted into a wing bolt 64 of the tenon 63, and the wing bolt 64 is fastened by a wing nut 66. When the jointing element 65a is jointed with a jointing member 65b having the shape which is asymmetrical with the jointing element 65a, a hook portion of the jointing element 65a and that of the jointing element 65b engage with each other as shown in FIG. 21(B), wherein they do not come off even if tensile and compressive stress is applied thereto. In this embodiment, although the jointing members 65a and 65b are fixed to the panel body 1 by way of the concave jointing member 7, they may be fastened by the wing nut 66 by way of a bolt and a nut directly embedded into the panel body 1. However, it is preferable to use the bolt in the case of embedding nut. As a modified example, there are a crescent which is attached to the window by a metal fitting and a known hook jointing member.

Figure 21:
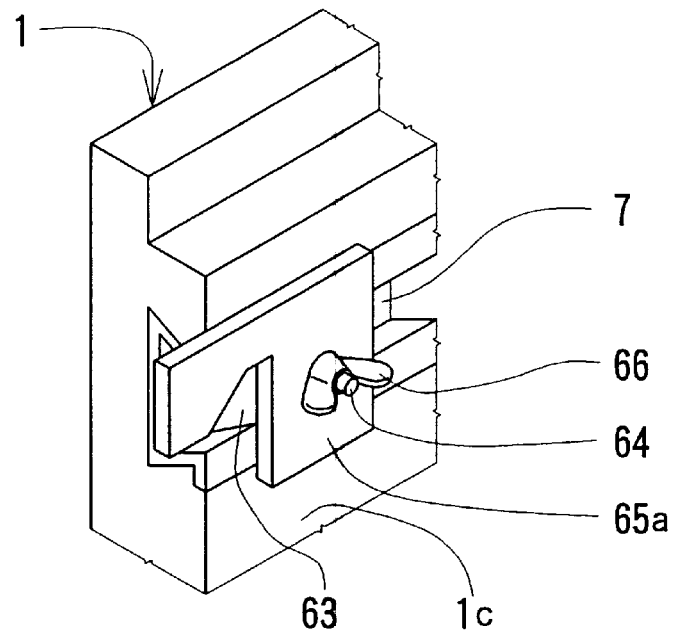
FIGS. 21(A)–21(B), and 22 are perspective views or explaining a method of jointing right and left construction panels.
Figure 21:
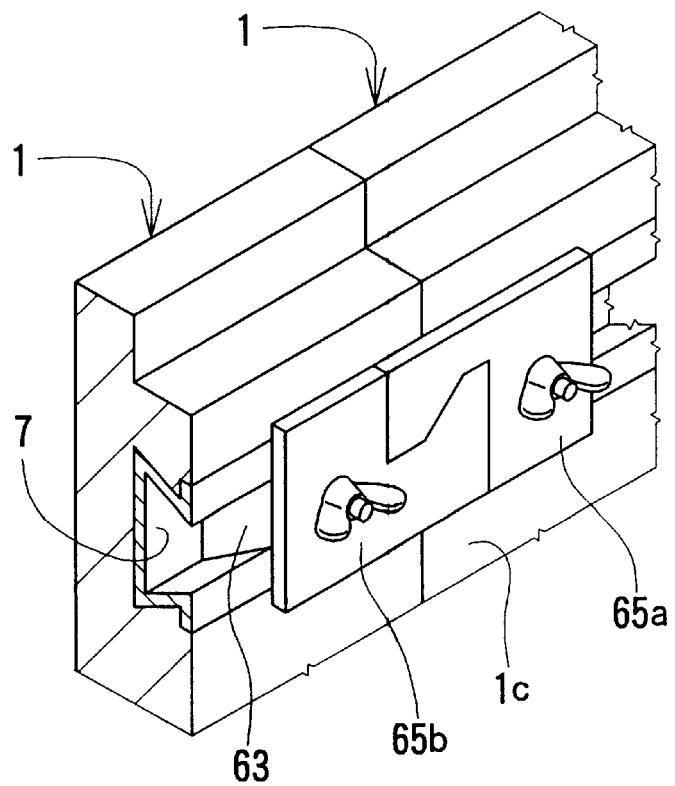
Figure 22:
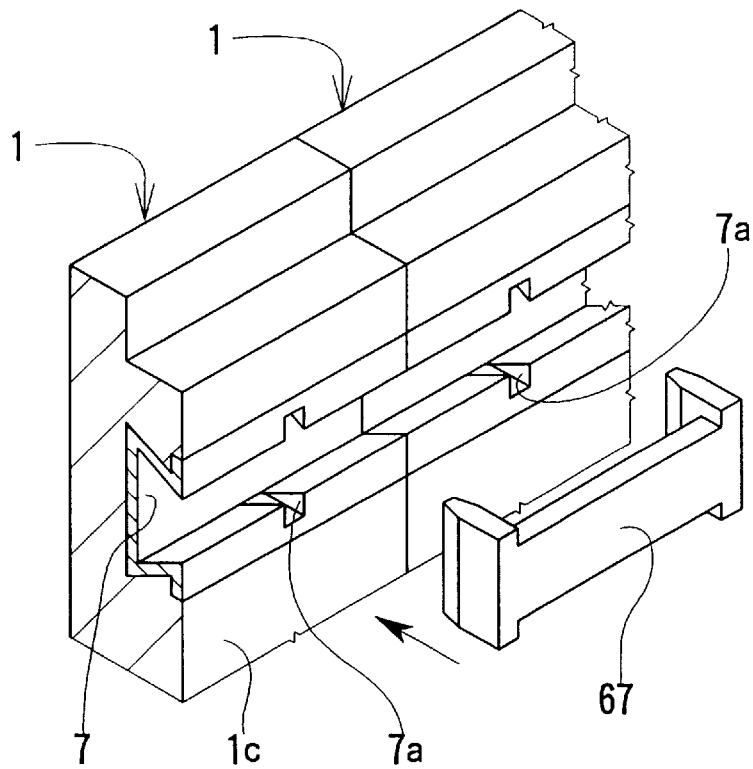

The embodiment shown in FIG. 22 comprises defining a cut 7a in the concave jointing member 7 provided at the back surface 1c of the panel body 1, inserting a clamp-shaped jointing member 67 into the cuts 7a of the panel bodies 1 and bridging thereover so as to joint the right and left construction panels P. Further, it comprises defining an insertion hole at the portion close to the center of the jointing member 67, and inserting a wing bolt 64 of a tenon 63 so as to be fastened by the wing nut 66 as shown in FIG. 21.

Figure 23:
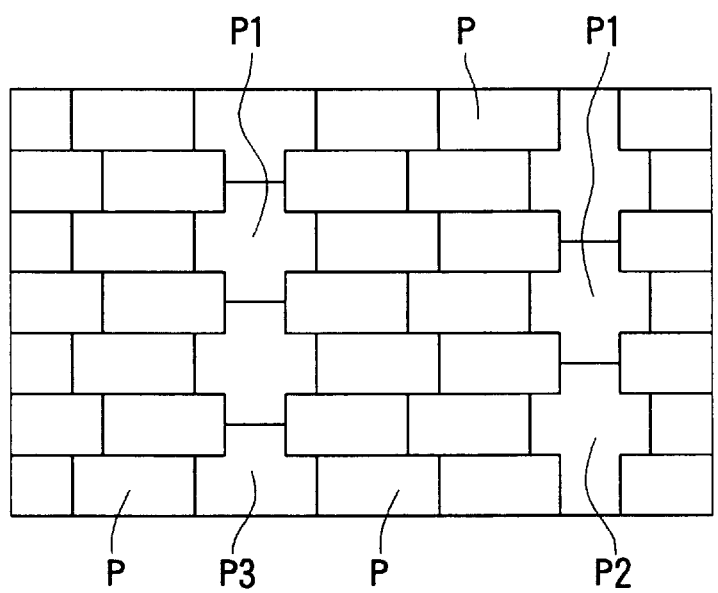
FIG. 23 is a view for explaining an assembling pattern according to another example.

Although it is explained that in the embodiments set forth above the panel body 1 is rectangular, it is not limited thereto, and it is not limited to the use for construction of panels having one kind of shape. The rectangular panel P may be replaced by a cross panel P1, a modified cross panel P2, a convex panel P3, and also it may be replaced by combination thereof as shown in FIG. 23. In the embodiment shown in FIG. 23, since the jointing boundaries in the lateral direction do not continue, the resistance against a bending stress is enhanced, and various patterns can be formed.

Figure 24:
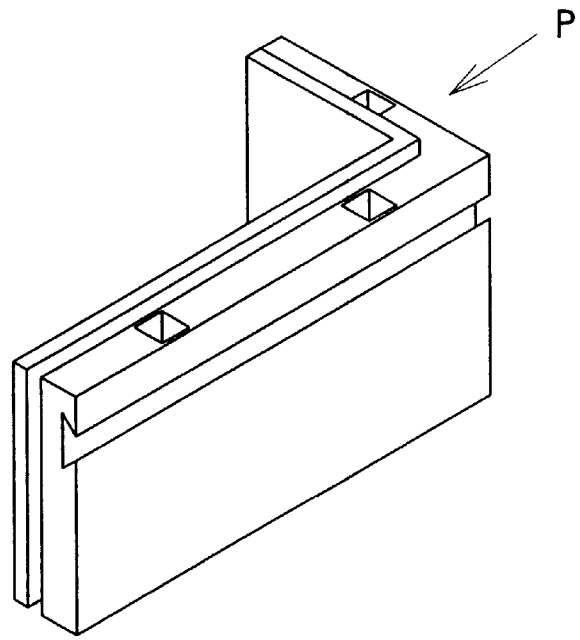
FIG. 24 is a perspective view showing an example of an L-shaped construction panel.

Further, although the panel bodies of the aforementioned panels are all flat plate-shaped, they may be replaced by L-shaped panel bodies, and such L-shaped panel bodies form panels using various jointing elements, jointing members and connecting members, thereby making it possible to construct the structures by jointing these panels. An example of the L-shaped construction panel P used in a corner part is illustrated in FIG. 24. The construction panel P shown in this figure is for use in an inner corner, and an inverse L-shaped construction panel P may be used for an outer corner.

Figure 25:
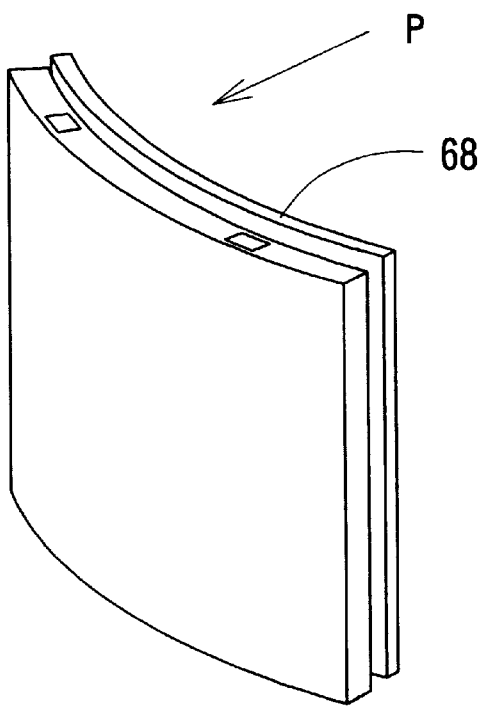
FIG. 25 is a perspective view showing an example of a curved construction panel.

Still further, the panels of the present invention are not limited to flat plate-shaped ones but they may be of any shape such as a curved panel which is formed by cutting a cylinder longitudinally as shown in FIG. 25, and they may be used for the outer or inner corners and for the construction of an outer wall of a tank by combining them. A decorative layer 68 is not limited to an inner round surface side, but may be provided to an outer round surface side.

Figure 26:
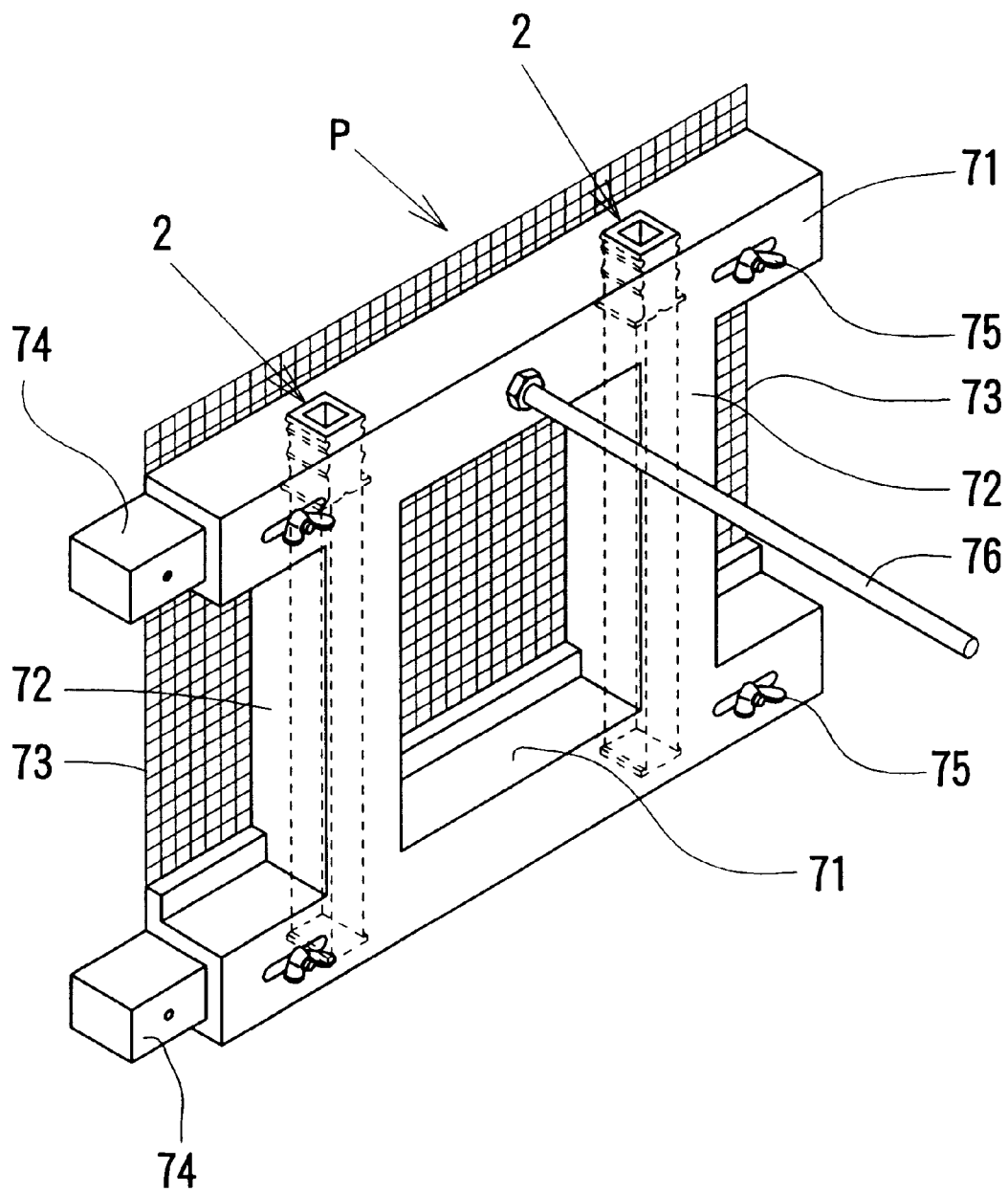
FIG. 26 is a perspective view showing an example of a construction panel formed of frames.

FIG. 26 is a perspective view of a construction panel P according to another embodiment of the invention. The construction panel P of this embodiment comprises a frame body composed of upper and lower receiving plates 71 and of frames 72 for connecting these receiving plates 71 and a mesh body 73 made of metals or synthetic resin which is attached to the frame body. Each receiving plate 71 is made of metal or synthetic resin and has a channel-rail shape which is U-shaped in cross section. And the concave jointing elements 2 each having an open end are arranged side by side on the upper end surface of the upper portion of the receiving plate 71a the panel body. Each frame 72 is square and cylindrical and incorporates therein a cylindrical body, an accommodation box, and a convex jointing member. Accordingly, the upper and lower panels can be jointed with each other by various concave jointing members and convex jointing members as explained above. Since a square pillar body inserted into one end of each receiving plate 71 forms a convex jointing element 4, and another end thereof forms a concave jointing member wherein the square pillar body is fixed between the right and left receiving plates 71 by a wing nut 75, so that the right and left panels can be jointed with each other. Further, the opposing panel bodies are jointed with each other by a jointing rod 76.

The mesh body 73 and the receiving plate 71 can be integrally manufactured by extrusion. The sectional shape of each receiving plate 71 and each frame 72 is not limited to U-shape but may be of a square pipe, a round pipe or an L-shape. Further, there are the L-shaped panel with reference to FIG. 24 and the cylindrical type panel with reference to FIG. 25 as the frame type panel.

Generally, various shielding plates are frequently attached to the civil engineering structures. The process of attaching the various shielding plates comprises filling concrete in a framework after providing the framework, drilling a hole in concrete body at proper positions after concrete is hardened, inserting an anchor into the hole and fixing it by an adhesive, etc., attaching the shielding plate to the anchor, and attaching an outer wall member, etc. onto the shielding plate, which takes much labor and construction time. Particularly, since the attachment of the outer wall member, etc. belongs to an inside construction, there is a drawback that a reliable construction in a narrow spot cannot be expected. Since such construction takes much time and labor and also the work per se requires skilled technique, there occurs a problem that construction cost is high and the construction time is delayed together with latest shortage of skilled workers.

Meanwhile, since a reservoir tank for storing therein moisture, cold and hot liquid, gas, and solid or structures which require attaching thereto members for preventing chemicals, radioactivity, noise, radio wave, vibration and which require shielding the influence by other factors are respectively constructed by the same manner as set forth above, the construction cannot be performed with reliability as designed, thereby leaking storage energy, influencing on the life of the structures, and of leading to high construction cost of the structures and of delaying of the construction time.

To cope with these problems, examples of the construction panels to which the shielding plate is attached are illustrated in FIGS. 27 to 30.

Figure 27:
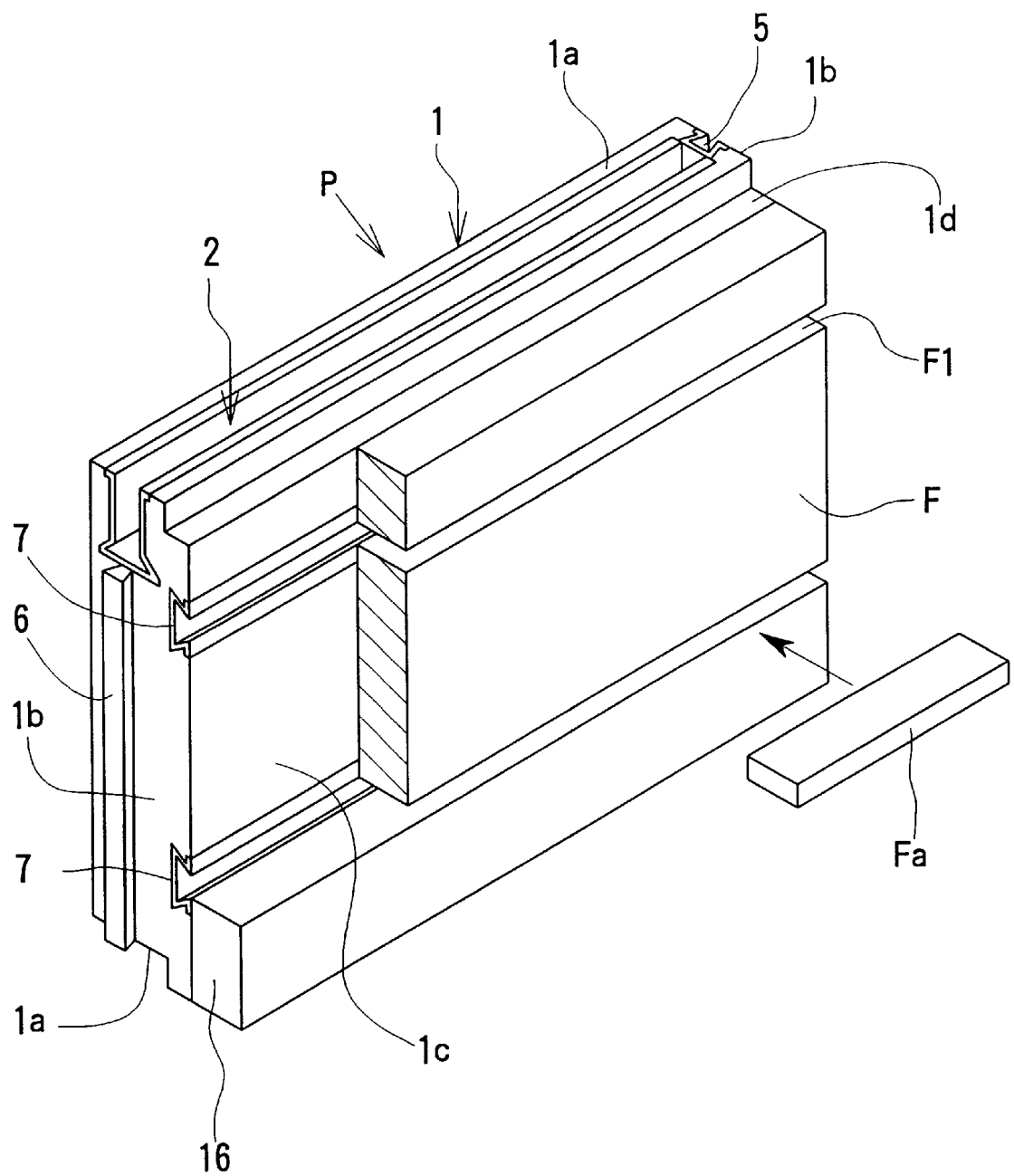
FIG. 27 is a perspective of a construction panel having a shielding plate as viewed from the back thereof, a portion of which is cut off.

In the embodiment shown in FIG. 27, a shielding plate F is attached to the back surface 1c of the panel body 1 shown in FIG. 1 except the portions where the concave jointing elements 7 are directly used. The method of assembling the construction panels P each having the shielding plate F is the same as the method of assembling the construction panels P which is explained with reference to FIG. 3, but the former is different from the latter in that a foaming or solid shielding plate $F_a$ is inserted into a shielding plate gap portions $F_1$ at the portion corresponding to the concave jointing elements 7 after the connecting rods 9 are connected with the opposing panels P.

The method of attaching the shielding plate F to the panel body 1 comprises filling a material of the panel body 1 into the shielding plate F, or attaching the shielding plate F to the panel body 1 or attaching shielding plate F to the panel body 1 by screws, nails, etc. or using appropriate means. The shielding plate F is attached to the surface of the panel body 1 and a decorative plate may be fixed to the shielding plate F.

Figure 28:
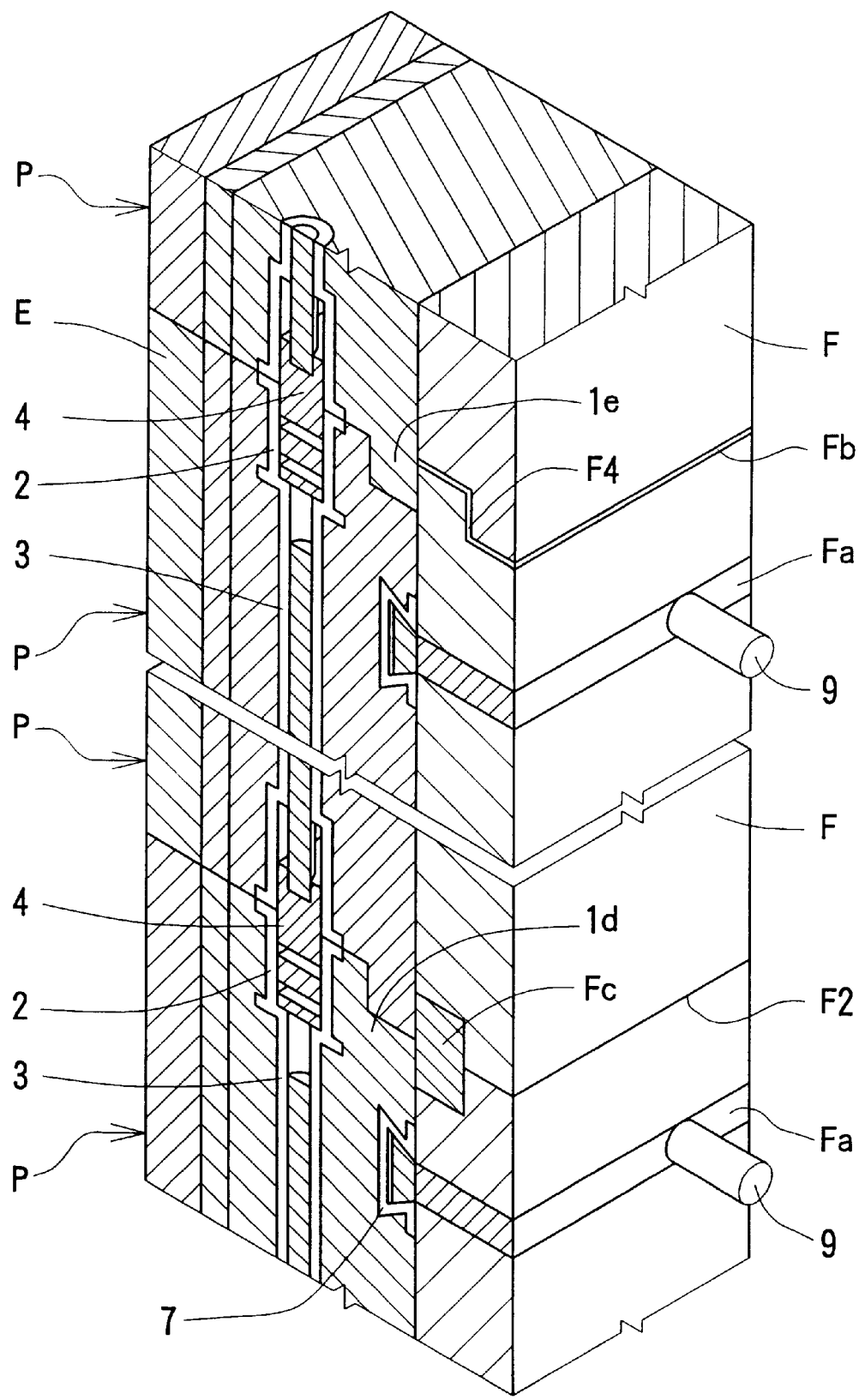
FIG. 28 is a perspective sectional view showing a main portion of the state where construction panels each having a shielding plate according to another example are assembled.

In the embodiment shown in FIG. 28, the shielding plates F are attached to the back surfaces of the construction panels P set forth above. Each shielding plate F serves to shield energy emitted from moisture, cold or hot liquid, vapor, and solid, and heat-insulating member which are presently used serves as such shielding plate F. Shielding plates are frequently and widely used for shelters, storing facilities, etc. The present invention is also applied to the attachment of members for shielding radioactivity, radio wave, vibration, and also to the attachment of a solar battery plate, etc. to the wall surface.

The construction panel P may have grain of concrete or that of a panel body. However, a decorative plate E such as tile, glass, natural stone, bamboo, timber or brick, ceramic, mesh or the like which are conventionally used may be attached to the panel body for the purpose of enhancing external appearance of the construction panel or the shielding plate as set forth above may be used as the member.

It is needless to say that the shielding plate F may be formed of iron, non-ferrous metal, resin, cement plate, rubber, paper, leathers, or woven cloth, non-woven cloth, a net formed of fibers made of inorganic material such as carbon and glass and organic material such as alamide, and the compound material thereof in addition to the material used in the decorative plate as set forth above. That is, as the material for the decorative plate and shielding plate, these materials are utilized independently or shielding plates of different materials are used in combination, or shielding plates are used in combination with the decorative plates set forth above, depending on the object of the panels.

A joint $F_2$ which is formed when the upper panel is placed on the lower panel may be processed in the following manner. That is, as a first process, the shielding plates F contact each other at the end surfaces thereof. As a second process, either of an adhesive, a foaming adhesive, chemicals which react with water or other liquid is applied, or a joint material $F_b$ such as a packing is interposed between the panels so that it reacts with water or other liquid to stop the leakage of water adhere both panels, or leakage of water is stopped or both panels are adhered by welding both panels, if there is a space for welding. As a third process, a cut space is formed in the longitudinal direction of the shielding plates F which contact each other vertically, and the shielding plates F are brought into contact by the aforementioned first and second processes, then a filling member $F_c$ which is a mixture of a solution of the material of panel body or shielding plate such as the foaming material, mortar, resin, rubber, lead, aluminum, and a material which is the same as or different from the solution set forth above is filled in the joint $F_2$, thereby enhancing stopping of leakage of water or adhesion. The positions of the joint $F_2$ and cut space are not limited to the concave stage portion 1d or convex stage portion 1e of the panel body 1 but may be deviated from these positions properly. A filling material C in addition to concrete is used as the material of the filling member $F_c$.

Figure 29:
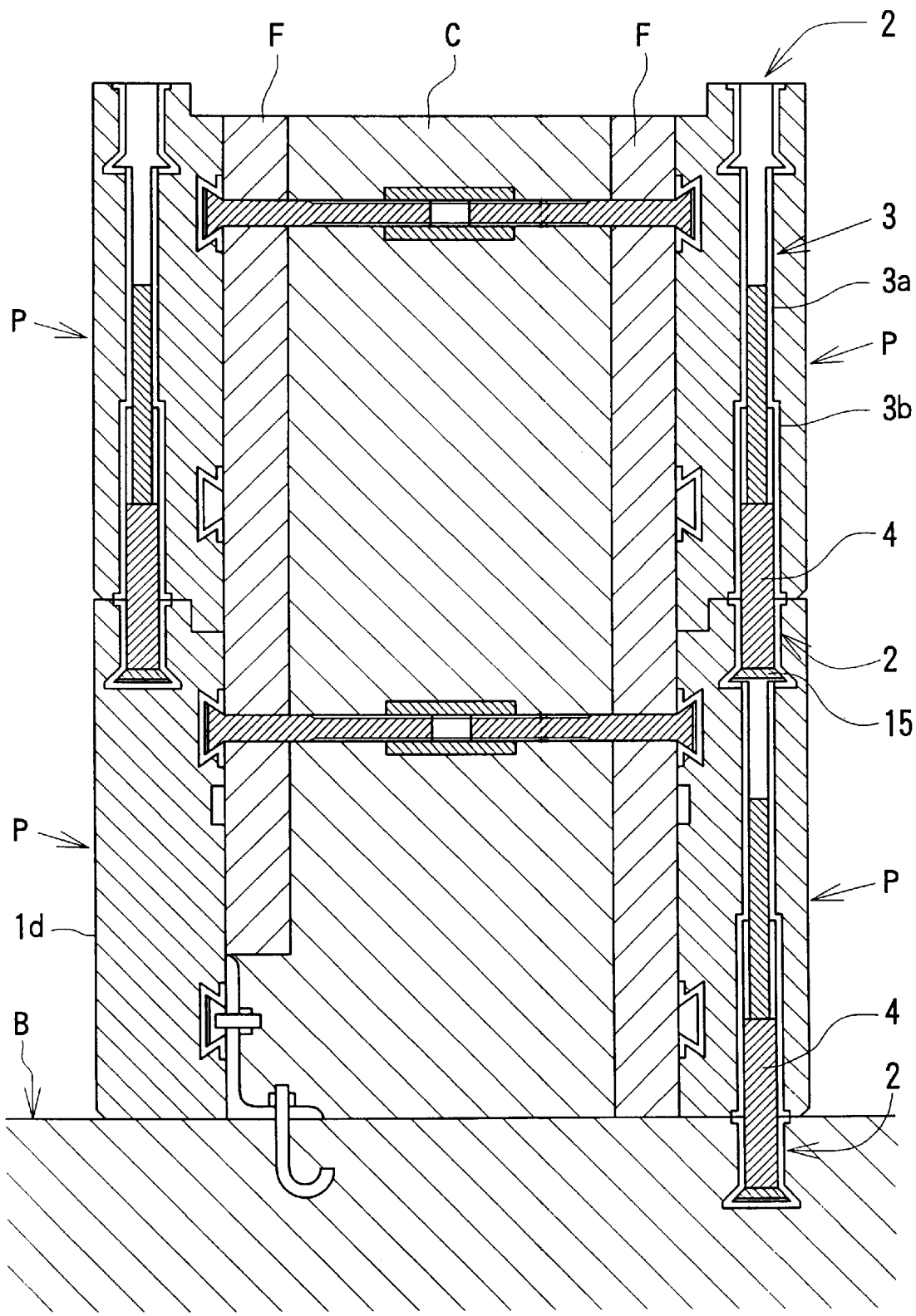
FIGS. 29 and 30 are sectional views each showing a main portion of the state where construction panels each having a shielding plate according to still another examples are assembled.

FIG. 29 is a sectional view showing a state the shielding plates F are mounted on the back surfaces of the opposing panels P, then these panels are assembled in the same manner shown in FIG. 3, and the filling material C is filled in these panels P.

Figure 30:
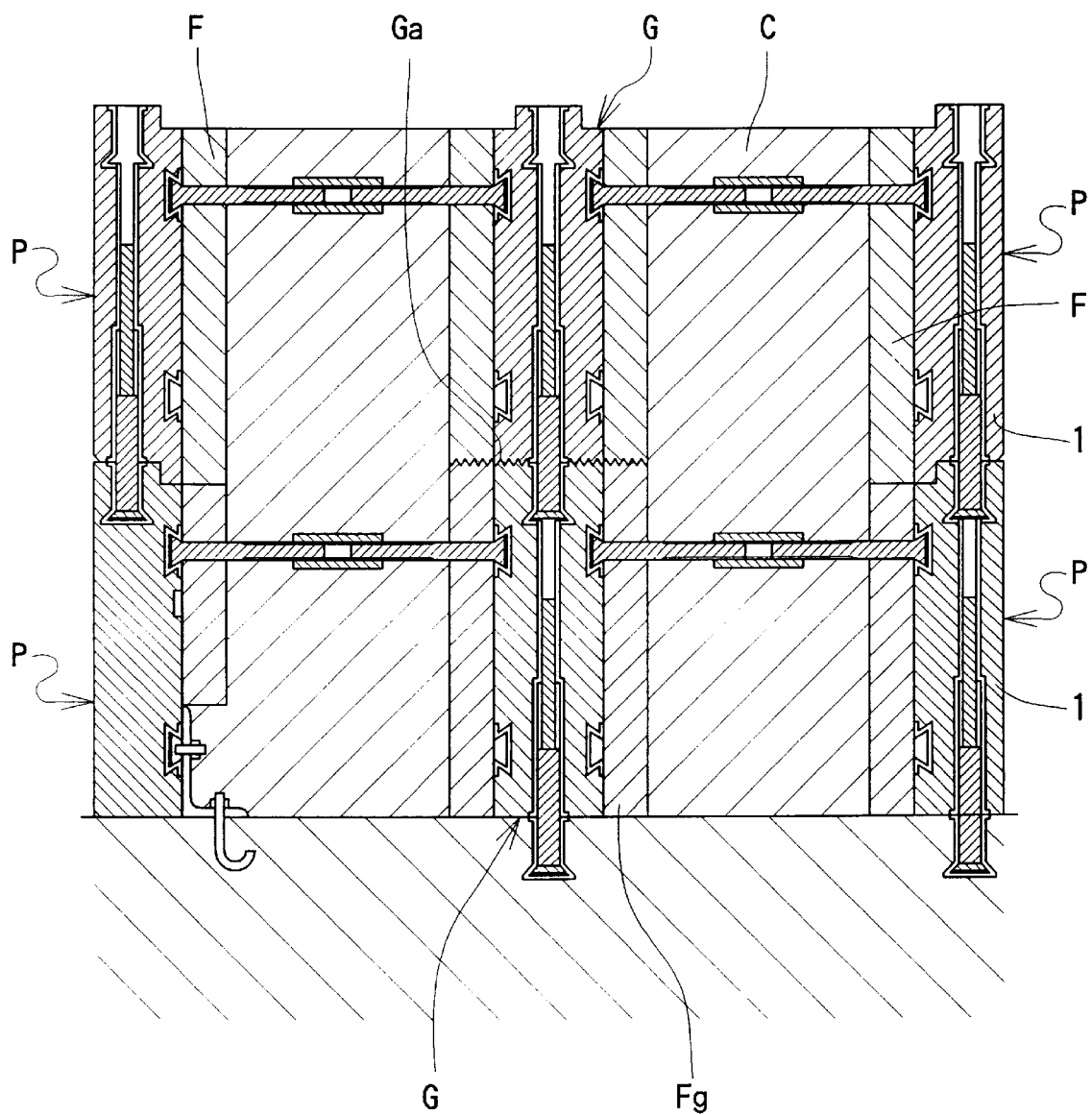

FIG. 30 is a sectional view where three pieces of panels P are arranged in parallel with one another and which shows a state where an intermediate panel G is interposed between two panels P of FIG. 29. The intermediate panel G includes jointing members for jointing upper and lower panels P, and those for jointing the panels in lateral direction which are provided as the need arises, and concave jointing members jointing with the opposing panels, which are respectively provided at one side or both sides like the outer panels P. The intermediate panel G may be disposed at two or more sections between the outer panels P, and the shielding plate F may be provided at one surface or both surfaces thereof. The filling material C at right and left sides of the intermediate panel G is not limited to the same material but it may be different material between the right and left sides. In the case of providing a plurality of intermediate panels G, they may be made of the same materials as the various panel bodies set forth above or may be made of different materials, and further the jointing members may be partially omitted.

The method of constructing the construction panels shown in FIG. 30 is performed in the same manner as the construction panel P shown in FIG. 3. That is, the left side concave jointing member of the intermediate panel G and the concave jointing member of the left outside panel P are jointed with each other with connecting rods after the lower stage left outside panel P and the lower stage intermediate panel G are respectively provided in this figure.

The right side panel is constructed in the same method as the left side panel. However, the construction may start either from the left or right panel.

Thereafter the jointing in the lateral direction is performed. However, in this jointing construction the jointing between the connecting rods may start first or the jointing in the lateral direction may start later, which is however determined by the panels P. That is, if the construction panels P are jointed by the jointing members as shown in FIG. 1, the jointing in the lateral direction starts first, while if the construction panels P are jointed by the jointing members as shown in FIGS. 21 and 22, the jointing in the lateral direction may start first or later. A convex/concave joint $G_a$ may be provided between the upper and lower end surfaces of the intermediate panel G to enhance the integration of the contact surfaces of the intermediate panel G, as shown in the figure.

The filling material C is filled in the panels after the right and left outside panels P and the intermediate panels G are assembled to reach given stages. The filling material C is not filled in the construction panels depending on the object of the panels, thereby permitting the space between the panels to be vacant. Further, the materials of the construction panel P and shielding plate F, as set forth in the previous embodiment, are used for those of the intermediate panel G and another shielding plate $F_g$.

A secondary shielding plate $F_a$ which is the same as or different from the shielding plate F shown in FIGS. 27 and 28 is filled with a frame work material or foaming material after the construction panels P are decisively positioned by the connecting rods. It is needless to say that the shielding plate may be attached to the surface and/or back surface of the construction panel P shown in FIGS. 1 to 26, as the need arises.

Described next is a case where the jointing members for jointing the opposing panels or jointing the panel and a temporary member are respectively provided on the opposing surfaces. The jointing member for jointing the opposing panels is already explained in FIGS. 2 and 3 and hence the jointing of the panel and the temporary member will be now described hereafter.

Figure 31:
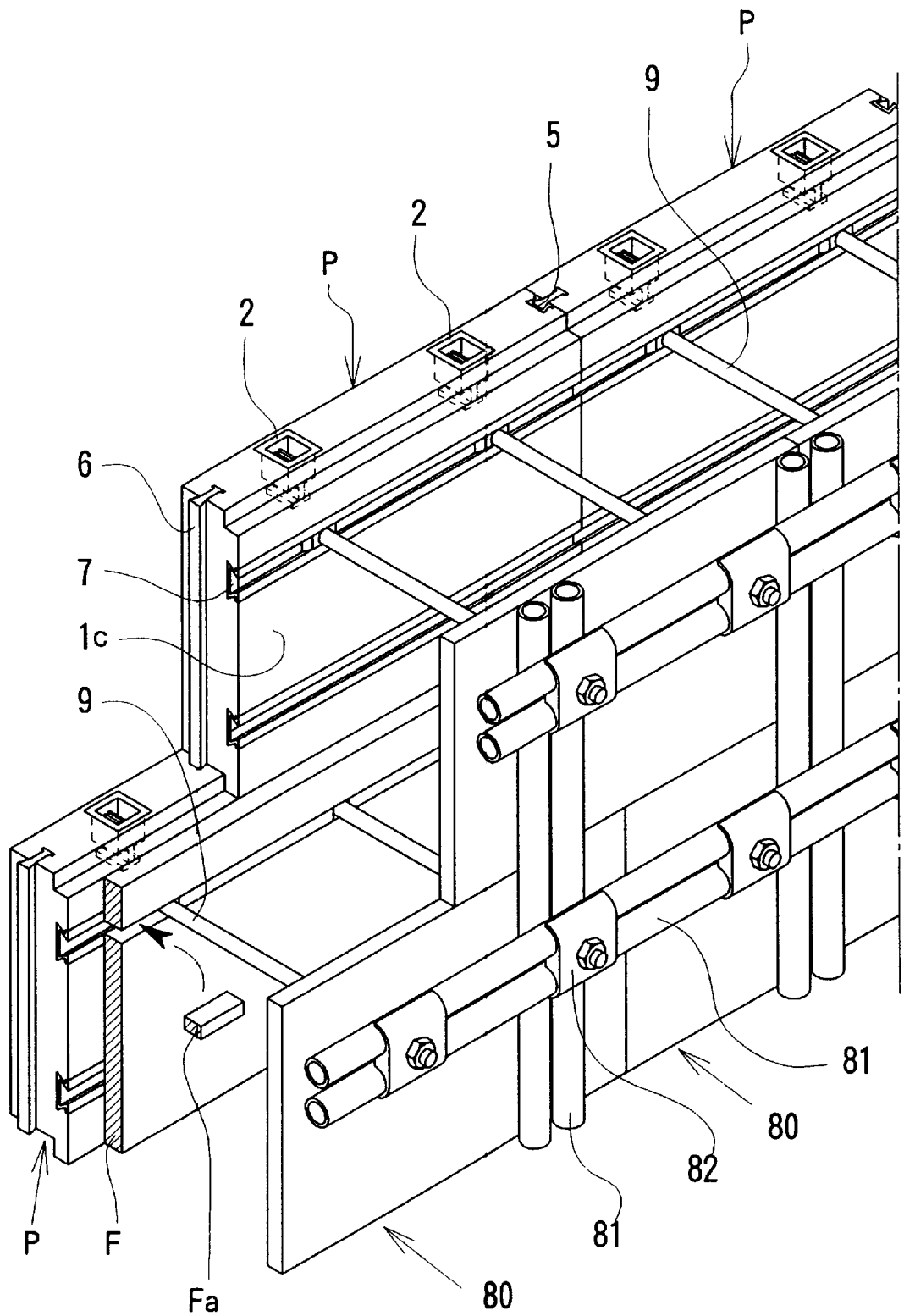
FIG. 31 is a perspective view for explaining a method of jointing construction panels and temporary members opposing the construction panels.

In the embodiment shown in FIG. 31, one side is constructed by panels P which are respectively decorated at the surfaces thereof and the other side which is not required to be attractive in appearance is constructed by a framework 80, the framework 80 is supported by round pipes 81 provided at the outside of the framework 80. Since the round pipes 81 are connected with the connecting rods 9 by way of a spectacle washer 82, the interval between the construction panel P and framework 80 is maintained correctly when concrete is filled therebetween. The framework 80 is removed after the concrete is filled and hardened.

In FIG. 31, the shielding plate F is attached to the back surface 1c of the construction panel P as need arises. In this case, the shielding plate F having a regular size may be attached as it is, but it is preferable that small pieces of shielding plate $F_a$ be used on the entire back surface 1c of the construction panel P. Such a shielding plate F may be attached not only to the back surface 1c of the construction panel P but to the front surface of the construction panel P or the back and front surfaces of the construction panel P. Such a shielding plate F may be applied to the construction panel P in FIGS. 2 and 3.

Figure 32:
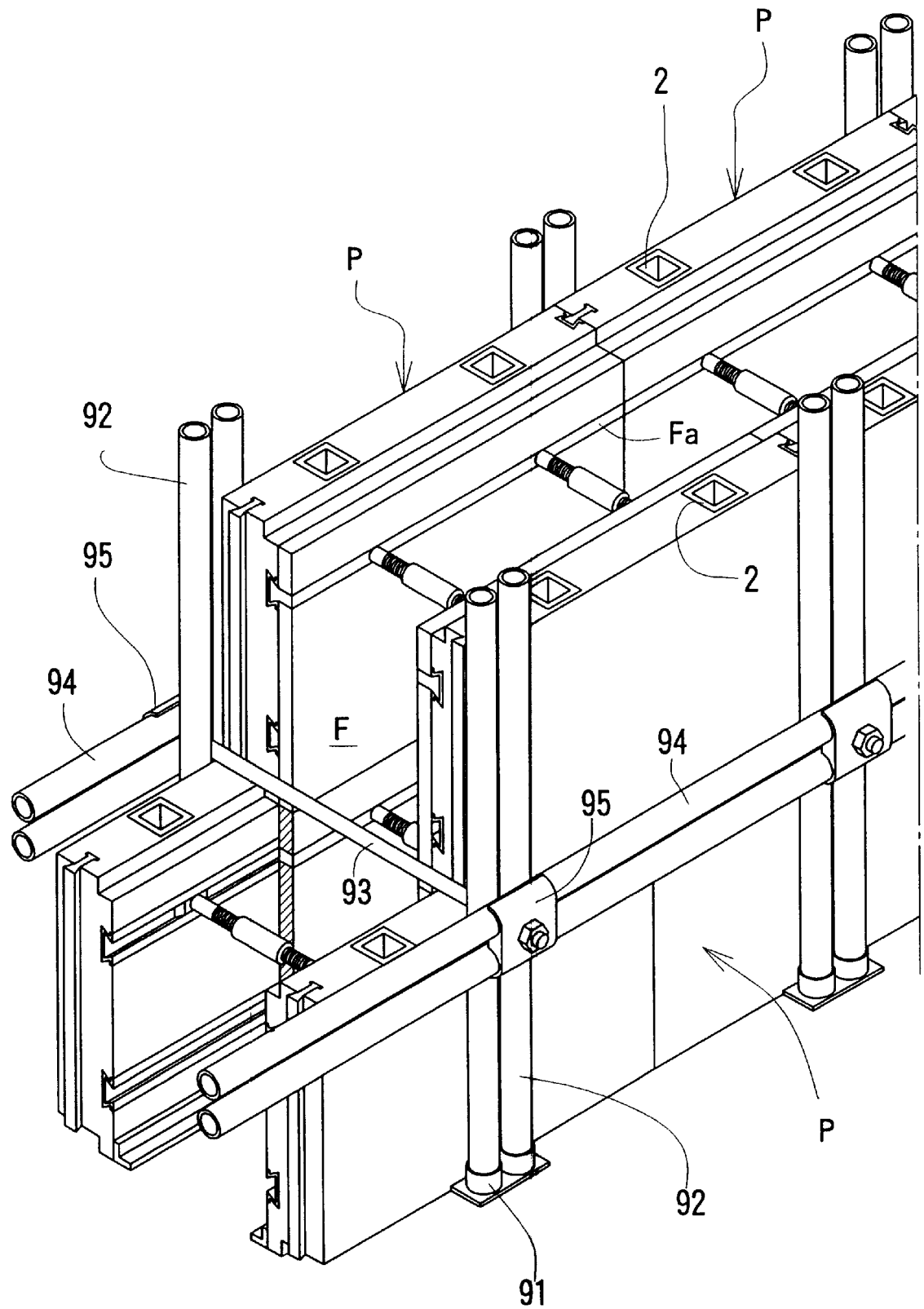
FIG. 32 is a perspective view showing an example where the construction panels are constructed using auxiliary members in a state where the auxiliary members and construction panels oppose one another.

In the embodiment shown in FIG. 32, both sides are constructed by the panels P respectively decorated on the surfaces thereof. The construction panels P can be assembled as they are. However, an auxiliary member is used in case that the jointing between the concave jointing member and the convex jointing member is close to a pin connection, since the jointing portions are likely to deviate at the front or back thereof in such a case. The round pipe as the auxiliary member can be provided as follows. For example, first, pipe bases 91 are installed, then vertical round pipes 92 are provided upright on the pipe bases 91 while making them contact with the construction panel P. After separators 93 are provided bridging over the pipe bases 91 at the position of the joint between the given panels P, then lateral round pipes 94 are provided bridging thereover and the connections thereof are fastened by fastening metal fittings 95. In such a manner, an auxiliary member is temporarily constructed in the lateral direction as well as in the upper direction. The temporary construction of the auxiliary member may also start from the provision of the lateral round pipes 94.

The auxiliary member is not limited to the round pipe but the shape thereof is selected from a square-shape, H-shape or L-shape or other appropriate shapes. The auxiliary member may be used at one side alone, depending on cases, separators may be omitted depending on the kind of the auxiliary member or that of the jointing member. The panel bodies are assembled in the same method as explained in FIG. 3.

In the construction panel of the present invention, it is preferable that reinforcing members such as reinforcements and reinforcing fibers are embedded in the panel body, since the panel body 1 is of a pre-cast concrete or product similar thereto and it is advantageous that a thickness of the panel body is as thin as possible particularly when concrete is filled between the opposing panels. The panel body is formed of a building material such as a mesh, a metal mesh, woven cloth, non-woven cloth, timber, iron, nonferrous metal, stone, ceramic, leather in addition to concrete. A decorative layer is made by finishing mortar alone, by sticking stone such as marble or granite, or by sticking tiles or by using building materials set forth above, or the like.

If the separately manufactured products are used as the jointing members and connecting members, the material thereof may be of various synthetic resins and of various metal materials, but particularly an optimum material as the material of the jointing member is selected from the various synthetic resins, considering a tensile strength required by the construction, the expected amount of positional deviation between the jointing members. In these embodiments, although the concave jointing members are provided at the upper end surface of the panel body and the convex jointing members are provided on the lower end surface of the panel body, they may be provided vice-versa.

As shown in FIG. 2, it is possible to prevent the jointing members from being damaged owing to a bending moment or a shearing force generated at the boundary portion between the jointing panels P by sticking the attaching members 11 on the back surface 1c of the panel body 1 bridging over the boundary of the jointing panels P.

Each member of the jointing members set forth in the above embodiment is exemplified but it may be replaced by other known members which serve the same operation. For example, the utilization of the dovetail and tenon provided in the jointing member or the connecting member is explained, but the dovetail may be replaced by a C-shaped channel and the tenon is replaced by a T-shaped member in cross section, or a C-shaped engaging portion may be formed of a wall and L-shaped member by embedding one side of the L-shaped member into the back surface of the panel body.

The other embodiments of the invention are described next with reference to the drawings.

FIGS. 33 to 39 are views for explaining respectively a first type jointing elements, wherein the convex jointing members are manually pressed downward to engage with the concave jointing members, and thereafter some operations are performed so as to joint upper and lower panels with each other.

In the embodiment shown in FIGS. 33(A) and (B), the upper stage panel Pb is placed on the lower stage panel Pa, then the convex jointing element 4 which is held in the cylindrical body 3 by the screw 23 is pressed downward by operation member and thereafter a screw shaft 101 is raised by turning the head 20 by operation member. Since the screw shaft 101 penetrates a body 100 of the convex jointing element 4, and a leg 103 provided at the lower portion of the body 100 is spread when a lower end conical portion 102 rises, the spread leg 103 contacts a tapered surface of the concave jointing element 2, and hence two panels Pa and Pb are jointed with each other as shown in FIGS. 33(B). Meanwhile the body 100 is made of an elastic material.

In the embodiment shown in FIGS. 34(A) and (B), the upper stage panel Pb is placed on the lower stage panel Pa, then the convex jointing element 4 which is held by the cylindrical body 3 by the screw 23 is pressed downward by operation member and thereafter a screw shaft 101 is raised by turning the head 20 by operation member. In this embodiment, since the tip end of the body 100 of the convex jointing element 4 and the tip end of the screw shaft 101 are respectively fixed by a holding member 104, the body 100 made of an elastic material expands in the concave jointing element 2, and hence two panels Pa and Pb are jointed with each other as shown in FIG. 34(B).

In the embodiment shown in FIGS. 35(A) and (B), after the convex jointing element 4 is pressed downward in the same manner as set forth above, a bolt 105 is turned by an operation member. Since the bolt 105 passes through a pipe 107 which penetrates a body 106 of the convex jointing element 4, then it is screwed into a nut 108 fixed to the tip end of the pipe 107, a bending portion 107a provided at the lower portion of the pipe 107 expands in the concave jointing element 2 as the bolt 105 turns, and hence two panels Pa and Pb are jointed with each other as shown in FIG. 35(B). A portion denoted by Δh of the lower stage panel Pa shown in FIG. 35(A) may be omitted.

In the embodiment shown in FIGS. 36(A) and (B), after the upper stage panel Pb is placed on the lower stage panel Pa as shown in FIG. 36(A), the convex jointing element 4 is pressed downward to insert a hook member 111 attached to the tip end of a shaft 110 into the concave jointing element 2. Thereafter, the shaft 110 of the convex jointing element 4 is turned by operation member. The 110 has a screw provided thereon and a plate 112 screwed in this screw and the hook member 111 are respectively fastened to stepped portions 113 and 114. At this time, the fastening is not performed if the plate 112 is turned. Accordingly, a spring 112a is provided on the plate 112 to prevent it from being turned by strengthening the friction between itself and the wall surfaces, or the plate 112 has a shape other than a circular shape and the wall surface has a shape conforming to such shape of the plate 112. A plate 115 and the hook member 111 may fasten the stepped portions 113 and 114 without providing the plate 112.

Figure 37A:
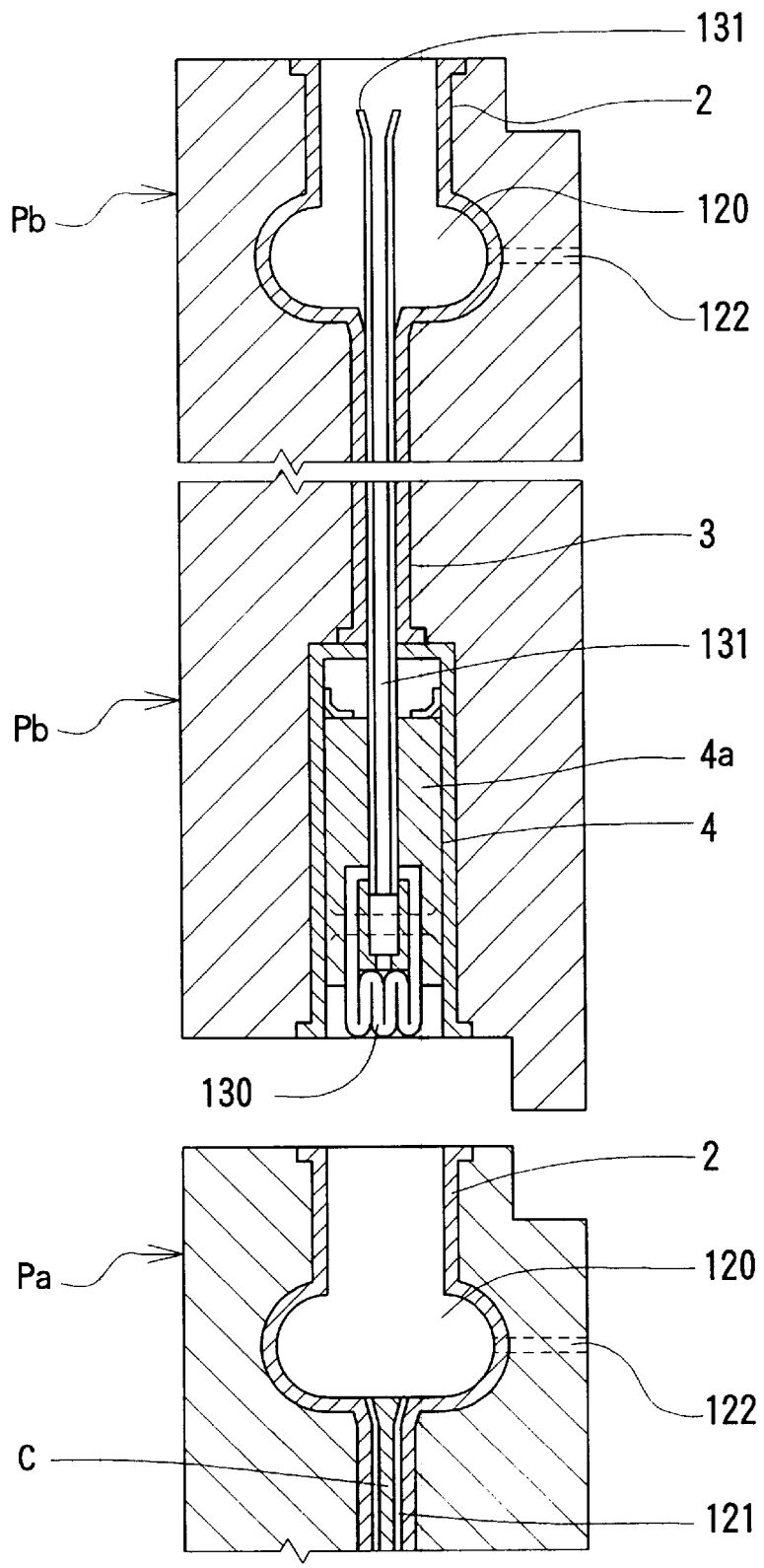
Figure 37:
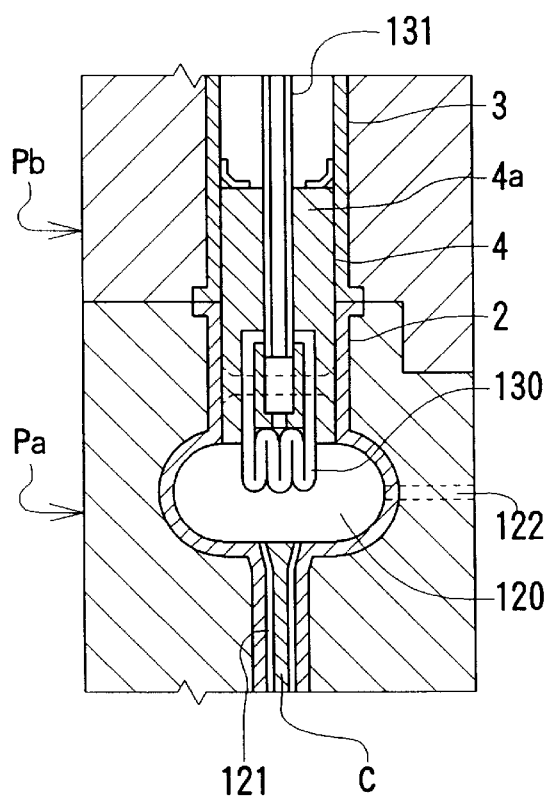
Figure 37:
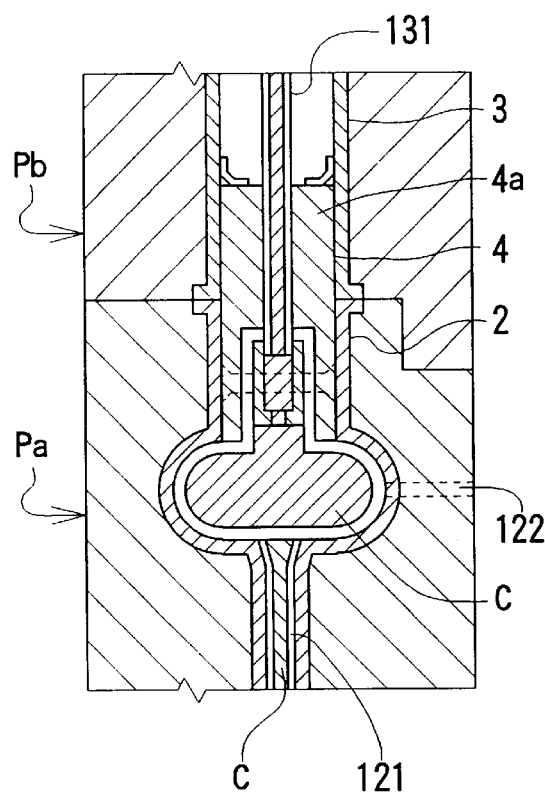

In the embodiment shown in FIGS. 37 (A), (B) and (C), a bag body is utilized. That is, as shown in FIG. 37 (A), an enlarged recess 120 is formed in the concave jointing element 2 and a bag body 130 is attached to the lower portion of the body 4a of the convex jointing element 4. A filling pipe 131 communicates with the bag body 130 through the upper portion of the cylindrical body 3. After the upper stage panel Pb is placed on the lower stage panel Pa, the body 4a of the convex jointing element 4 is pressed downward along the filling pipe 131 and inserted into the concave jointing element 2, as shown in FIG. 37 (B). Thereafter, the filling material C is introduced through the filling pipe 131, so that the bag body 130 is expanded in the enlarged recess 120, as shown in FIG. 37 (C). As a result, two panels Pa and Pb are jointed with each other. Denoted by 122 is an air discharge hole for escaping air as the filling material C is introduced. The jointing between the upper stage panel Pb and convex jointing element 4 may be performed by a nut which screws into a screw provided at the head of the filling pipe 131 in the same manner as shown in FIGS. 33 to 36.

In the embodiment shown in FIGS. 38 (A) and (B), a bag body is also utilized. In this embodiment, the bag body 130 is made of a flexible material which is different from or the same as that of the body 4a of the convex jointing element 4, and the former is integrated with the latter. Irregularities are formed on the inner surface of the concave jointing element 2. The jointing procedure of two panels are the same as the previous embodiment, that is, after the upper stage panel Pb is placed on the lower stage panel Pa, the body 4a of the convex jointing element 4 is pressed downward into the concave jointing element 2 along the filling pipe 131, thereafter the filling material C is introduced through the filling pipe 131 so that the bag body 130 is expanded in the concave jointing element 2 as shown in FIG. 38 (B) to permit the bag body 130 engage with the irregularities of all inner surfaces. Further, the filling material C is also introduced through a filling pipe 121 provided at the lower portion of the lower stage panel Pa. The bag body 130 is made of a material which is different or the same as that of the body 4a of the convex jointing element 4, and the former is separately made from the latter.

In the embodiment shown in FIGS. 39 (A) and (B), two panels are jointed with each other in the manner that the surfaces of the panel bodies where two panel bodies contact or a part of surfaces where the concave jointing element 2 and convex jointing element 4 contact is thermally melted, then the contacting surfaces are cooled to joint two panels or contacting surfaces are connected with each other by an adhesive to joint two panels.

The method of constructing the construction panels is as follows.

The lower end surface of the upper stage panel Pb is brought into contact with the upper end surface of the lower stage panel Pa in the same manner as the previous embodiment. Thereafter, a handle 140h fixed to the upper portion of the body 4a of the convex jointing element 4 is pressed downward manually or by an operating rod from the upper portion of the upper stage panel Pb so that the body 4a engages in the concave jointing element 2 as shown in FIG. 39 (B). Since an electric wire 140a having an anode 140b and a cathode 140c penetrates the body 4a, when a current flows to a terminal 140g of the electric wire 140a which is exposed on a protrusion 140d of the concave jointing element 2 of the lower stage panel Pa in a state where the body 4a engages in the concave jointing element 2, the current flows to the electric wire 140a of the lower stage panel Pa, then it also flows to upper electrothermic plates 140i, 140i embedded into the body 4a and to electrothermic plates 141i, 141i, and 141i at the bottom end C of the concave joint element 2, and hence heat is generated. As the electrothermic plates, a known Nichrome wire (trade mark) may be used or those made of a mixture of rubber, silicon or carbon particles such as used for electrothermic carpet, etc. may be used. Since a cylindrical lower portion 4e and the concave jointing element 2 are made of resin, when heat is generated in the electrothermic plates, contacting portions 140j, 140j between electrothermic plates 141 and the contacting portions 141j between the electrothermic plates 141i, 141i and 141i are respectively melted by heat and these contacting portions are in a state to be adhered. If the current is cut off in this state to cool the contacting portions, the contacting portions are adhered to each other, thereby jointing the concave jointing element 2 and convex jointing element 4.

This embodiment can be variously modified. For example, a wire is incorporated into the cylindrical shaft 44 of the construction panel P shown in FIG. 16, and the shaft 44 is pressed downward to joint the concave jointing element 2 and convex jointing element 4 with each other, thereby making the handle 140h unnecessary. Further, the concave jointing element 2 and the body 4a may engage with each other in a state where they contact each other, and they are jointed by an electrothermic plate 142i provided at the lower portion of the body 4a, or the protrusion 140d may be omitted. If the concave jointing element 2 and convex jointing element 4 are made of other materials, resin may be attached to a surface where the concave jointing element 2 and the convex jointing element 4 contact the electrothermic plate 142i. Further, the electrothermic plate may be provided between the surfaces of the panels where they contact each other. An adhesive may be used instead of the electrothermic plate. The jointing plate may be provided at both end surfaces of the panels by the electrothermic plate or adhesive.

Figure 40A:
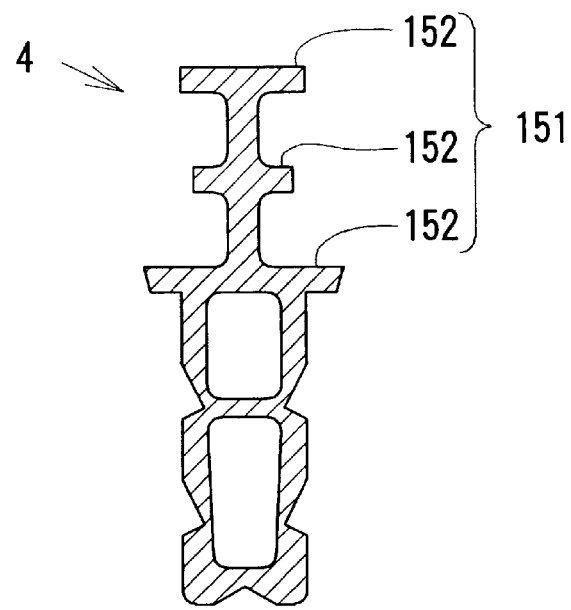
Figure 40B:
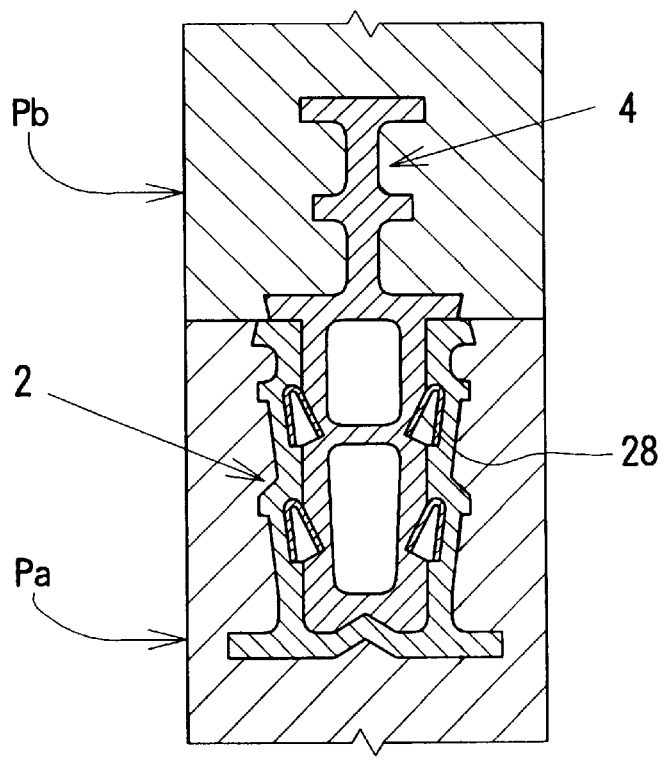

FIGS. 40 (A) and (B) to FIGS. 44 (A) and (B) are views for explaining respectively a second type jointing elements.

In the second type, the convex jointing element 4 is embedded into the lower portion of the panel body 1 so that the jointing portion of the convex jointing element 4 protrudes from the lower end surface of the lower stage panel Pa while a concave jointing element 2 is embedded into the upper end surface of the panel body 1 at the position corresponding to the convex jointing element 4, thereby jointing the upper and lower panels with each other.

In the embodiment shown in FIGS. 40 (A) and (B), the concave jointing element 2 and the convex jointing element 4 having the same function as those shown in FIGS. 8 and 9 are used. The concave jointing element 2 and convex jointing element 4 shown in FIGS. 40 (A) and (B) are different from those in FIGS. 8 and 9 in that an portion to be embedded 151 of the convex jointing element 4 is embedded into the lower portion of the panel body 1, and an anchor collar 152 having an appropriate shape is provided for enforcing the convex jointing element 4, as the need arises. A bottom plate corresponding to the convex jointing element 4 is provided in the concave jointing element 2. Protrusions 28 of the concave jointing element 2 are separately provided from the concave jointing element 2.

Figure 41:
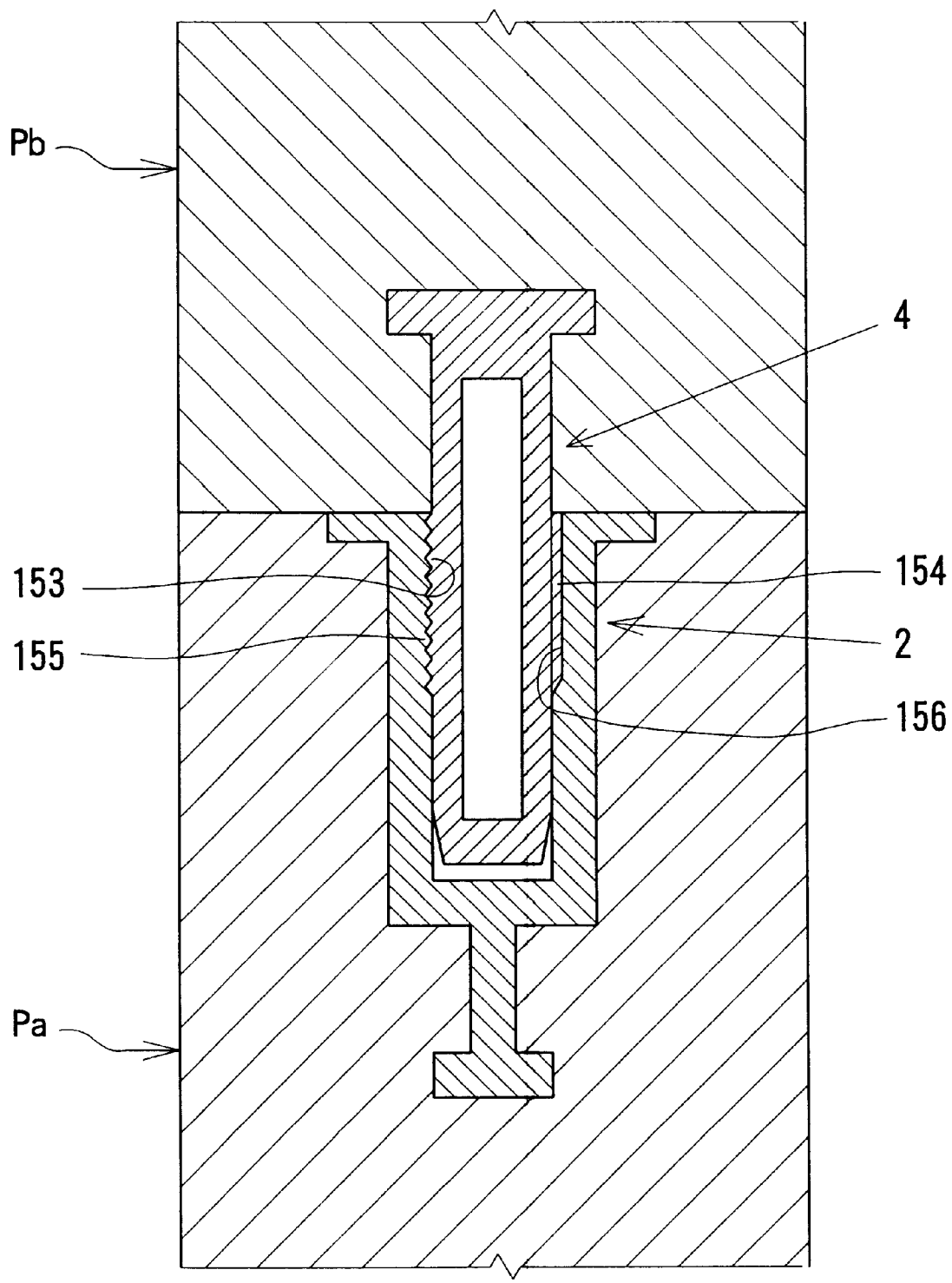

The embodiment shown in FIG. 41 is a modified example of that shown in FIG. 7. A horizontal holding pawl 153 or a perpendicular holding pawl 154 is provided on the inner surface of the concave jointing element 2 which is embedded into the upper portion of the panel at the position corresponding to the convex jointing element 4, while a horizontal pawl 155 or a perpendicular holding pawl 156 is provided on the convex jointing element 4 corresponding to the holding pawls 153 or 154. The convex jointing element 4 is hollow and is elastically deformable. The holding pawls 153 and 155 of the concave jointing element 2 may be provided at both sides thereof.

Figure 42:
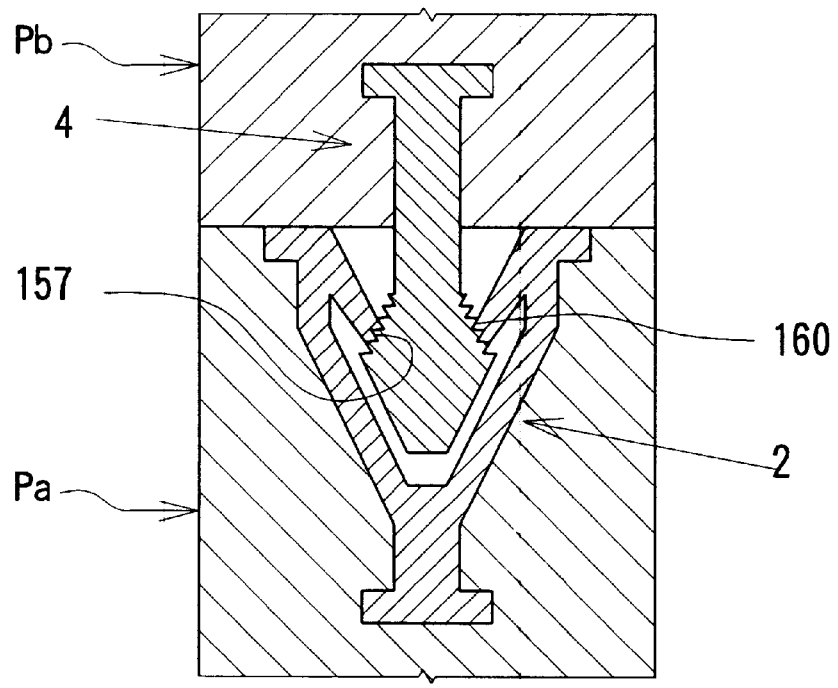
Figure 42:
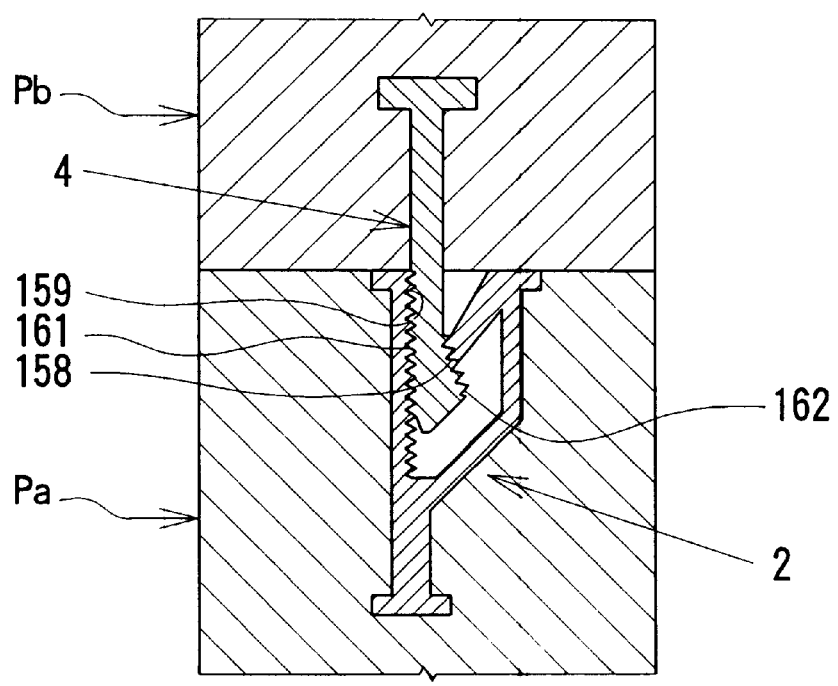

Each embodiment shown in FIGS. 42 (A) and (B) employs the concave jointing element 2 and the convex jointing element 4 having the same function as those shown in FIGS. 13 and 14. In the embodiment in FIG. 42 (B), the concave jointing element 2 and the convex jointing element 4 in FIG. 42 (A) are respectively halved. Holding pawls 157, 158 and 159 are respectively provided in the concave jointing element 2, as the need arises, and holding pawls 160, 161 and 162 are respectively provided in the convex jointing element 4, as the need arises.

Figure 43:
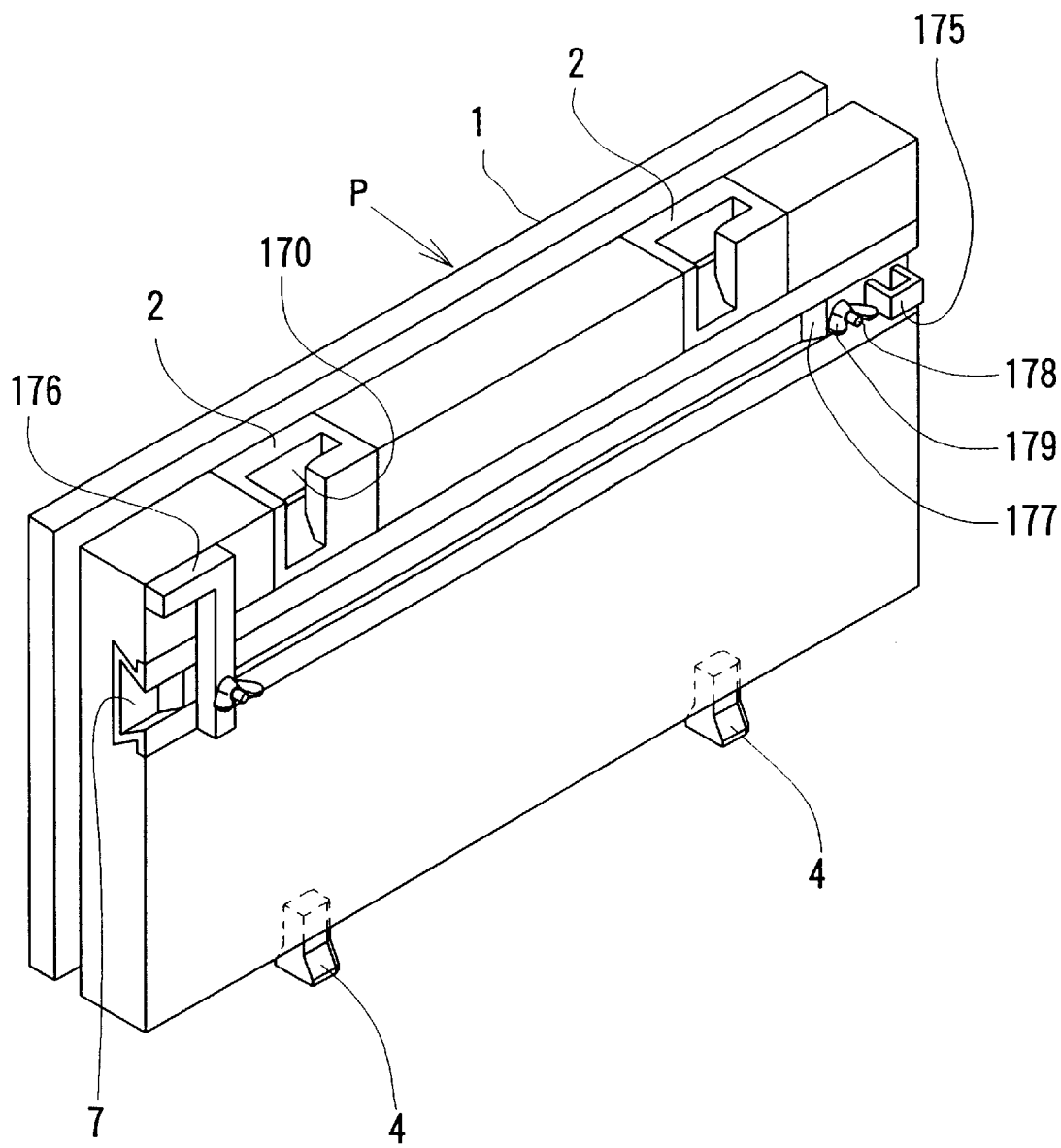

In the embodiments shown in FIG. 43 and FIGS. 44 (A) and (B), the two panels are jointed with each other by two operations. In these embodiments, the concave jointing element 2 has a box shape and the bottom surface of a hollow portion 170 thereof is enlarged in trapezoidal shape to form a dovetail-shaped recess 171, and a part of the box is cut to form a guide passage 172. Meanwhile, the convex jointing element 4 has a tenon-shaped protrusion 174 which is enlarged in a trapezoidal shape at the tip end of a body 173 thereof. Accordingly, the body 173 of the convex jointing element 4 which protrudes from the lower end of the upper stage panel Pb is inserted into the hollow portion 170 of the concave jointing element 2 along the guide passage 172 of the lower stage panel Pa, then the body 173 is moved to the right and left of the panel body 1 so that a protrusion 174 and the recess 171 of the concave jointing element 2 engage with each other. By the engagement operation between these concave jointing element 2 and the convex jointing element 4, the upper and lower panels Pa and Pb are jointed with each other. According to this method of jointing the construction panels P, since concave jointing element 5 and convex jointing member 6 shown in FIG. 1 cannot be used for jointing the laterally adjoining panels, crescents 175 and 176 as shown in FIG. 43 are used, or another method for jointing the right and left panels at the back surfaces of the panel bodies 1 (as set forth hereinafter) may be employed. In the embodiment shown in FIG. 43, the concave crescent 175 and the convex crescent 176 are respectively fixed to the concave jointing elements 7 by a tenon 177, a bolt 178 and a wing nut 179, but they may be fixed directly the panel body 1 by a bolt and a nut without resorting to the concave jointing member. The method of jointing the panels comprises permitting the right and left end surfaces of the adjoining panels to be brought into contact with each other, then turning the convex crescent 176 to engage the tip end thereof into the hole of the concave crescent 175, and fastening them by the wing nut 179. Another method is to use a known crescent which is used for a wind frame.

Figure 5:
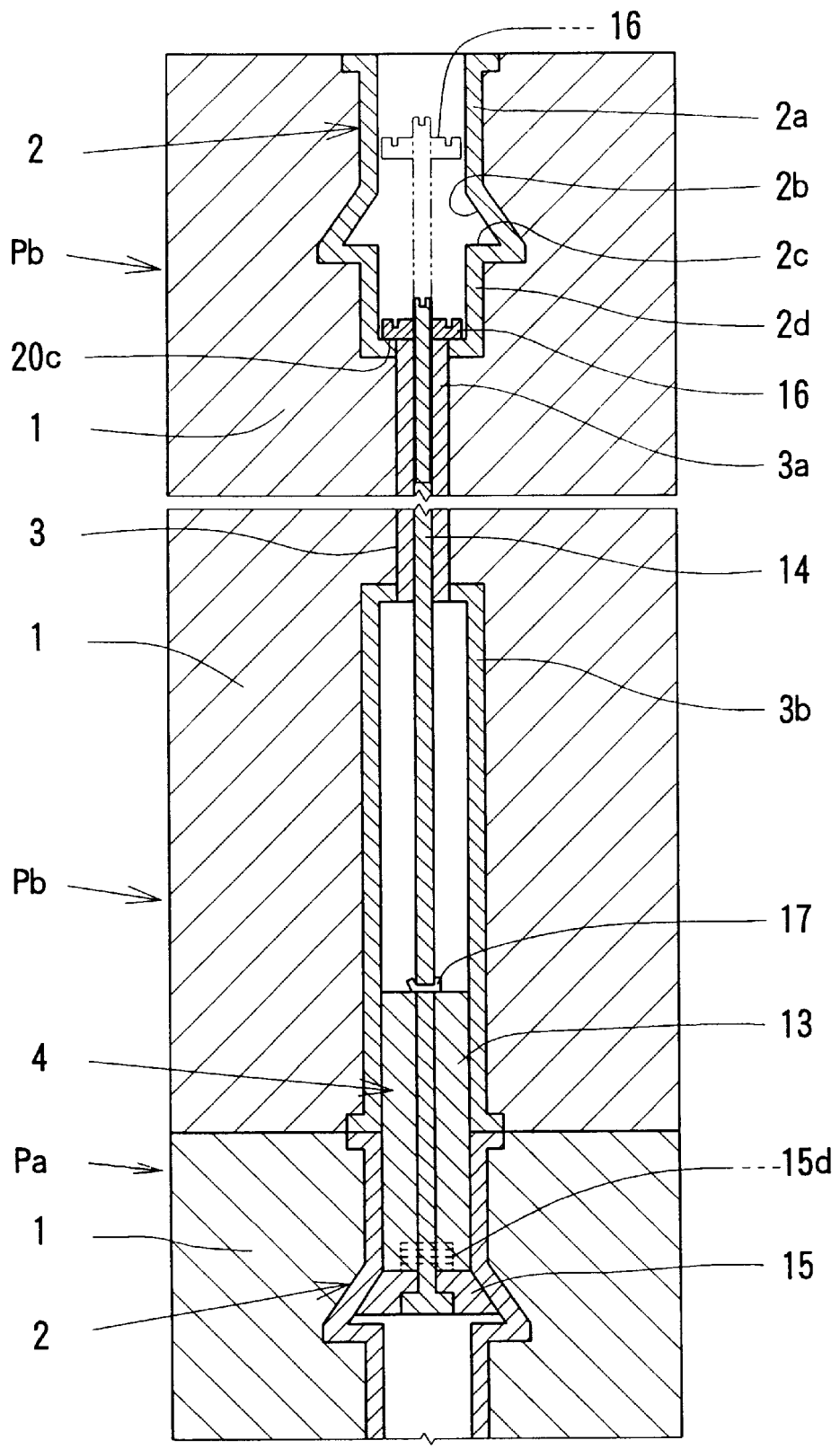
FIG. 5 is a sectional view for explaining an example of jointing upper and lower construction panels by concave and convex jointing members.
Figure 45:
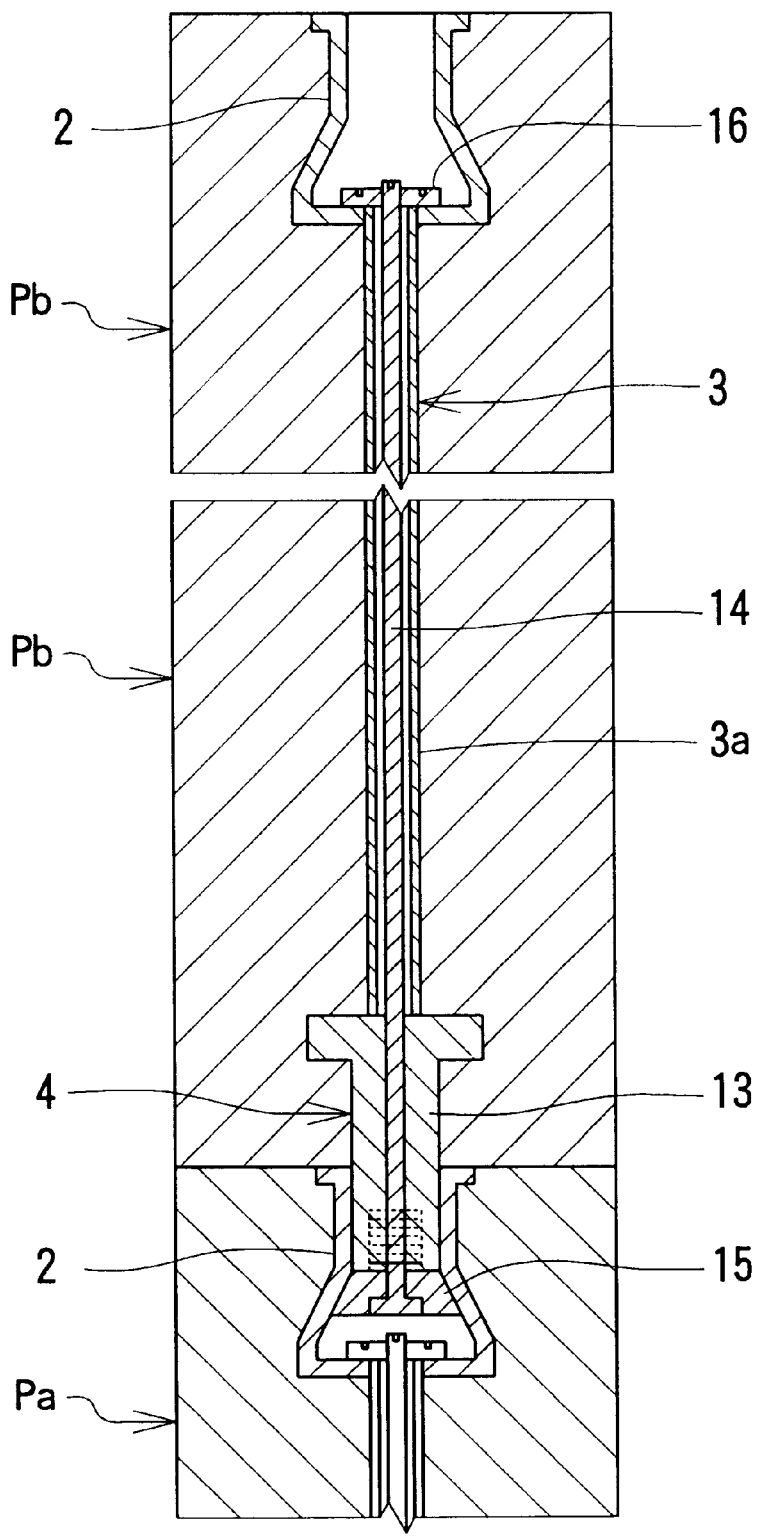
FIG. 45 is a sectional view showing a modified example of concave and convex jointing members in FIG. 5.

In the embodiment shown in FIG. 45 which is a modified example of the concave jointing element 2 and the convex jointing element 4 shown in FIG. 5, the cylindrical lower portion 3b is removed and the convex jointing element 4 engages in the concave jointing element 2 while the convex jointing element 4 is exposed so that the upper and lower panels Pa and Pb are jointed with each other.

The embodiment shown in FIGS. 46 (A) and (B) is a modified example of that shown in FIG. 17. The convex jointing element 4 is fixed to the panel body 1 at the upper portion thereof, and has a hole having a proper shape in which a wedge 180 is inserted around the tip end thereof. The wedge 180 may have a proper shape such as a tapered shape, a hook shape, a rod shape or a screw shape. The jointing procedure is as follows. First, the upper stage panel Pb is placed on the lower stage panel Pa, then one or more than two of the convex jointing elements 4 which protrude from the lower end surface of the upper stage panel Pb enter the concave jointing element 2 provided at the upper end surface of the lower stage panel Pa. Then the wedge 180 is inserted into the hole 181 defined in the panel body 1 and the concave jointing element 2 of the lower stage panel Pa or that defined in the lower stage panel Pa and then fixed to the hole of the convex jointing element 4. In this case, the hole 181 has a laterally lengthwise shape, and the surfaces of the panels Pa and Pb and the lateral direction thereof are respectively adjusted by the hole 181, thereafter they are fastened by a nut 182. Since there is a gap between the concave jointing element 2 and the convex jointing element 4, they can be adjusted by the gap. If there is a stage or difference between the back surfaces of the lower stage panel Pa and upper stage panel Pb, a packing 183 may be interposed in the stage or difference. Further, a jointing rod 184 like the attaching members 11 in FIG. 2 may be used to enforce the jointing between the upper and lower panels Pa and Pb. The positional adjustment between the upper and lower panels Pa and Pb may be used in the methods of jointing the construction panel P which have been already or will be described later.

Figure 47A:
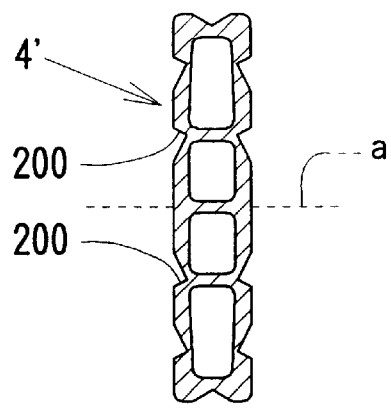
Figure 47B:
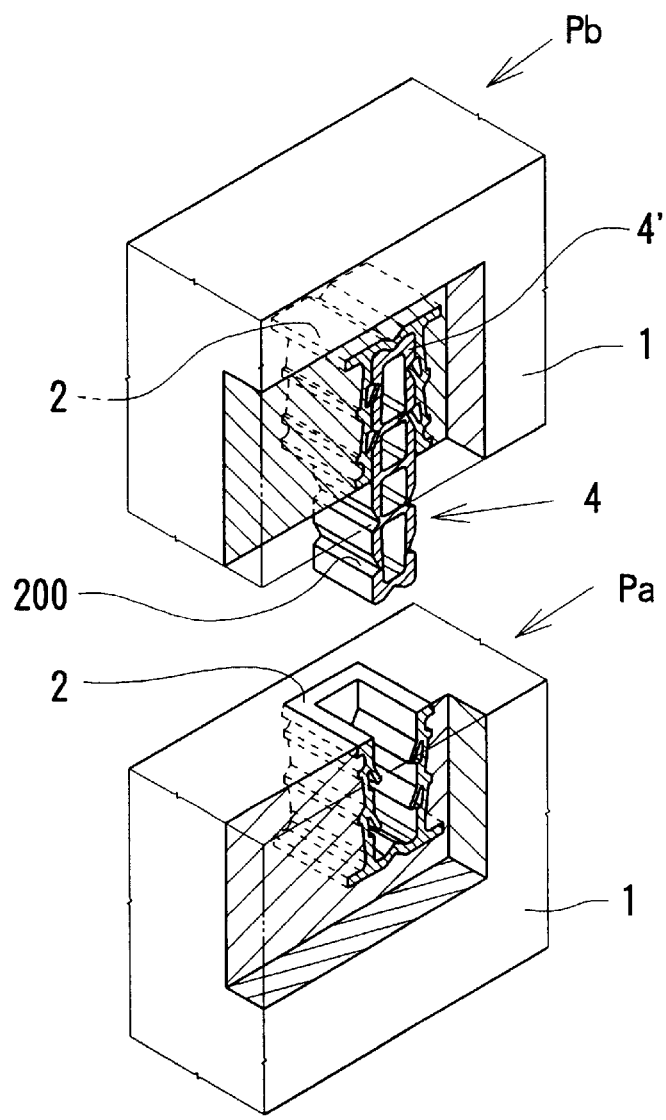

FIGS. 47 (A) and (B) to FIG. 52 are views for explaining respectively a third type of jointing elements, wherein the concave jointing member is embedded into the upper end surface or the lower end surface of the panel body 1 (in advance), then a convex jointing element 4 is fixed to either of the concave jointing element 2 on the upper end or lower surface of the panel body 1 to protrude therefrom at the side thereby forming the convex jointing element 4, and thus forming a convex jointing element 4 and another concave jointing element 2 of another panel engaged with each other to joint the panels P. This type of jointing element is excellent in that conveyance and storage of the panels are easy, and that the lower stage panel can be jointed with the upper stage panel by merely hanging and lowering the upper stage panel.

In the embodiment shown in FIGS. 47 (A) and (B) which are modified example of those shown in FIGS. 8, 9 and 40, wherein the function and material of the former is the same as those of the latter. The concave jointing element 2 having the same shape is embedded into the upper end surface or the lower end surface of the panel body 1 at one section or more than 2 sections. Although the directions of recesses 200 of a convex jointing element 4' are differentiated along the boundary of the center line a for preventing the convex jointing element 4' from being dropped when the convex jointing element 4' engage in the concave jointing element 2. When the convex jointing element 4' engage in the concave jointing element 2 of the upper stage panel Pb to form the convex jointing element 4 as shown in FIG. 47 (B), then the convex jointing element 4 and the concave jointing element 2 of the lower stage panel Pa engage with each other to joint the upper and lower panels Pa and Pb with each other.

Figure 48:
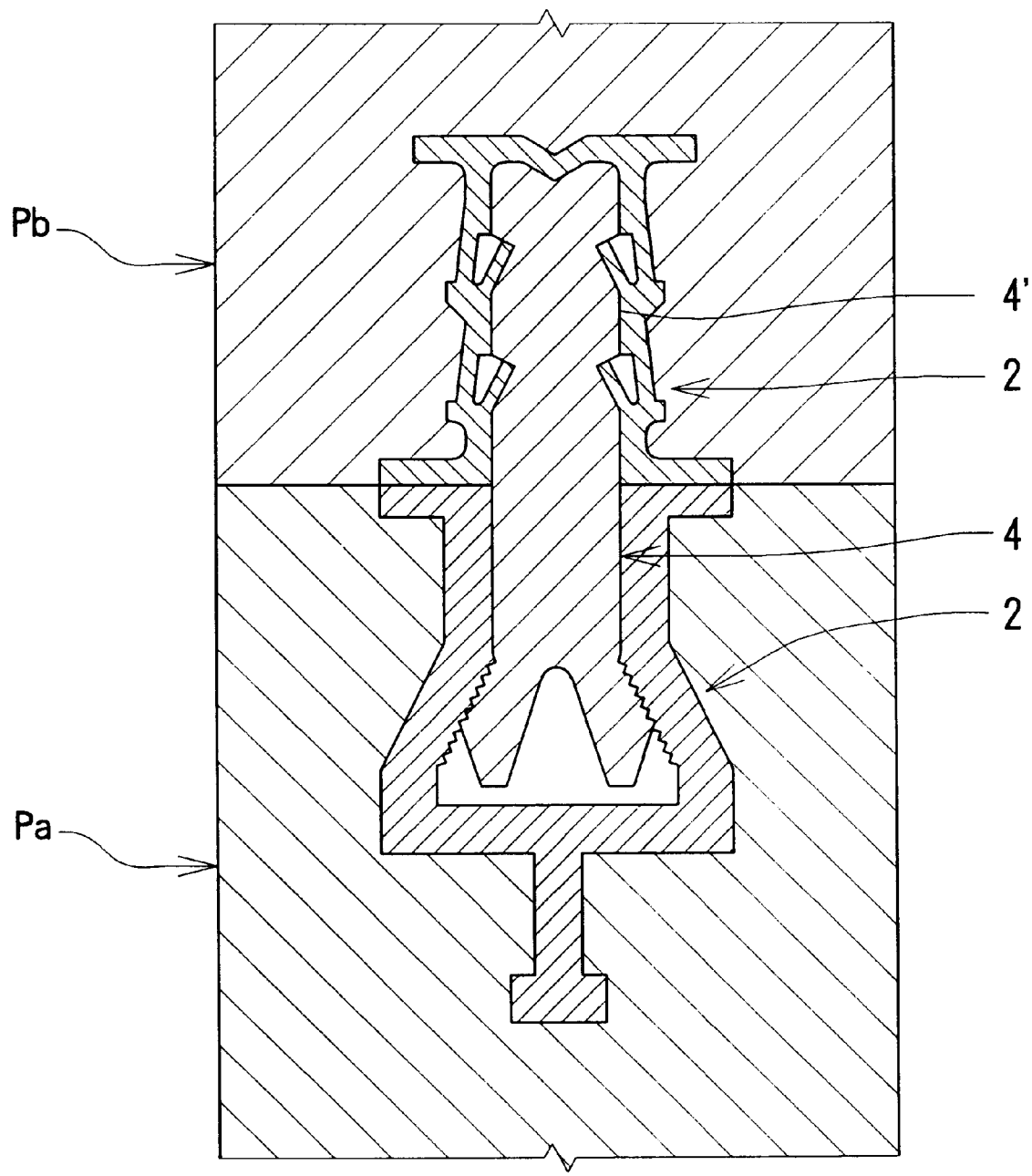

The embodiment shown in FIG. 48 is a modified example of the jointing member shown in FIGS. 47 and 14. In this embodiment, the concave jointing elements 2 respectively used for the lower stage panel Pa and the upper stage panel Pb are different from each other in shape. The concave jointing elements 2 used in the upper end surface and lower end surface of the panels may have different shapes, and the convex jointing element 4 is formed by using the convex jointing element 4' having the shape corresponding to the shapes of the concave jointing elements 2.

Figure 49:
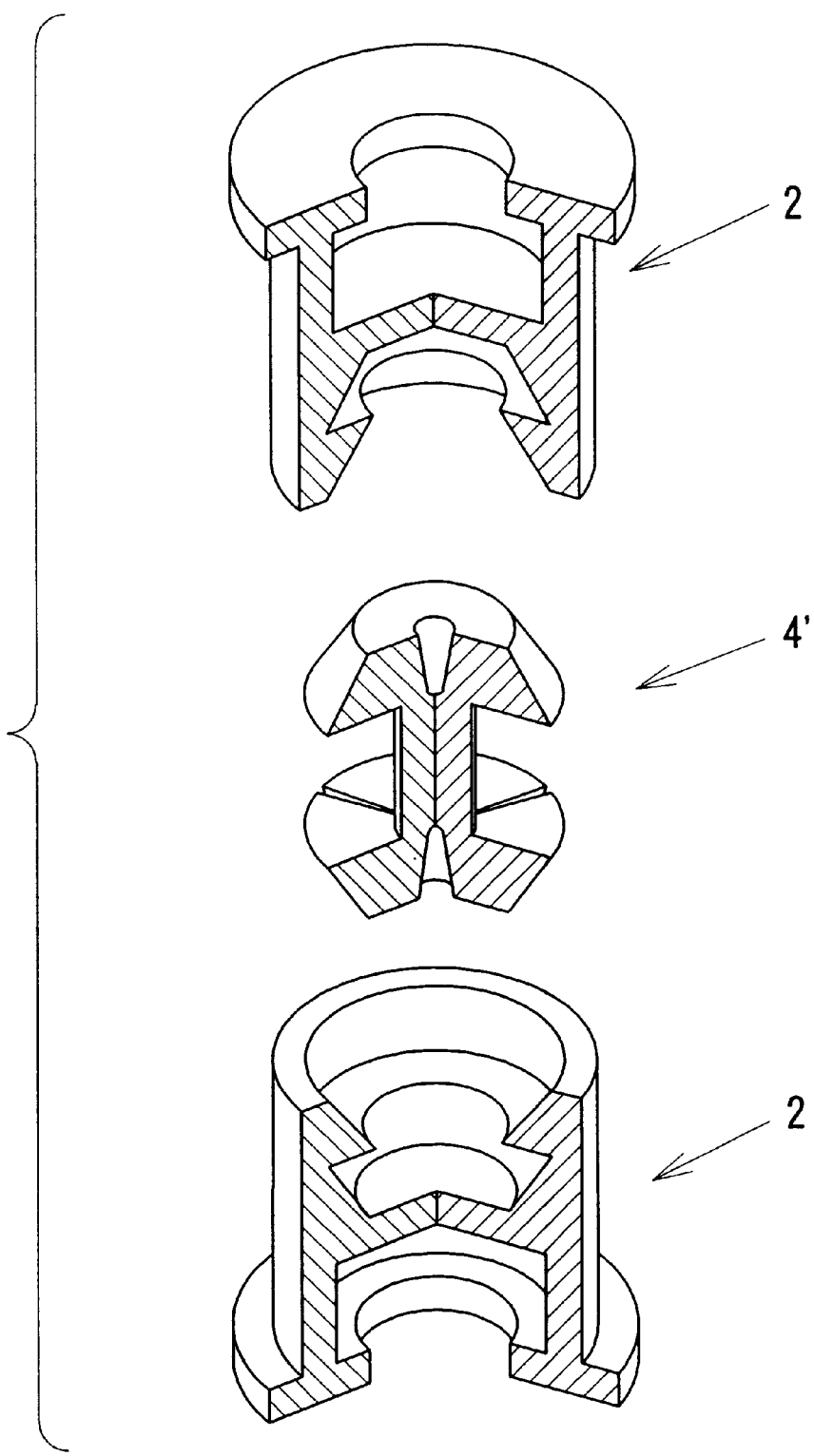

The embodiment shown in FIG. 49 is a modified example of the jointing member shown in FIG. 16. The concave jointing element 2 and the convex jointing element 4' in this embodiment are circular in horizontal section.

Figure 50A:
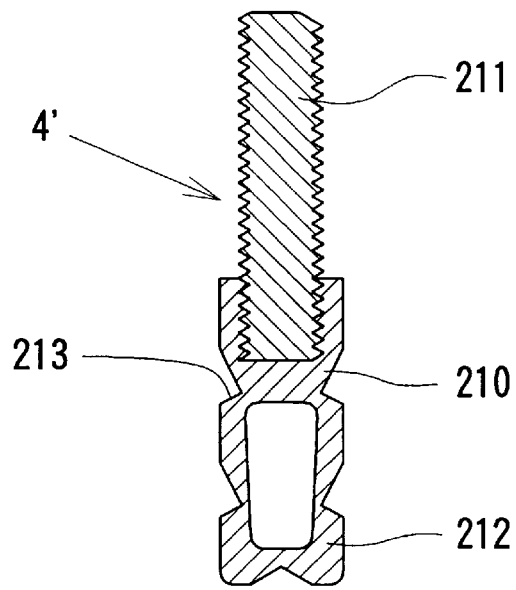
Figure 50B:
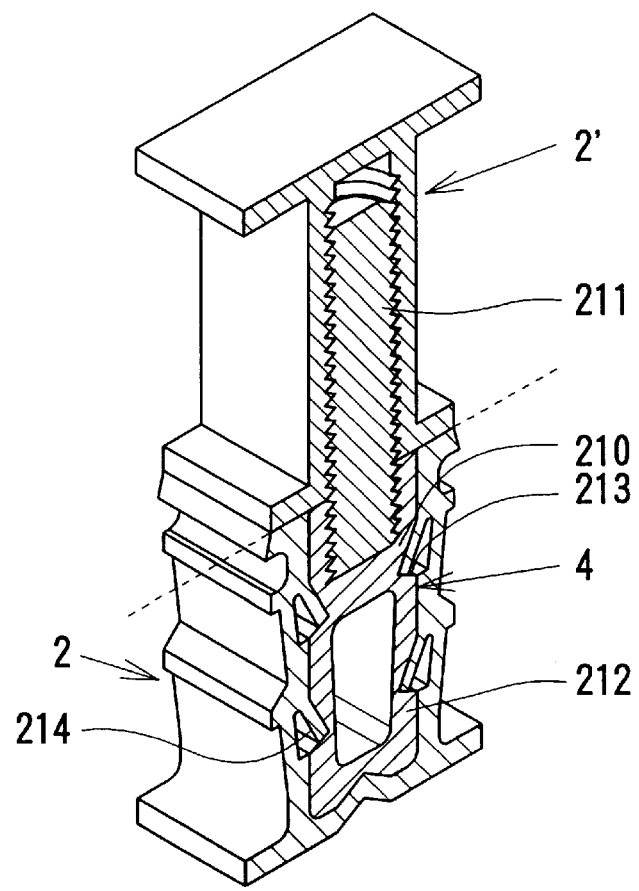

In the embodiment shown in FIGS. 50 (A) and (B), a body 210 of the convex jointing element 4' comprises an upper portion 211 and a lower portion 212 which are respectively separately provided, wherein the outer periphery of the upper portion 211 having a male screw is screwed in a female screw of the lower portion 212. These upper and lower portions 211 and 212 may have the same or different material. Such a convex jointing element 4' is screwed into a concave jointing element 2' which is attached to the lower portion of the panel body 1 to form the convex jointing element 4. Then, the lower portion 212 of the convex jointing element 4 engages in the concave jointing element 2 of the lower panel, so that a recess 213 and a protrusion 214 engage with each other to joint the upper and lower panels.

Figure 51:
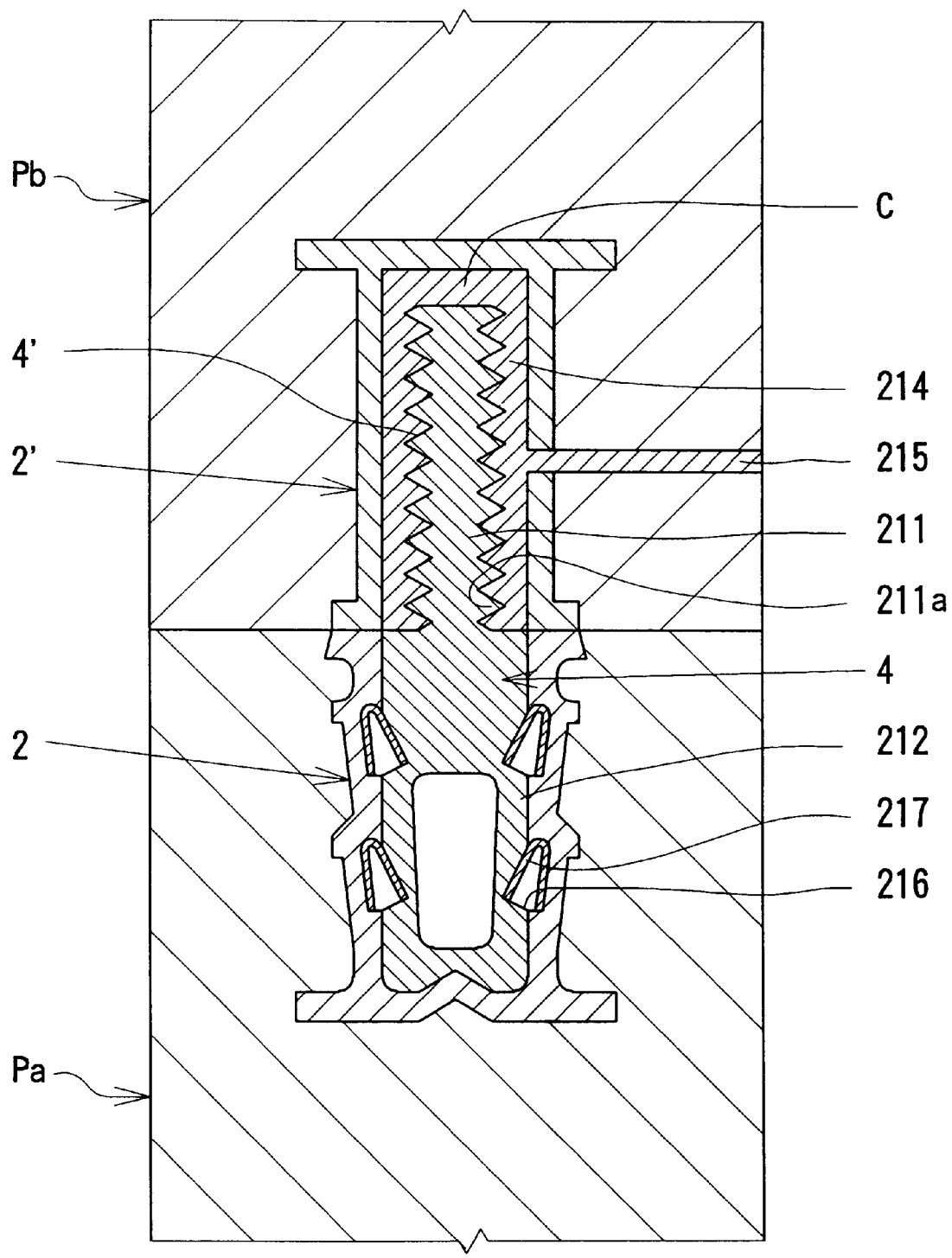

In the embodiment shown in FIG. 51, a screw is not provided on the inner wall of the concave jointing element 2' of the upper stage panel Pb, but a filling space 214 is provided between the upper portion 211 of the convex jointing element 4' and the inner wall of the concave jointing member 2', and further a filling hole 215 communicating with the filling space is provided from the outside. After the upper portion 211 of the convex jointing element 4' is inserted into the concave jointing element 2' of the upper stage panel Pb, the filling material C is introduced into the filling space 214 through the filling hole 215 so that the hardened filling material C engages with the male screw 211a of the upper portion 211 of the convex jointing element 4' to fix the convex jointing element 4' to the concave jointing element 2'. The filling material C may be the same as that explained in FIG. 37 or may be replaced by an adhesive. Further, in this embodiment, protrusion 217 of the concave jointing element 2 engaging with a recess 216 of the convex jointing element 4 is separately manufactured.

In the example shown in FIG. 52, the upper portion 211 of the convex jointing element 4' is fixed to the inner surface of the concave jointing element 2' by an adhesive. The lower portion 212 of the convex jointing element 4' has an elastic leg 220. The holding pawl provided at the tip end thereof and a holding pawl 222 of the concave jointing element 2 engage with each other so that the convex jointing element 4 and concave jointing element 2 are jointed with each other.

The convex jointing element 4' may be provided in the concave jointing element 2' which is directly formed on the panel body 1 without using a molded concave jointing element 2'.

The shape and function of the jointing members are explained by exemplifying the first to third types of jointing elements. Although all the combinations thereof are not illustrated, it is possible to use all types of jointing elements by appropriately combining them.

A method of coping with a bending moment between the panels has been already explained with reference to FIGS. 2 and 3 by attaching the attaching member to the upper and lower panels bridging thereover by way of the concave jointing members provided at the back surface of the construction panel P. Other examples of a method of reinforcing the jointing members will be now described hereinafter.

Figure 53:
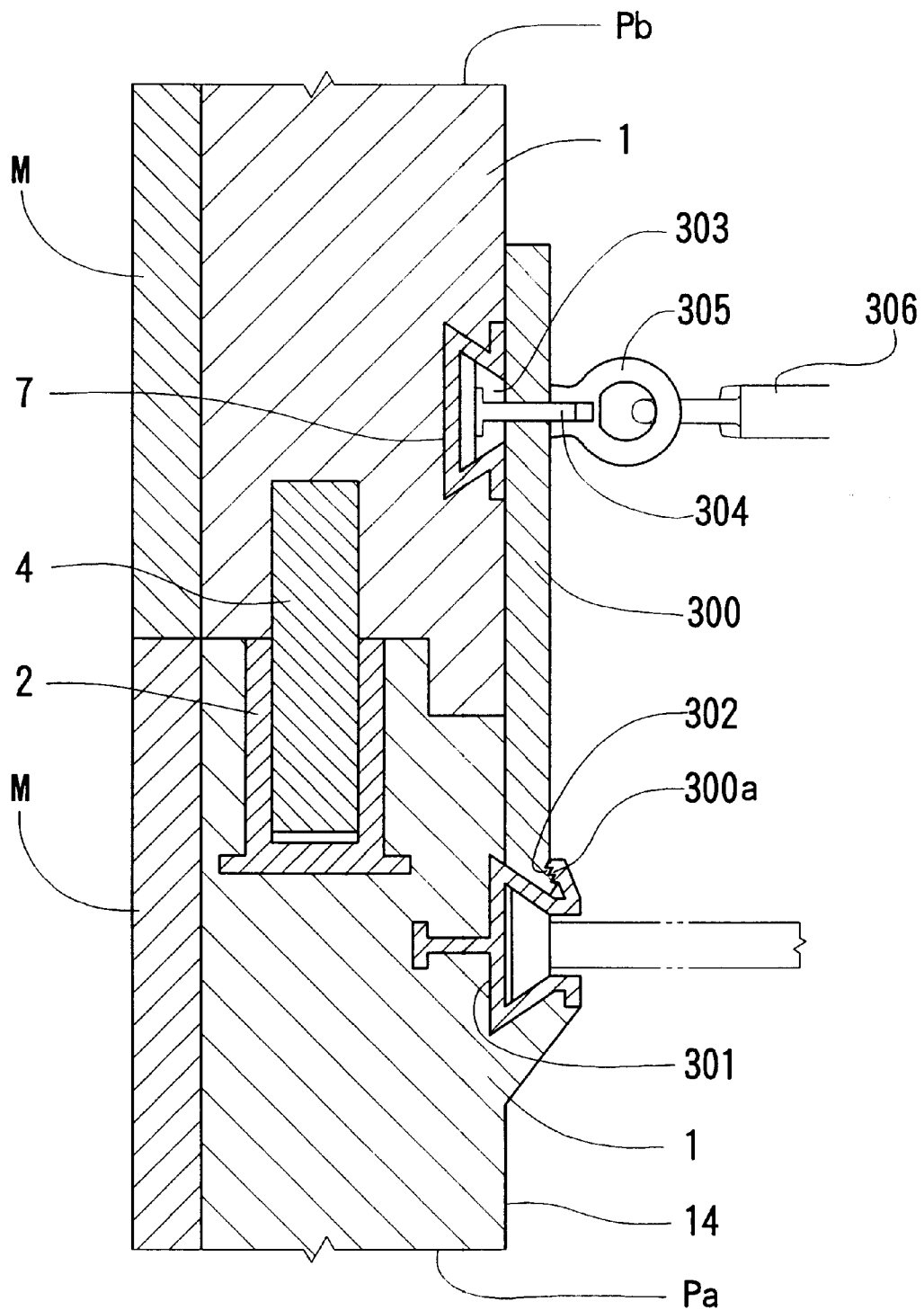
FIG. 53 is a sectional view showing a method of reinforcing jointed upper and lower panels using an attaching member.

In the example shown in FIG. 53, a pawl 300a provided at the lower end of an attaching member 300 engages with a pawl 302 provided at the molded product 301 constituting a dovetail of a concave jointing member at the back surface of the lower stage panel Pa. Accordingly, the attaching member 300 serves as the jointing member of the upper and lower panels Pa and Pb, and can restrain the lower end of the attaching member 300 from moving downward or upward when it receives a positive or a negative bending moment at the jointing boundaries between the back surfaces of the upper and lower panels Pa and Pb, so that it can withstand against the bending stress which the upper and lower panels Pa and Pb receive.

The attaching member 300 alone may be used without using the concave jointing element 2 and the convex jointing element 4 or the concave jointing element 2 and the convex jointing element 4 and the attaching member 300 may be used together.

A decorative layer M which is formed by sticking tiles is provided on the surfaces of the upper and lower panels Pa and Pb. When the attaching member 300 is fixed to the panel body 1 by a bolt 304 which is embedded into a tenon 303 which engages in the dovetail of the concave jointing elements 7, if it is fastened by an eye nut 305, the opposing panels can be jointed with each other by a jointing rod 306 by way of an eye hook and the like as a joint.

Figure 54:
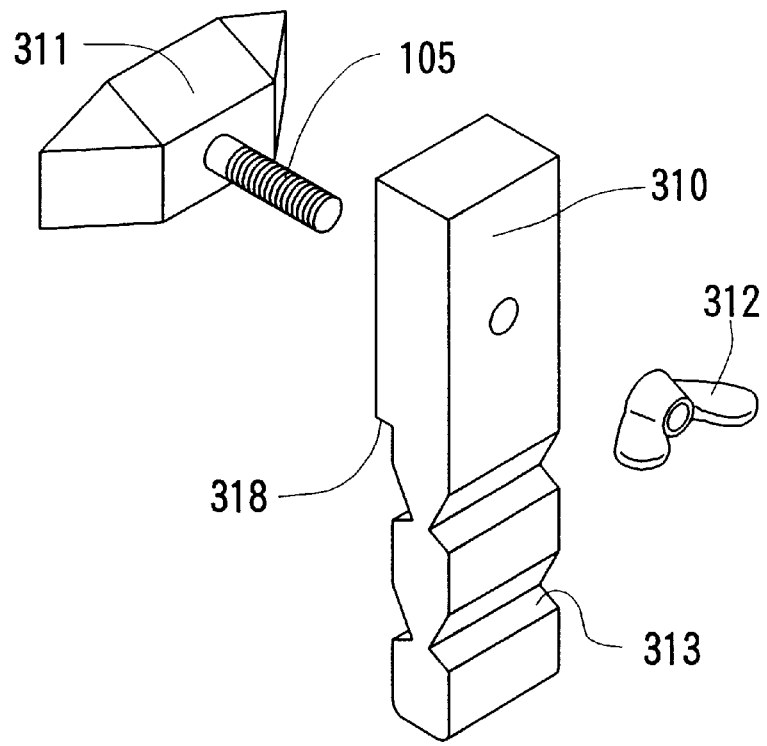
FIGS. 54(A) and (B) are respectively perspective views showing the attaching member.
Figure 54:
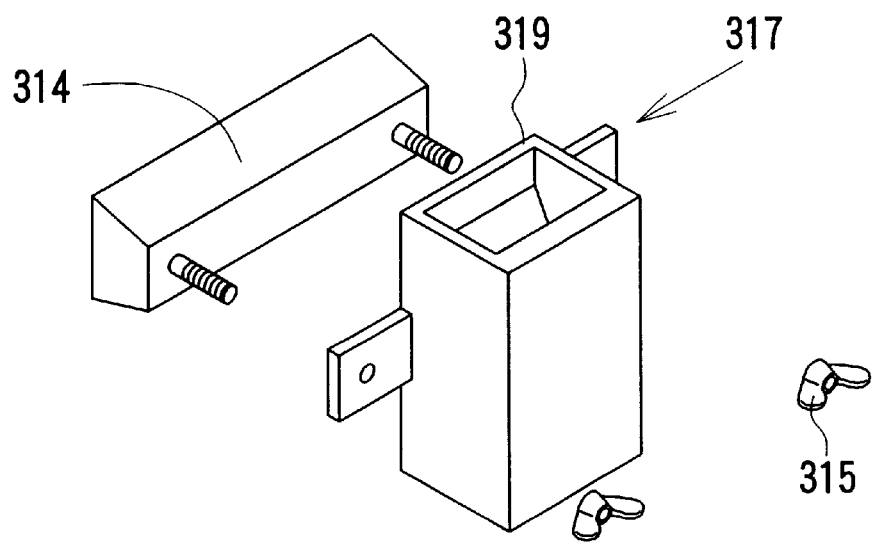
Figure 55:
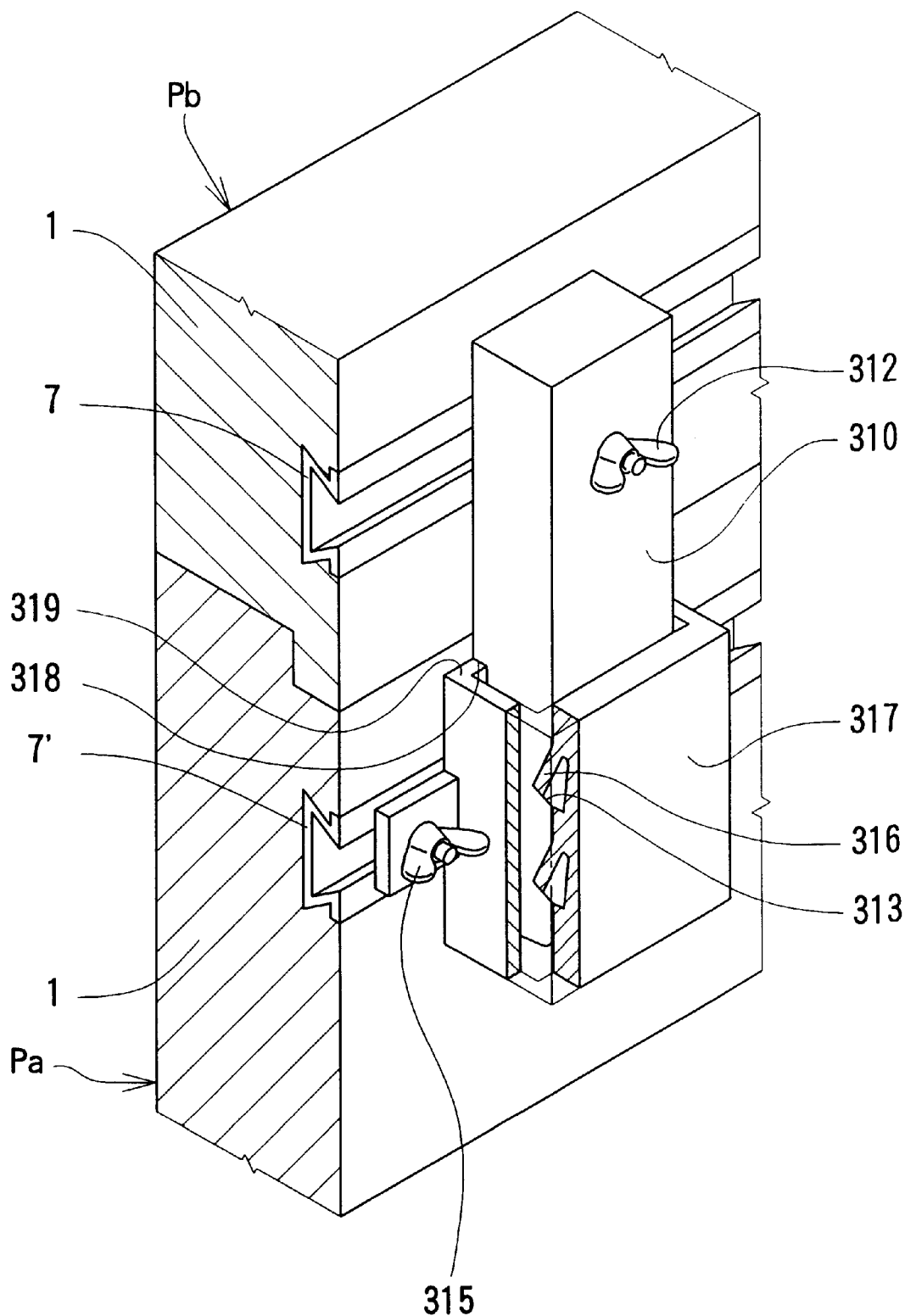
FIG. 55 is a perspective view for explaining a method of reinforcing construction panels by the attaching member.

There is a method for coping with a large bending moment, for example as shown in FIGS. 54 and 55. An attaching member 310 in this example is fixed to the dovetail of the concave jointing elements 7 of the upper stage panel Pb by a tenon 311 and a wing nut 312, and it is brought into close contact with the back surface of the panel body 1. However, a recess 313 is provided on a pillar like the convex jointing element 4 shown in FIG. 8. Meanwhile, a bottomless box body 317 provided with a protrusion 316 like the concave jointing element 2 shown in FIG. 8 is attached to the back surface of the panel body 1 by a tenon 314 inserted into a dovetail of a concave jointing elements 7' of the lower panel Pa and by a wing nut 315.

The attaching member 310 and box body 317 may be directly attached to the panel body 1 by a bolt, etc. without using either or both of the concave jointing elements 7 and 7'.

When the lower portion of the attaching member 310 engages in the box body 317 provided thereunder, the recess 313 of the attaching member 310 and the protrusion 316 of the box body 317 engage with each other. Accordingly, even if the jointing boundary between the upper and lower panels Pa and Pb receive a large negative moment, it can cope with such moment since the attaching member 310 is brought into close contact with the back surfaces of the upper and lower panels Pa and Pb and the recess 314 and protrusion 316 engage with each other. If a step portion 318 is provided at the middle portion of the attaching member 310 in the vertical direction, and the attaching member 310 engages in the box body 317 so that the step portion 318 contacts an upper side end surface 319 of the box body 317, it is possible to restrain the attaching member 310 from being moved downward particularly when the attaching member 310 receives a positive moment.

The aforementioned example exemplifies that a horizontal concave jointing member or a tenon is provided on the back surface of the panel body 1 at one section or more than two sections, the position of these members are not limited thereto but they may be provided at one or more than two sections in the perpendicular direction. In the latter case, the box body 317 and attaching member 310, or a jointing rod may be provided at upper and lower ends thereof, as the need arises. Further, it is possible to provide a horizontal concave jointing member at the upper portion of the panel body and possible to provide a perpendicular tenon at the lower portion of the panel body. In such a manner, respective members may be provided at one or more than two sections and the horizontal and perpendicular directions thereof may be combined with each other.

Figure 56:
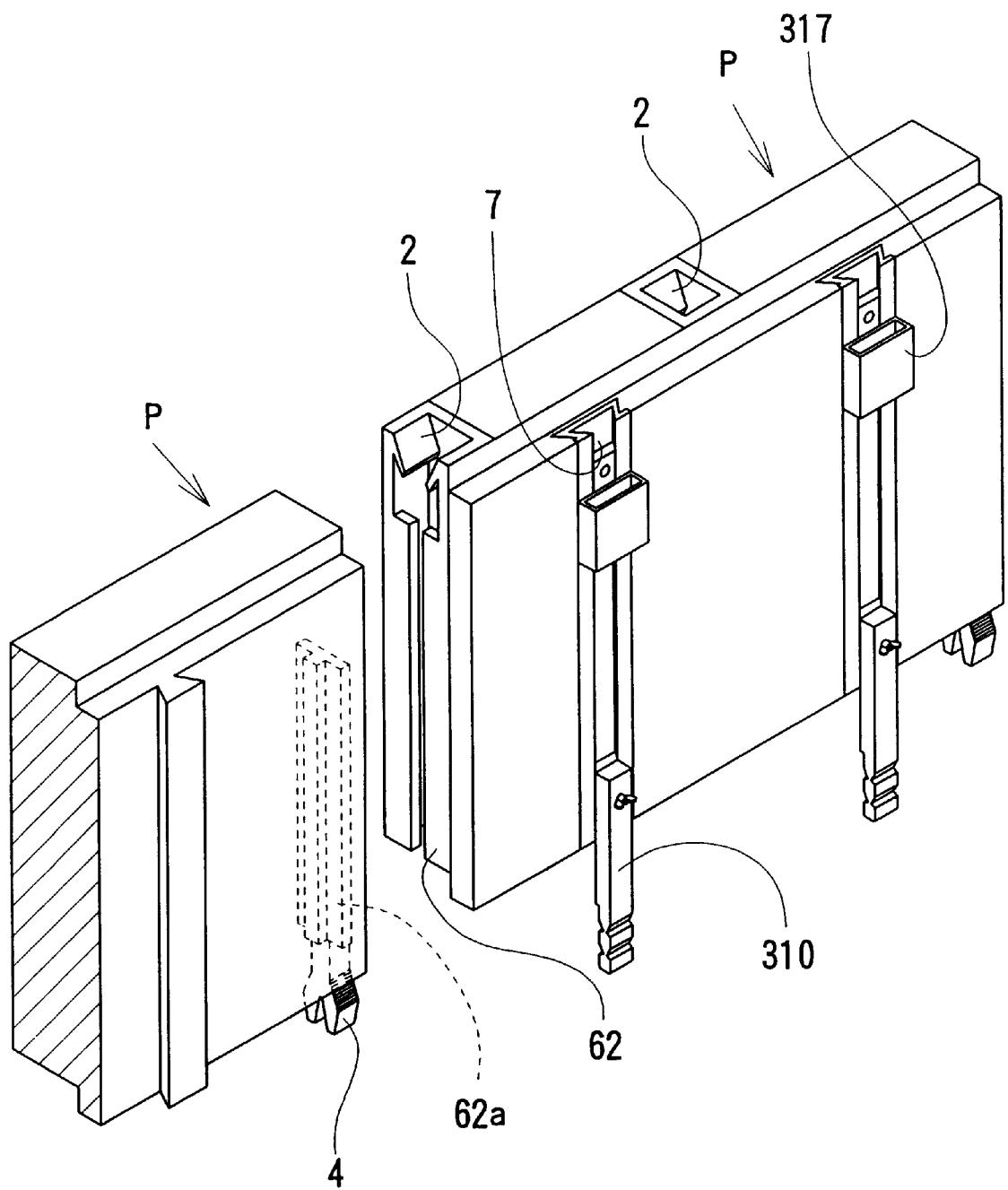
FIG. 56 is a sectional view for explaining a method of jointing the construction panels laterally as well as vertically.

FIG. 56 shows a method of jointing right and left panels. That is, a convex jointing member 62a having a shape of tenon is provided on a side surface end of one side or both sides of a construction panel P, then a convex jointing element 4 is provided at the lower end thereof. A groove-shaped convex jointing member 62 is fixed to the side surface end of another construction panel P. Further, a concave jointing element 2 is provided on the central upper end surface of the panel body 1. When adjoining construction panels P are jointed with each other, the convex jointing member 62a and the convex jointing element 4 provided thereunder respectively engage in the groove of the convex jointing member 62. Accordingly, the convex jointing element 4 and the concave jointing element 2 are jointed with each other by elastic operation. In this case, the assembling method is limited to a zig-zag arrangement. Further, if the concave jointing element 2 is provided on the upper end of the convex jointing member 62, the through joint can be assembled. Accordingly, it is possible to assemble various joint patterns by combining a plurality of concave jointing members and convex jointing members. Further, it is also possible to use the panel alone which panel has the convex jointing member 62 having the concave jointing element 2 at the upper end thereof and the convex jointing member 62a.

In the embodiment shown in FIG. 57, the upper and lower panels are jointed with each other using the concave jointing members provided at the back surface of the panel body. An attaching member 320 having a trapezoidal expanded portion 320a provided at the lower end of the pillar shaped body portion is prepared. The attaching member 320 is inserted into a bolt 322 of a tenon 321 which is also inserted into a dovetail of the concave jointing member, not shown, and it is fastened by a wing nut 323, then it is fixed to the panel body. Further, a fixing member 324 having a recess 324a for receiving the expanded portion 320a of the attaching member 320 is prepared. When the attaching member 320 engages in the fixing member 324, the upper and lower panels are jointed with each other by the engaging operation between the recess 324a and the expanded portion 320a.

Attaching members, which have been explained with reference to FIGS. 53 to 57, also serve to joint upper and lower panels.

Figure 58:
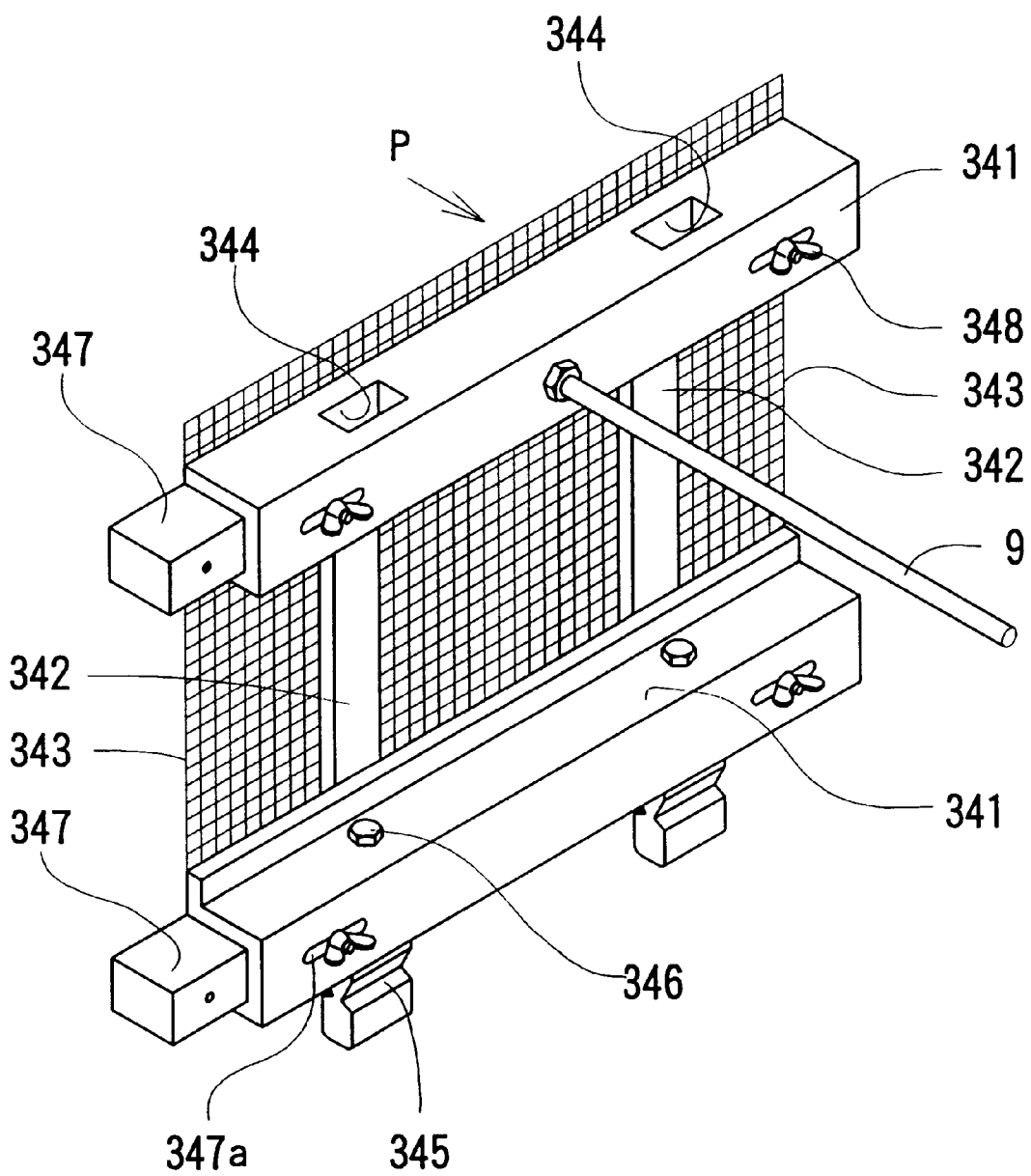
FIG. 58 is a perspective view of a construction panel according to another embodiment of the invention.

FIG. 58 is a perspective view of a construction panel P according to another embodiment. The construction panel P of this embodiment comprises a framework composed of upper and lower receiving plates 341 and frames 342 for connecting the upper and lower receiving plates 341 and a mesh body 343 made of metal or synthetic resin is attached to the framework. Each of the upper and lower receiving plates 341 is made of metal or synthetic resin and has a U-shaped channel rail shaped in cross section, concave jointing means 344 are defined on the upper surface of the upper receiving plate 341, namely on end edge surface of the construction panel P wherein the concave jointing means 344 are arranged in parallel with each other to be opened, while convex jointing means 345 are fixed to the lower surface of the lower receiving plate 341 by bolts 346 at the positions corresponding to the concave jointing means 344. Pillar-shaped bodies 347 inserted into respective ends of the upper and lower receiving plates 341 form convex jointing means for connecting right and left panels, while the other respective ends of the receiving plates 341 form concave jointing means, wherein the pillar-shaped bodies 347 are fixed by wing nuts 348 by way of grooves 347a which are provided depending on the necessity. The opposing panels are jointed with each other by jointing rods 9. The mesh body 343 and the receiving plates 341 can be formed integrally by molding.

Figure 59:
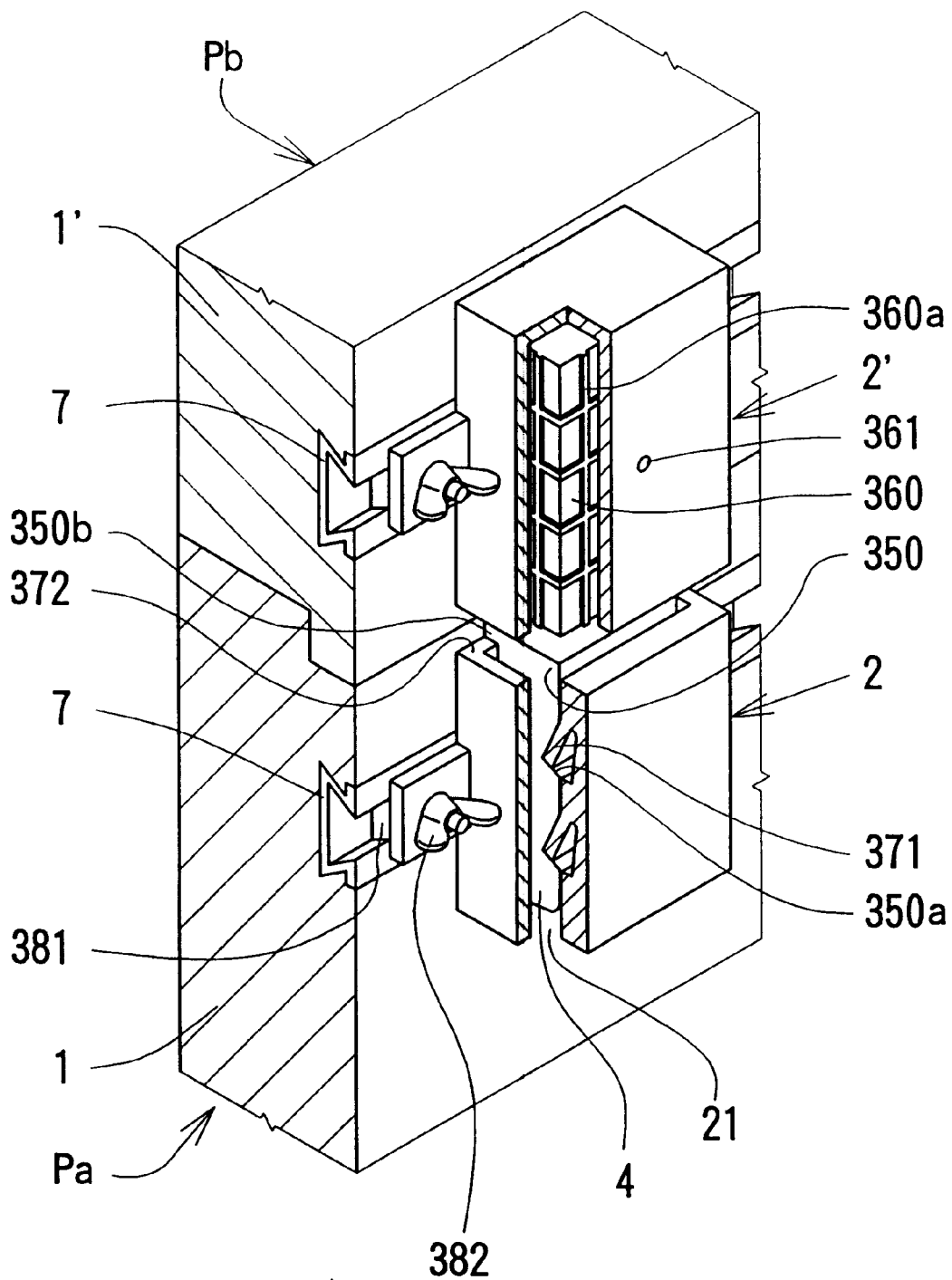
FIG. 59 is a perspective view showing another method of jointing upper and lower panels utilizing concave jointing members provided at the back surface of a panel body.

The method of jointing panels shown in FIG. 59 is a modification of the jointing method shown in FIG. 51. The lower portion 350 of the convex jointing element 4 is pillar-shaped and has recesses 350a and also has protrusions 350b. Ribs 360a protrude from the pillar-shaped upper portion 360 of the convex jointing element 4. The concave jointing element 2 is a bottomless box and protrusions 371 protrude from the inner surface of the hollow portion 21 of the concave jointing element 2. The concave jointing element 2 is fixed to the back surface of the panel body 1 in the same manner as set forth above by a tenon 381 and a wing nut 382 utilizing the concave jointing elements 7. Meanwhile, the concave jointing element 2' is a box having a bottom and it is fixed to the back surface of the panel body 1' likewise by a tenon and a wing nut.

The lower portion 350 of the convex jointing element 4 is inserted into the recess of the concave jointing element 2 attached to the lower stage panel Pa until the protrusions 350 of the lower portion 350 contacts the upper end surface 372 of the concave jointing element 2, so that the recesses 350a engage with protrusions 371, thereby engaging the concave jointing element 2 with the convex jointing element 4. Thereafter, the upper stage panel Pb is lowered to insert the concave jointing element 2' attached to the upper stage panel Pb into the protruding upper portion 360 of the convex jointing element 4, then a filling material is introduced through a grout introduction hole 361 and hardened, so that the upper and lower concave jointing elements 2 and 2' engage with each other by way of the convex jointing element 4. As a result, the upper and lower panels Pa and Pb are jointed with each other. In this embodiment, the lower portion 350 may be inserted into the concave jointing element 2 after the upper portion 360 of the convex jointing element 4 engages in the concave jointing element 2' in advance while the gap therebetween is filled with the filling material C.

Although FIGS. 54 (A) and (B) to FIG. 59 explain an example of first to third types of jointing elements, they can be variously selected and independently used or used in combination together with the first to third types of jointing elements. Further, a shielding plate or a decorative plate may be provided. Accordingly, it is needless to say that the techniques which are explained with reference to FIGS. 1 to 59 can be selected and combined with one another depending on the condition of the site, and they can be modified appropriately within the scope of the technical concept.

INDUSTRIAL APPLICABILITY

As mentioned above the construction panel P of the present invention can be easily assembled, and the jointing strength between panels is high, and hence they can be suitably used for the walls surrounding buildings, outer and inner walls or partition walls of buildings, supporting walls, and also for construction of concrete structures such as engineering buildings.

Further, it is possible to save energy by attaching the shielding plate, etc. on the panel body.

The advantage for constructing the panels of the invention is to joint the upper and lower and right and left and opposing panels with one another simply and quickly without using instruments or auxiliary material and without resorting to skilled workers, and to assemble the panels with high accuracy and precision, since the jointing members and connecting members engage with one another, thereby enhancing economical effect.

What is claimed is:

1. Panels for construction each including a pair of jointing elements disposed on a panel body at upper and lower surfaces thereof for jointing panels for construction which are piled vertically with respect to each other, wherein one of said jointing elements comprises a concave jointing element having a given length for reducing mutual displacement or deformation between the panel bodies when the panel bodies are jointed with each other, and a freely jointable convex jointing member separate from the panel body is received by the concave jointing element.

2. Panels for construction according to claim 1, further comprising a hollow body extending from a bottom surface of said concave jointing element to a lower end of said panel body, and said convex jointing element disposed inside said hollow body for engaging with the concave jointing element of a lower stage panel.

3. Panels for construction according to claim 1, further comprising connecting members for connecting spaced opposing construction panels or temporary members at back surfaces thereof.

4. Panels for construction according to claim 1, wherein said jointing elements adjoin construction panels to each other in a lateral direction.

5. Panels for construction according claim 1, wherein each of said panel bodies is L-shaped.

6. Panels for construction according to claim 1, wherein each of said panel bodies is curved.

7. Panels for construction according to claim 6, wherein the convex or concave jointing elements on back surfaces of the panel bodies receive connecting rods with turn buckles to maintain spacing between opposing construction panels.

8. Panels for construction according to claim 1, wherein said panel body is formed of a frame.

9. Panels for construction according to claim 1, further comprising at least one of a shielding plate or decorative plate which is mounted on each of said panel bodies on at least one of a front surface and a back surface thereof.

10. Panels for construction according to claim 1, further comprising a decorative plate which is mounted on a front surface of each of said panel bodies.

11. Panels for construction according to claim 1, wherein each concave jointing element includes holding means for holding an expansion portion formed in each freely jointable convex jointing element.

12. Panels for construction according to claim 1, wherein a first screw portion formed in each freely jointable convex jointing element is received by a second screw portion formed in each concave jointing element.

13. Panels for construction according to claim 1, wherein each convex jointing element includes a number of elastic bodies which are urged outwardly, and a holding means formed in each concave jointing element for receiving said elastic bodies.

14. A method of jointing panels for construction comprising:

providing concave jointing elements on panel bodies secured at upper ends thereof;

providing hollow bodies extending from a bottom surface of the concave jointing elements at the upper ends to lower ends of the panel bodies;

incorporating freely jointable convex jointing elements into the hollow bodies;

disposing the construction panels vertically;

lowering the freely jointable convex jointing elements of an upper stage construction panel onto a lower stage panel so that end surfaces thereof are flush with each other; and jointing the respective convex jointing elements of the upper stage panel to the concave jointing elements of the lower C stage panel to join the upper stage and lower stage panels to each other.

15. The method of jointing panels for construction according to claim 14, wherein providing concave jointing elements at the upper ends of the panel bodies comprises embedding the concave jointing elements in the panel bodies.

16. The method of jointing panels for construction according to claim 14, wherein the concave jointing elements have a box-shape and the convex jointing elements have a pillar-shape.

17. The method of jointing panels according to claim 14, further comprising:

providing connecting rods to support opposing spaced ones of the construction panels or temporary panels; and disposing the connecting rods in the concave jointing elements at back surfaces of the opposing spaced panels.

18. The method of jointing panels according to claim 14, including providing a jointing plate on either the convex jointing elements or the concave jointing elements at ends where the jointing elements contact each other so as to joint the panels.

19. The method of jointing panels according to claim 14, including piling the panel bodies using temporary members.

20. The method of jointing panels according to claim 14, wherein the convex jointing elements comprise filling tubes, and the step of jointing the convex jointing elements to the concave jointing elements comprises:

attaching bag bodies to the freely jointable convex jointing elements;

inserting the bag bodies attached to the convex jointing elements into the respective concave jointing elements; and introducing filling material into the bag bodies to expand the bag bodies in the respective concave jointing elements.

21. The method of jointing panels according to claim 14, wherein the step of jointing the jointing elements comprises heating and thermally melting contact surfaces of at least one of the convex and concave jointing elements and placing the contact surfaces against each other to joint the jointing elements.

22. The method of jointing panels according to claim 14, the concave jointing elements including steps at the hollow bodies and the convex jointing elements including shafts supporting elastic members at one end thereof, the step of jointing the respective convex jointing elements to the concave jointing elements including the step of lowering the respective shafts such that the respective elastic members move below the steps at the hollow bodies, the elastic members expanding to joint the convex jointing elements to the respective concave jointing elements.

23. The method of jointing panels according to claim 22, wherein the convex jointing elements include first screw threads and the concave jointing elements include second screw threads, the step of jointing the jointed elements including rotating the threaded convex jointing elements so that the second screw threads of the concave jointing elements receive the first screw threads of the convex jointing elements to joint the respective panels.

24. The method of jointing panels according to claim 14, including a jointing element hole penetrating an upper portion of the convex jointing elements and a body hole through the panel bodies in alignment with the jointing element hole in the jointed position, the step of jointing the jointing elements comprising the step of inserting a wedge through the body hole and into the convex joint hole to joint the upper stage and the lower stage panels.

25. The method of jointing panels according to claim 14, wherein at least one of a shielding plate and a decorative plate is mounted on at least one of front and back surfaces of each of the panel bodies.

26. The method of jointing panels according to claim 14, further comprising filling a filling material between the opposing construction panels.

27. The method of jointing panels according to claim 14, wherein the step of jointing the jointing elements comprises applying an adhesive to at least one contact surface of the convex or concave jointing elements wherein the jointing elements are jointed with each other by the adhesive.

28. Panels for construction each including a pair of jointing elements disposed on a panel body at upper and lower surfaces thereof for jointing construction panels which are piled vertically with respect to each other, wherein one of said jointing elements comprises a concave jointing element and another jointing element formed by fixing a convex jointing member to another of said concave jointing elements at the lower surface of the panel body so as to protrude therefrom.

* * * * *

UNITED STATES PATENT AND TRADEMARK OFFICE
CERTIFICATE OF CORRECTION

PATENT NO. : 6,151,856
DATED : November 28, 2000
INVENTOR(S) : Takeshige Shimonohara It is certified that error appears in the above-identified patent and that said Letters Patent is hereby corrected as shown below:

Column 28,
Line 47, delete "C".

Column 30,
Line 32, after "element" insert --- is ---.

Signed and Sealed this

Twenty-fifth Day of September, 2001

Attest:

NICHOLAS P. GODICI
Attesting Officer    Acting Director of the United States Patent and Trademark Office